United States Patent
Xu et al.

(10) Patent No.: US 12,507,694 B2
(45) Date of Patent: Dec. 30, 2025

(54) STABILIZATION OF SUSPENSION CONCENTRATES BY ETHOXYLATED RICINOLEIN

(71) Applicant: BASF SE, Ludwigshafen (DE)

(72) Inventors: Wen Xu, Research Triange Park, NC (US); Kara Walden Benton, Research Triangle Park, NC (US)

(73) Assignee: BASF SE, Ludwigshafen (DE)

( * ) Notice: Subject to any disclaimer, the term of this patent is extended or adjusted under 35 U.S.C. 154(b) by 914 days.

(21) Appl. No.: 17/602,822

(22) PCT Filed: Apr. 20, 2020

(86) PCT No.: PCT/EP2020/060982
§ 371 (c)(1),
(2) Date: Oct. 11, 2021

(87) PCT Pub. No.: WO2020/224942
PCT Pub. Date: Nov. 12, 2020

(65) Prior Publication Data
US 2022/0159957 A1    May 26, 2022

Related U.S. Application Data

(60) Provisional application No. 62/842,916, filed on May 3, 2019.

(51) Int. Cl.
| | | |
|---|---|---|
| *A01N 43/58* | (2006.01) | |
| *A01N 25/02* | (2006.01) | |
| *A01N 25/10* | (2006.01) | |

(52) U.S. Cl.
CPC ............ *A01N 43/58* (2013.01); *A01N 25/02* (2013.01); *A01N 25/10* (2013.01)

(58) Field of Classification Search
CPC .................................................. A01N 43/58
See application file for complete search history.

(56) References Cited

U.S. PATENT DOCUMENTS

| | | | |
|---|---|---|---|
| 6,033,681 A | 3/2000 | Narayanan et al. | |
| 9,198,422 B2 * | 12/2015 | Defieber | C07D 405/14 |
| 10,368,545 B2 | 8/2019 | Fischer et al. | |
| 10,660,333 B2 | 5/2020 | Willot et al. | |
| 10,961,220 B2 | 3/2021 | Mosrin et al. | |
| 2017/0354142 A1 | 12/2017 | Keiper et al. | |
| 2018/0184654 A1 | 7/2018 | Mazuir et al. | |

FOREIGN PATENT DOCUMENTS

| | | |
|---|---|---|
| EP | 3329777 A1 | 6/2018 |
| WO | WO-2005/082141 A1 | 9/2005 |
| WO | WO-2010/034737 A1 | 4/2010 |
| WO | WO-2011/009804 A2 | 1/2011 |
| WO | WO-2016/128298 A1 | 8/2016 |
| WO | WO-2016/180833 A1 | 11/2016 |
| WO | WO-2018/029102 A1 | 2/2018 |
| WO | WO-2018/082964 A1 | 5/2018 |
| WO | WO-2018/083040 A1 | 5/2018 |
| WO | WO-2018/210625 A1 | 11/2018 |
| WO | WO-2019/137995 A1 | 7/2019 |

OTHER PUBLICATIONS

International Application No. PCT/EP2020/060982, International Search Report and Written Opinion, mailed Jun. 25, 2020.
"Chemical Name: Sorbitan Monooleate", CAS No. 1338-43-8, Alkamuls@ S80 BR, Technical Data Sheet, XP093326558, Jan. 2020, 1 Page.
European Search Report for EP Patent Application No. 25186668.7, Issued on Oct. 30, 2025, 4 pages.

* cited by examiner

*Primary Examiner* — Gina C Justice
(74) *Attorney, Agent, or Firm* — MARSHALL, GERSTEIN & BORUN LLP

(57) ABSTRACT

The invention relates to an aqueous agrochemical composition comprising a) suspended particles of an active ingredient; and b) ethoxylated ricinolein; wherein the active ingredient has a water-solubility of at least 1 g/l at 25° C.; and wherein the ethoxylated ricinolein contains 35 to 50 molecules of ethylene oxide per molecule of ricinolein in polymerized form. It also relates to a method of stabilizing an aqueous agrochemical composition comprising the suspended particles of the active ingredient; to uses and methods of application of the agrochemical composition; and to a method for preparing the agrochemical composition; and to plant propagation material comprising the agrochemical composition.

12 Claims, No Drawings

STABILIZATION OF SUSPENSION CONCENTRATES BY ETHOXYLATED RICINOLEIN

CROSS-REFERENCE TO RELATED APPLICATIONS

This is the U.S. national phase of International Application No. PCT/EP2020/060982, filed Apr. 20, 2020, which claims the benefit of U.S. Provisional Patent Application No. 62/842,916, filed on May 3, 2019, incorporated herein by reference in its entirety.

The invention relates to an aqueous agrochemical composition comprising suspended particles of an active ingredient that has a water-solubility of at least 1 g/l at 25° C., and ethoxylated ricinolein, which contains 35 to 50 molecules of ethylene oxide per molecule of ricinolein in polymerized form. The invention also relates to a process for the preparation of the agrochemical composition; to a method of controlling phytopathogenic fungi and/or undesired plant growth and/or undesired insect or mite attack and/or for regulating the growth of plants, wherein the agrochemical composition is allowed to act on the respective pests, their environment or the crop plants to be protected from the respective pest, on the soil and/or on undesired plants and/or on the crop plants and/or on their environment. It also relates to a non-therapeutic method for treating animals infested or infected by parasites or preventing animals of getting infected or infested by parasites or protecting animals against infestation or infection by parasites which comprises orally, topically or parenterally administering or applying to the animals a parasitically effective amount the agrochemical composition; a method for treating, controlling, preventing or protecting animals against infestation or infection by parasites by administering or applying orally, topically or parenterally to the animals the agrochemical composition; the use of the agrochemical composition for protecting growing plants or plant propagation material from attack or infestation by invertebrate pests; the use of the agrochemical composition for combating parasites or insects in and on animals; and to the agrochemical composition for use in a method of controlling or preventing infestation by insects or parasites of an animal. Another object is the use of the ethoxylated ricinolein for stabilizing an aqueous agrochemical composition comprising the suspended particles of the active ingredient; and a method of stabilizing an aqueous agrochemical composition comprising the suspended particles of the active ingredient comprising the contacting of ethoxylated ricinolein with particles of the active ingredient and water. Combinations of embodiments with other embodiments, regardless of their respective level of preference, are within the scope of the invention.

Aqueous suspension concentrates are one of the most commonly used formulation types in the agrochemical industry. They are usually confined to active ingredients that have a very low water-solubility. Active ingredients with a high water-solubility are difficult to build into an aqueous suspension concentrates, since the particles either dissolve during storage or undergo Ostwald-Ripening, thereby resulting in increased particle size and eventually sedimentation. Other stability problems of such formulations are gelling, i.e. the formation of unstructured conglomerates of the active ingredient negatively influence the desired rheological profiles, e.g. by increasing the viscosity, or by clogging spray nozzles.

On the other hand, aqueous suspension concentrates have the advantage of a low content of organic solvents, and a relatively safe handling and application for the applicant.

It was therefore desirable to supply an aqueous agrochemical composition that contains an active ingredient with high water-solubility in the form of suspended particles, which is stable upon storage, does not undergo particle growth, particle aggregation or conglomeration, and thus is not prone to gelling or sedimentation of particles.

The objective has been achieved by an aqueous agrochemical composition comprising
  a) suspended particles of an active ingredient; and
  b) ethoxylated ricinolein;
wherein the active ingredient has a water-solubility of at least 1 g/l at 25° C.; and wherein the ethoxylated ricinolein contains 35 to 50 molecules of ethylene oxide per molecule of ricinolein in polymerized form.

It was surprisingly found that the degree of ethoxylation of the ricinolein is crucial to generate the advantageous composition of the present invention.

The agrochemical composition is an aqueous agrochemical composition. The water content of the agrochemical composition is typically at least 1 wt %, preferably at least 5 wt %, more preferably at least 10 wt %, more preferably at least 15 wt %, most preferably at least 20 wt %, utmost preferably at least 25 wt %, especially preferably at least 30 wt %, and in particular at least 35 wt %, each time based on the total weight of the agrochemical compositions.

The water content of the agrochemical composition is typically up to 95 wt %, preferably up to 90 wt %, more preferably up to 80 wt %, most preferably up to 70 wt %, especially preferably up to 60 wt %, and in particular up to 50 wt % based on the total weight of the agrochemical composition. The water content of the agrochemical composition is typically of from 10 to 85 wt %, preferably from 10 to 65 wt %, more preferably from 15 to 60 wt % based on the total weight of the agrochemical composition.

The agrochemical composition comprises ethoxylated ricinolein. Ricinolein is the major component of castor oil, and is synonymously designated as glycerol triricinoleate (cas number 2540-54-7).

Ethoxylated ricinolein can be manufactured by reaction of ethylene oxide with ricinolein, optionally in the presence of a catalyst, e.g. NaOH, at elevated temperatures, e.g. 100 to 200° C. Ethoxylated ricinolein is commercially available under the trade names Agnique CSO-40, Anique CSO-25, Agnique CSO-35, or Agnique CSO-54.

The ethoxylated ricinolein contains 35 to 50 molecules of ethylene oxide per molecule of ricinolein in polymerized form. In other words, the ethoxylated ricinolein is obtainable by reaction of 35 to 50 moles of ethylene oxide per mole of ricinolein. Preferably, the ethoxylated ricinolein contains 37 to 50 molecules of ethylene oxide per molecule of ricinolein in polymerized form, preferably 37 to 45 molecule of ethylene oxide per molecule of ricinolein. The ethoxylated ricinolein may contain at least 38 molecules per molecule of ricinolein in polymerized form, preferably at least 39 molecules. The ethoxylated ricinolein may contain up to 48 molecules of ethylene oxide per molecule of ricinolein in polymerized form, preferably up to 46 molecules, more preferably up to 44 molecules, and most preferably up to 42 molecules of ethylene oxide per molecule of ricinolein in polymerized form. The ethoxylated ricinolein may contain of from 38 to 50 molecules of ethylene oxide per molecule of ricinolein in polymerized form, preferably from 38 to 45, more preferably from 38 to 42 molecules of ethylene oxide per molecule of ricinolein in polymerized form.

The concentration of the ethoxylated ricinolein may be at least 0.5 wt %, preferably at least 1 wt %, more preferably at least 2 wt %, most preferably at least 3 wt %, in particular at least 4 wt % based on the total weight of the agrochemical composition. The concentration of the ethoxylated ricinolein may be up to 30 wt %, preferably up to 25 wt %, more preferably up to 20 wt %, most preferably up to 15 wt % based on the total weight of the agrochemical composition. The concentration of the ethoxylated ricinolein is typically from 1 to 25 wt %, preferably from 2 to 20 wt %, more preferably from 3 to 15 wt % based on the total weight of the agrochemical composition.

The weight ratio of the active ingredient to the ethoxylated ricinolein is typically from 1:1 to 100:1, preferably from 2:1 to 20:1. The weight ratio of the active ingredient to the ethoxylated ricinolein is typically up to 30:1, preferably up to 25:1.

The agrochemical composition contains an active ingredient. The active ingredient may be selected from the group of fungicides, insecticides, nematicides, herbicides, safeners, micronutrients, biopesticides, nitrification inhibitors, urease inhibitors, and/or growth regulators. In one embodiment, the pesticide is an insecticide. In another embodiment, the pesticide is a fungicide. In yet another embodiment the pesticide is a herbicide. The skilled worker is familiar with such pesticides, which can be found, for example, in the Pesticide Manual, 16th Ed. (2013), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorofenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, di hydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

Suitable plant growth regulators are antiauxins, auxins, cytokinins, defoliants, ethylene modulators, ethylene releasers, gibberellins, growth inhibitors, morphactins, growth retardants, growth stimulators, and further unclassified plant growth regulators.

Suitable micronutrients are compounds comprising boron, zinc, iron, copper, manganese, chlorine, and molybdenum.

The agrochemical composition comprises a pesticidally effective amount of the active ingredient. The term "effective amount" denotes an amount of the active ingredient, which is sufficient for controlling harmful fungi on cultivated plants or in the protection of materials and which does not result in a substantial damage to the treated plants. Such an amount can vary in a broad range and is dependent on various factors, such as the pest species to be controlled, the treated cultivated plant or material, the climatic conditions and the specific active ingredient used.

The concentration of the active ingredient in the agrochemical composition is typically at least 5 wt %, more preferably at least 10 wt %, most preferably at least 15 wt %, especially preferably at least 20 wt %, utmost preferably at least 25 wt %, and in particular at least 30 wt % based on the total weight of the agrochemical composition. The concentration of the active ingredient in the agrochemical composition is typically up to 95 wt %, preferably up to 85 wt %, more preferably up to 75 wt %, especially preferably up to 75 wt %, and in particular up to 65 wt % based on the total weight of the agrochemical composition. The agrochemical composition typically contains the active ingredient in a concentration of from 10 to 90 wt %, preferably of from 15 to 60 wt %, more preferably of from 20 to 50 wt % based on the total weight of the agrochemical composition.

The active ingredient is present in the agrochemical composition in the form of suspended particles. The particles may be characterized by their size distribution, which can be determined by dynamic light scattering techniques. Suitable dynamic light scattering measurement units are inter alia produced under the trade name Malvern Mastersizer 3000. The particles may be characterized by their median diameter, which is usually abbreviated as x50 value. The x50 value refers to a particular particle diameter, wherein half of the particle population by volume is smaller than this diameter. The x50 value is typically determined according to ISO 13320:2009.

The particles may have an x50 value of from 0.05 μm to 30 μm, preferably from 0.1 μm to 20 μm, more preferably from 0.5 to 20 μm, most preferably from 0.5 μm to 15 μm, especially preferably from 0.5 μm to 10 μm. The particle typically have an x50 value of at least 0.75 μm, preferably at least 1 μm.

The active ingredient has a water-solubility of at least 1 g/l at 20° C. Preferably, the active ingredient has a water-solubility of at least 5 g/l, preferably at least 10 g/l, more preferably at least 20 g/l, most preferably at least 30 g/l, and in particular at least 40 g/l. The active ingredient may have a water-solubility at 25° C. of up to 200 g/l, preferably up to 100 g/l, more preferably up to 80 g/l, most preferably up to 60 g/l, utmost preferably up to 50 g/l. The active ingredient may have a water-solubility at 25° C. of from 15 g/l to 70 g/l, preferably from 25 g/l to 40 g/l.

The agrochemical composition may contain a further active ingredient, which may be selected from fungicides, insecticides, nematicides, herbicides, safeners, micronutrients, biopesticides, nitrification inhibitors, urease inhibitors, and/or growth regulators. The further active ingredient may be present in dissolved form or as suspended particles in the agrochemical composition. In one embodiment, the further active ingredient is present as an emulsified liquid.

The concentration of the further active ingredient is typically from 1 to 50 wt %, preferably from 10 to 25 wt % based on the total weight of the agrochemical composition.

The active ingredient may be a compound of formula I

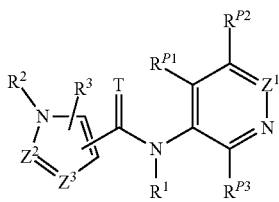

I wherein $R^{P1}$, $R^{P2}$, and $R^{P3}$ are independently of each other H, CN, halogen, $C_1$-$C_4$-alkyl, $C_1$-$C_3$-haloalkyl, $C_1$-$C_4$-alkoxy, $C_1$-$C_3$-haloalkoxy, $C_1$-$C_4$-alkylthio, $C_1$-$C_3$-haloalkylthio, $C_1$-$C_3$-haloalkylsulfinyl, $C_1$-$C_4$-alkylsulfonyl, $C_1$-$C_3$-haloalkylsulfonyl, $C_3$-$C_6$-cycloalkyl, $C_3$-$C_6$-halocycloalkyl, $C_2$-$C_4$-alkenyl, $C_2$-$C_4$-haloalkenyl, $C_2$-$C_4$-alkynyl, or $C_1$-$C_4$-alkoxy-$C_1$-$C_4$-alkyl;

$Z^1$ is N, or CH;
$Z^2$ is N, or $CR^4$;
$Z^3$ is N, or $CR^5$;
T is S, O, or $NR^{1b}$, wherein $R^{1b}$ is H, $C_1$-$C_{10}$-alkyl, $C_1$-$C_4$-haloalkyl, $C_3$-$C_{10}$-cycloalkyl, $C_3$-$C_{10}$-cycloalkylmethyl, $C_3$-$C_{10}$-halocycloalkyl, $C_2$-$C_{10}$-alkenyl, $C_2$-$C_{10}$-haloalkenyl, $C_2$-$C_{10}$-alkynyl, $C_1$-$C_4$-alkyl, $OR^a$, 3- to 10-membered heterocyclyl, 3- to 10-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$;

$R^1$ is H, CN, $C_1$-$C_{10}$-alkyl, $C_1$-$C_{10}$-haloalkyl, $C_3$-$C_{10}$-cycloalkyl, $C_3$-$C_{10}$-halocycloalkyl, $C_1$-$C_4$-alkoxy-$C_1$-$C_4$-alkyl, $C_2$-$C_{10}$-alkenyl, $C_2$-$C_{10}$-haloalkenyl, $C_2$-$C_{10}$-alkynyl, $C_3$-$C_{10}$-haloalkynyl, $C_1$-$C_5$-alkylene-CN, $OR^a$, $C_1$-$C_5$-alkylene-$OR^a$, $C(Y)R^b$, $C_1$-$C_5$-alkylene-C(Y)$R^b$, $C(Y)OR^c$, $C_1$-$C_5$-alkylene-C(Y)$OR^c$, $S(O)_2R^d$, $NR^eR^f$, $C_1$-$C_5$-alkylene-$NR^eR^f$, $C(Y)NR^gR^h$, $C_1$-$C_5$-alkylene-C(Y)$NR^gR^h$, $S(O)_mNR^eR^f$, $C(Y)NR^iNR^eR^f$, $C_1$-$C_5$-alkylene-$S(O)_2R^d$, $C_1$-$C_5$-alkylene-$S(O)_mNR^eR^f$, $C_1$-$C_5$-alkylene-C(Y)$NR^iNR^eR^f$, aryl, 3- to 10-membered heterocyclyl, hetaryl, $C_3$-$C_{10}$-cycloalkyl-$C_1$-$C_5$-alkyl, 3- to 10-membered heterocyclyl-$C_1$-$C_5$-alkyl, or hetaryl-$C_1$-$C_5$-alkyl, wherein the cyclic moieties are unsubstituted or substituted with one or more, same or different substituents $R^y$ and/or $R^x$;

$R^2$ is H, CN, $NO_2$, $C_1$-$C_{10}$-alkyl, $C_2$-$C_{10}$-alkenyl, $C_2$-$C_{10}$-alkynyl, $L^1$-$C_3$-$C_{10}$-cycloalkyl, $L^1$-(3- to 6-membered heterocyclyl), $L^1$-aryl, or $L^1$-heteroaryl, which heterocyclyl groups contain one or more, same or different heteroatoms O, N, $S(O)_m$ or $NR^{3A}$, which cyclic groups may contain one or more groups CO, and wherein the groups are unsubstituted or substituted with one or more, same or different substituents $R^x$; wherein $L^1$ is a direct bond, $C_1$-$C_8$-alkylene, $C_2$-$C_8$-alkenylene, $C_2$-$C_8$-alkynylene, or $C_3$-$C_6$-cycloalkylene, wherein the C-atoms are unsubstituted or substituted with one or more, same or different substituents $R^x$;

$R^3$ is H, halogen, CN, $C_1$-$C_{10}$-alkyl, $C_1$-$C_{10}$-haloalkyl, $C_1$-$C_{10}$-alkoxy, or $C_1$-$C_{10}$-haloalkoxy;

$R^4$, $R^5$ are independently (i) H, CN, $NO_2$, halogen, $C_1$-$C_{10}$-alkyl, $C_2$-$C_{10}$-alkenyl, or $C_2$-$C_{10}$-alkynyl, wherein the C-atoms are unsubstituted or substituted with one or more, same or different substituents $R^x$; or $OR^a$, $SR^d$, $C(Y)R^b$, $C(Y)OR^c$, $S(O)R^d$, $S(O)_2R^d$, $NR^eR^f$, $C(Y)NR^gR^h$, $S(O)_mNR^eR^f$, $C(Y)NR^iNR^eR^f$, $C_1$-$C_5$-alkylene-$OR^a$, $C_1$-$C_5$-alkylene-CN, $C_1$-$C_5$-alkylene-C(Y)$R^b$, $C_1$-$C_5$-alkylene-C(Y)$OR^c$, $C_1$-$C_5$-alkylene-$NR^eR^f$, $C_1$-$C_5$-alkylene-C(Y)$NR^gR^b$, $C_1$-$C_5$-alkylene-$S(O)_mR^d$, $C_1$-$C_5$-alkylene-$S(O)_mN-R^eR^f$, $C_1$-$C_5$-alkylene-$NR^iNR^eR^f$; or 3- to 10-membered heterocyclyl, hetaryl, $C_3$-$C_{10}$-cycloalkyl, $C_3$-$C_{10}$-cycloalkenyl, aryl, 3- to 10-membered heterocyclyl-$C_1$-$C_5$-alkyl, hetaryl-$C_1$-$C_5$-alkyl, $C_3$-$C_{10}$-cycloalkyl-$C_1$-$C_5$-alkyl, $C_3$-$C_{10}$-cycloalkenyl-$C_1$-$C_5$-alkyl, or aryl-$C_1$-$C_5$-alkyl, wherein the cyclic moieties are unsubstituted or substituted with one or more, same or different substituents $R^y$;

or $R^4$ is (ii) $L^2$-$C_3$-$C_{10}$-cycloalkenyl, $L^2$-$C_3$-$C_{10}$-cycloalkenyloxy, or $L^2$-$C_3$-$C_{10}$-cycloalkenylthio, wherein the cycloalkenyl rings are unsubstituted or substituted with one or more, same or different substituents $R^y$; wherein $L^2$ is $C_1$-$C_8$-alkylene, $C_2$-$C_8$-alkenylene, $C_2$-$C_8$-alkynylene, or $C_3$-$C_6$-cycloalkylene, wherein the C-atoms are unsubstituted or substituted with one or more, same or different substituents $R^x$;

or $R^4$ is (iii) any one of the following groups

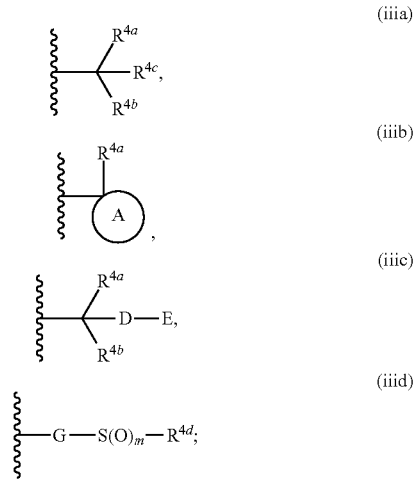

wherein $R^{4a}$, $R^{4b}$ and $R^{4c}$ are independently of each other H, halogen, CN, $NO_2$, $C_1$-$C_{10}$-alkyl, $C_2$-$C_{10}$-alkenyl, or $C_2$-$C_{10}$-alkynyl, wherein the C-atoms are unsubstituted or substituted with one or more, same or different substituents $R^x$;

$C_1$-$C_{10}$-haloalkyl, $C_1$-$C_{10}$-alkoxy, or $C_1$-$C_4$-alkoxy-$C_1$-$C_{10}$-alkyl, wherein the C-atoms are unsubstituted or substituted with one or more, same or different substituents $R^y$; $OR^a$, $SR^a$, $C(Y)R^b$, $C(Y)OR^c$, $C(Y)NR^gR^h$, $C(Y)NR^iNR^eR^f$, $S(O)_mR^d$, $S(O)_mNR^eR^f$, $C_1$-$C_5$-alkylene-$OR^a$, $C_1$-$C_5$-alkylene-CN, $C_1$-$C_5$-alkylene-$C(Y)R^b$, $C_1$-$C_5$-alkylene-$C(Y)OR^c$, $C_1$-$C_5$-alkylene-$NR^eR^f$, $C_1$-$C_5$-alkylene-$C(Y)NR^gR^h$, $C_1$-$C_5$-alkylene-$S(O)_mR^d$, $C_1$-$C_5$-alkylene-$S(O)_mNR^eR^f$, or $C_1$-$C_5$-alkylene-$NR^iNR^eR^f$;

3- to 10-membered heterocyclyl, $C_3$-$C_{10}$-cycloalkyl, $C_3$-$C_{10}$-cycloalkenyl, hetaryl, aryl, 3- to 10-membered heterocyclyl-$C_1$-$C_5$-alkyl, $C_3$-$C_{10}$-cycloalkyl-$C_1$-$C_5$-alkyl, $C_3$-$C_{10}$-cycloalkenyl-$C_1$-$C_5$-alkyl, hetaryl-$C_1$-$C_5$-alkyl, or aryl-$C_1$-$C_5$-alkyl, wherein the cyclic moieties are unsubstituted or substituted with one or more, same or different substituents $R^y$;

A is a 3- to 12-membered non-aromatic carbo- or heterocycle, which heterocycle contains one or more, same or different heteroatoms N, O, or S, wherein S may be oxidised, and which carbo- or heterocycles are unsubstituted or substituted with one or more, same or different substituents $R^i$ and/or $R^l$;

D is a direct bond, $C_1$-$C_6$-alkylene, $C_2$-$C_6$-alkenylene, or $C_2$-$C_6$-alkynylene, which carbon chains are unsubstituted or substituted with one or more, same or different substituents $R^n$;

E is a non-aromatic 3- to 12-membered carbo- or heterocycle, which heterocycle contains one or more, same or different heteroatoms N, O, or S, wherein S may be oxidised, and which carbo- or heterocycles are unsubstituted or substituted with one or more, same or different substituents $R^n$ and/or $R^l$;

$R^{4d}$ is $C_1$-$C_4$-haloalkyl or $C_3$-$C_6$-cycloalkyl, which may each be halogenated;

G is $C_1$-$C_5$-alkylene, $C_2$-$C_6$-alkenylene, $C_2$-$C_6$-alkynylene, $C_3$-$C_6$-cycloalkylene, or $C_3$-$C_6$-cycloalkenylene, wherein the C-atoms are unsubstituted or substituted with one or more, same or different substituents $R^p$;

or $R^4$ is (iv) any one of the following groups

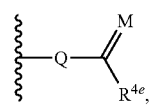

(iva)

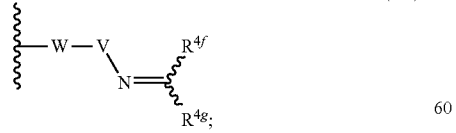

(ivb)

wherein $R^{4e}$ is H, $C_1$-$C_8$-alkyl, $C_2$-$C_8$-alkenyl, $C_2$-$C_8$-alkynyl, $C_3$-$C_6$-cycloalkyl, $C_3$-$C_6$-cycloalkenyl, or a 3- to 6-membered heterocycle, which heterocycle contains one or more, same or different heteroatoms N, O, or S, wherein S may be oxidised, which groups are unsubstituted or substituted with one or more, same or different substituents $R^r$ and/or $R^l$;

Q is a direct bond, $C_1$-$C_8$-alkylene, $C_2$-$C_8$-alkenylene, or $C_2$-$C_8$-alkynylene, which carbon chains are unsubstituted or substituted with one or more, same or different substituents $R^1$; or Q and $R^{4e}$ together form a 3- to 6-membered carbocyclic ring, or a 4- to 6-membered heterocycle with a direct bond to the imidazole, which heterocycle contains one or more, same or different heteroatoms N, O, or S, wherein S may be oxidized, and which rings are unsubstituted or substituted with one or more, same or different substituents $R^f$ and/or $R^l$;

M is O, S, $NR^M$, $NOR^M$, or $NSR^M$; wherein $R^M$ is a group mentioned for $R^{4e}$, or wherein $R^M$ and Q together form a 4- to 6-membered unsaturated, non-aromatic N-containing heterocycle, which heterocycle may contain an additional heteroatom O, or S, wherein S may be oxidized, and which ring is unsubstituted or substituted with one or more, same or different substituents $R^1$;

$R^{4g}$ is H, $C_3$-$C_6$-cycloalkyl, or $C_3$-$C_6$-cycloalkyl-X; and $R^{4f}$ is $C_1$-$C_6$-alkyl, $C_3$-$C_6$-cycloalkyl, or $C_3$-$C_6$-cycloalkyl-X; wherein the $C_6$-alkyl or $C_3$-$C_6$-cycloalkyl groups are unsubstituted or substituted with one or more, same or different substituents $R^t$; wherein X is O, S, NH or $NR^l$; or $R^{4g}$ and $R^{4f}$ together with the carbon atom to which they are bonded form a 3- to 8-membered, saturated or unsaturated carbo- or heterocycle, which heterocycle contains one or more, same or different heteroatoms N, O, or S, wherein S may be oxidized, and wherein the carbo- or heterocycles are unsubstituted or substituted with one or more, same or different substituents $R^t$ and/or $R^l$;

W is $C_1$-$C_8$-alkylene, $C_3$-$C_8$-cycloalkylene, $C_3$-$C_8$-heterocycloalkylene, $C_2$-$C_8$-alkenylene, $C_3$-$C_8$-cycloalkenylene, $C_3$-$C_8$-heterocycloalkenylene, or $C_2$-$C_8$-alkynylene, wherein W is unsubstituted or substituted with one or more, same or different substituents $R^t$ and/or $R^l$;

V is O, S or $NR^{1a}$, wherein $R^{1a}$ is H, $C_3$-$C_{10}$-cycloalkyl, $C_3$-$C_{10}$-cycloalkylmethyl, $C_3$-$C_{10}$-halocycloalkyl, $C_2$-$C_{10}$-alkenyl, $C_2$-$C_{10}$-haloalkenyl, $C_2$-$C_{10}$-alkynyl, $C_1$-$C_4$-alkyl, $ORE$, 3- to 10-membered heterocyclyl, 3- to 10-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$; or wherein $R^{1a}$ and $R^{4g}$ together with the carbon atom to which $R^{4g}$ is bonded and the nitrogen atom to which $R^{1a}$ is bonded as well as the nitrogen atom between said carbon atom and said nitrogen atom form a 4- to 8-membered heterocycle, which contains the two nitrogen atoms as heteroatoms, and may further contain one or more, same or different heteroatoms N, O, or S, wherein S may be oxidized, and wherein the heterocycle is unsubstituted or substituted with one or more, same or different substituents $R^t$ and/or $R^l$;

or $R^4$ is (v) any one of the groups (va) $S(O)_m$—$R^{4h}$, (vb) O—$R^{4i}$, or (vc) $NR^{4j}R^{4k}$;

wherein $R^{4h}$, $R^{4i}$ are independently of each other CN;
- $C_2$-$C_8$-alkenyl, or $C_2$-$C_8$-alkynyl, which aliphatic groups are unsubstituted or substituted by one or more, same or different substituents $R^{41}$;
- $C_3$-$C_8$-cycloalkyl, $C_5$-$C_8$-cycloalkenyl, or 3- to 8-membered heterocyclyl, which heterocyclyl group contains one or more, same or different heteroatoms O, N, S(O)m or
- $NR^{3A}$, which cyclic groups may contain one or more, same or different groups $C(G^A)R^{2A}$, and which cyclic groups are unsubstituted or substituted by one or more, same or different substituents $R^{44}$;
- $C_5$-$C_8$-cycloalkenyl-$C_1$-$C_4$-alkyl, or 3- to 8-membered heterocyclyl-$C_1$-$C_4$-alkyl, which heterocyclyl group contains one or more, same or different heteroatoms O, N, S(O)m or $NR^{3A}$, which cyclic groups may contain one or more, same or different groups $C(G^A)R^{2A}$, and wherein the C-atoms of these groups are unsubstituted or substituted by one or more, same or different substituents $R^{44}$; aryl or hetaryl, which cyclic groups are unsubstituted or substituted by one or more, same or different substituents $R^{45}$; or
- aryl-$C_1$-$C_4$-alkyl or hetaryl-$C_1$-$C_4$-alkyl, wherein the C-atoms of these groups are unsubstituted or substituted by one or more, same or different substituents $R^{46}$;

wherein $G^A$ is O, N—CN, or N—$OR^{2A}$;

$R^{2A}$ is H; $C_2$-$C_8$-alkenyl, or $C_2$-$C_8$-alkynyl, which aliphatic groups are unsubstituted or substituted by one or more, same or different substituents $R^{43}$;
- $C_3$-$C_8$-cycloalkyl, $C_5$-$C_8$-cycloalkenyl, or 3- to 8-membered heterocyclyl, which heterocyclyl group contains one or more, same or different heteroatoms O or $S(O)_m$, and which cyclic groups are unsubstituted or substituted by one or more, same or different substituents $R^{44}$;
- $C_3$-$C_8$-cycloalkenyl-$C_1$-$C_4$-alkyl, or 3- to 8-membered heterocyclyl-$C_1$-$C_4$-alkyl, which heterocyclyl group contains one or more, same or different heteroatoms O or $S(O)_m$, and wherein the C-atoms of these groups are unsubstituted or substituted by one or more, same or different substituents $R^{44}$;
- aryl or hetaryl, which cyclic groups are unsubstituted or substituted by one or more, same or different substituents $R^{46}$; or
- aryl-$C_1$-$C_4$-alkyl or hetaryl-$C_1$-$C_4$-alkyl, wherein the C-atoms of these groups are unsubstituted or substituted by one or more, same or different substituents $R^{46}$;

$R^{3A}$ is H; $C_3$-$C_6$-alkenyl, or $C_3$-$C_6$-alkynyl, which aliphatic groups are unsubstituted or substituted by one or more, same or different substituents $R^{43}$; or $CONR^{2A}R^{4A}$ or $COR^{2A}$;

$R^{4A}$ is H; $C_3$-$C_6$-alkenyl, or $C_3$-$C_6$-alkynyl, which aliphatic groups are unsubstituted or substituted by one or more, same or different substituents $R^{43}$;

and wherein $R^{4j}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;
- $C_3$-$C_8$-cycloalkyl, which cyclic groups are unsubstituted or substituted by one or more, same or different substituents $R^{44}$; or
- $C(O)R^{2B}$, $C(O)NR^{3B}R^{4B}$, $C(O)OR^{5B}$, $SO_2R^{6B}$;

$R^{4k}$ is H; $NR^{3aB}R^{4aB}$;
- $C_1$-$C_8$-alkyl, $C_2$-$C_8$-alkenyl, $C_2$-$C_8$-alkynyl, or $C_1$-$C_4$-alkoxy, which aliphatic groups are unsubstituted or substituted by one or more, same or different substituents $R^{43}$;
- $C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$ or $NR^{4aB}$, which cyclic groups may contain one or more groups CO, and wherein the C-atoms of these groups are unsubstituted or substituted by one or more, same or different substituents $R^{44}$; or
- aryl, aryl-$C_1$-$C_4$-alkyl, hetaryl, or hetaryl-$C_1$-$C_4$-alkyl, wherein the C-atoms of these groups are unsubstituted or substituted by one or more, same or different substituents $R^{46}$; or $R^{4j}$ and $R^{4k}$ together with the nitrogen atom to which they are bonded form a 3 to 7-membered heterocycle, which heterocycle contains the nitrogen atom as heteroatom, and may further contain one or more, same or different heteroatoms O, N, $S(O)_m$ or N, and which rings are unsubstituted or substituted with one or more, same or different substituents $R^{48}$;

wherein $R^{2B}$, $R^{3B}$, $R^{4B}$ are independently of each other H; $C_2$-$C_8$-alkenyl, or $C_2$-$C_8$-alkynyl, which aliphatic groups are unsubstituted or substituted by one or more, same or different substituents $R^{43}$;
- $C_3$-$C_8$-cycloalkyl, which cyclic groups are unsubstituted or substituted by one or more, same or different substituents $R^{44}$;
- aryl or hetaryl, which cyclic groups are unsubstituted or substituted by one or more, same or different substituents $R^{46}$; or
- aryl-$C_1$-$C_4$-alkyl or hetaryl-$C_1$-$C_4$-alkyl, which groups are unsubstituted or substituted by one or more, same or different substituents $R^{46}$;

$R^{3aB}$ is H; $C_1$-$C_8$-alkyl, which aliphatic groups are unsubstituted or substituted by one or more, same or different substituents $R^{43}$;
- $C_3$-$C_8$-cycloalkyl, which cyclic groups are unsubstituted or substituted by one or more, same or different substituents $R^{44}$;
- aryl or hetaryl, which cyclic groups are unsubstituted or substituted by one or more, same or different substituents $R^{46}$; or
- aryl-$C_1$-$C_4$-alkyl or hetaryl-$C_1$-$C_4$-alkyl, which groups are unsubstituted or substituted by one or more, same or different substituents $R^{46}$;

$R^{4aB}$ is H; $C_1$-$C_4$-alkyl, which aliphatic groups are unsubstituted or substituted by one or more, same or different substituents selected from halogen or $C_1$-$C_4$-alkoxy;
- $C_3$-$C_6$-cycloalkyl, which cyclic groups are unsubstituted or substituted by one or more, same or different substituents $R^{44}$; or
- $C(O)R^{2B}$, $C(O)OR^{5B}$, or $SO_2R^{6B}$ $R^{5B}$ is $C_1$-$C_8$-alkyl, $C_2$-$C_8$-alkenyl, or $C_2$-$C_8$-alkynyl, which aliphatic groups are unsubstituted or substituted by one or more, same or different substituents selected from halogen or $C_1$-$C_4$-alkoxy; or
- $C_3$-$C_6$-cycloalkyl, which cyclic groups are unsubstituted or substituted by one or more, same or different substituents $R^{44}$;

$R^{6B}$ is $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_6$-cycloalkyl, which cyclic groups are unsubstituted or substituted by one or more, same or different substituents $R^{44}$; or aryl or hetaryl, which cyclic groups are unsubstituted or substituted by one or more, same or different substituents $R^{46}$;

or $R^4$ is (vi) any one of the groups (via) $C(T^1)R^{4l}$, (vib) $C(O)OR^{4m}$, (vic) $C(Y)NR^{4n}R^{4o}$, or (vid) $C(Y)NR^{4p}NR^{4q}R^{4r}$;

wherein $R^{4l}$ is H; $C_1$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, or 3- to 8-membered heterocyclyl, which heterocyclyl group contains one or more, same or different heteroatoms O, or $S(O)_m$, and which cyclic groups are unsubstituted or substituted by one or more, same or different substituents $R^{44}$;

$C_3$-$C_8$-cycloalkyl-$C_1$-$C_4$-alkyl, or 3- to 8-membered heterocyclyl-$C_1$-$C_4$-alkyl, which heterocyclyl group contains one or more, same or different heteroatoms O, or $S(O)_m$ and wherein the C-atoms of these groups are unsubstituted or substituted by one or more, same or different substituents $R^{44}$;

aryl or hetaryl, which cyclic groups are unsubstituted or substituted by one or more, same or different substituents $R^{46}$; or aryl-$C_1$-$C_4$-alkyl or hetaryl-$C_1$-$C_4$-alkyl, wherein the C-atoms of these groups are unsubstituted or substituted by one or more, same or different substituents $R^{46}$;

and wherein $T^1$ is O, N—$OR^{1C}$, N—$NR^{2C}R^{3C}$, or

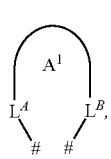

wherein # are the bonds to the carbon atom of the $C(T^1)$ moiety of the $C(T^1)R^{4l}$ group; and wherein $L^A$ and $L^B$ are independently from each other O, or $S(O)_m$; and $A^1$ is $C_2$-$C_4$-alkylene, wherein the C-atoms are unsubstituted or substituted with one or more, same or different substituents $R^{4C}$;

and wherein $R^{1C}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, which cyclic groups are unsubstituted or substituted by one or more, same or different substituents $R^{44}$;

$C_3$-$C_8$-cycloalkyl-$C_1$-$C_4$-alkyl, wherein the C-atoms of these groups are unsubstituted or substituted by one or more, same or different substituents $R^{44}$;

aryl-$C_1$-$C_4$-alkyl or hetaryl-$C_1$-$C_4$-alkyl, wherein the C-atoms of these groups are unsubstituted or substituted by one or more, same or different substituents $R^{46}$;

$R^{2C}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which groups are unsubstituted or substituted by one or more, same or different substituents $R^{44}$;

$R^{3C}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl groups contain one or more, same or different heteroatoms O, N, $S(O)_m$ or $NR^{3A}$, which cyclic groups may contain one or more groups CO, and wherein the C-atoms of these groups are unsubstituted or substituted by one or more, same or different substituents $R^{44}$;

aryl, hetaryl, aryl-$C_1$-$C_4$-alkyl or hetaryl-$C_1$-$C_4$-alkyl, which groups are unsubstituted or substituted by one or more, same or different substituents $R^{46}$;

$R^{4C}$ is halogen; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

aryl, wherein these groups are unsubstituted or substituted by one or more, same or different substituents $R^{46}$; or two $R^{4C}$ bonded to the same carbon atom form a $C_2$-$C_4$-alkylene chain, which chain is unsubstituted or substituted by one or more, same or different substituents $R^{44}$; or two $R^{4C}$ bonded to the same carbon atom form a $C_1$-$C_4$-alkenylene chain with the double bond of the chain being attached to said carbon atom, which chain is unsubstituted or substituted by one or more, same or different substituents $R^{44}$;

$R^{4m}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, which cyclic groups are unsubstituted or substituted by one or more, same or different substituents $R^{44}$;

$C_3$-$C_8$-cycloalkyl-$C_1$-$C_4$-alkyl, wherein the C-atoms of these groups are unsubstituted or substituted by one or more, same or different substituents $R^{44}$;

aryl or hetaryl, which cyclic groups are unsubstituted or substituted by one or more, same or different substituents $R^{46}$; or aryl-$C_1$-$C_4$-alkyl or hetaryl-$C_1$-$C_4$-alkyl, wherein the C-atoms of these groups are unsubstituted or substituted by one or more, same or different substituents $R^{46}$;

$R^{4n}$ is H; $C_1$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_1$-$C_4$-alkylsulfonyl, $C_3$-$C_6$-cycloalkylsulfonyl, $C_1$-$C_4$-alkylcarbonyl, or $C_1$-$C_4$-alkoxycarbonyl, which groups are unsubstituted or substituted by one or more, same or different substituents $R^{44}$; or phenyl-$C_1$-$C_2$-alkoxycarbonyl, wherein the C-atoms of these groups are unsubstituted or substituted by one or more, same or different substituents $R^{46}$;

$R^{4o}$ is H; $C_1$-$C_8$-alkenyl, $C_2$-$C_8$-alkynyl, $C_1$-$C_4$-alkoxy, which aliphatic groups are unsubstituted or substituted by one or more, same or different substituents $R^{42}$;

$C_3$-$C_8$-cycloalkyl, or 3- to 8-membered heterocyclyl, which heterocyclyl group contains one or more, same or different heteroatoms O, N, $S(O)_m$ or $NR^{3A}$, which cyclic groups may contain one or more groups CO, and which cyclic groups are unsubstituted or substituted by one or more, same or different substituents $R^{44}$;

$C_3$-$C_8$-cycloalkyl-$C_1$-$C_4$-alkyl, or 3- to 8-membered heterocyclyl-$C_1$-$C_4$-alkyl, which heterocyclyl group contains one or more, same or different heteroatoms O, N, $S(O)_m$ or $NR^{4A}$, which cyclic groups may contain one or more groups CO, and wherein the C-atoms of these groups are unsubstituted or substituted by one or more, same or different substituents $R^{44}$;

aryl or hetaryl, which cyclic groups are unsubstituted or substituted by one or more, same or different substituents $R^{47}$; or aryl-$C_1$-$C_4$-alkyl or hetaryl-$C_1$-$C_4$-alkyl, wherein the C-atoms of these groups are unsubstituted or substituted by one or more, same or different substituents $R^{47}$; or $R^{4n}$ and $R^{4o}$ together with the nitrogen atom to which they are bonded form a 3- to 8-membered heterocycle, which heterocycle contains one or more, same or different heteroatoms N, O, or S, wherein S may be oxidized, and wherein the heterocycle is unsubstituted or substituted with one or more, same or different substituents $R^{44}$;

$R^{4p}$ is H; $C_1$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which groups are unsubstituted or substituted by one or more, same or different substituents $R^{44}$;

$R^{4q}$ is H; $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which groups are unsubstituted or substituted by one or more, same or different substituents $R^{44}$;

$R^{4r}$ is H; $C_1$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$ or $NR^{3A}$, which cyclic groups may contain one or more, same or different groups CO, and wherein the C-atoms of these groups are unsubstituted or substituted by one or more, same or different substituents $R^{44}$;

aryl, hetaryl, aryl-$C_1$-$C_4$-alkyl or hetaryl-$C_1$-$C_4$-alkyl, which groups are unsubstituted or substituted by one or more, same or different substituents $R^{46}$;

or $R^4$ is
(vii) $R^{4s}$
wherein
$R^{4s}$ is aryl or hetaryl, which cyclic groups are unsubstituted or substituted by one or more, same or different substituents $R^{1D}$;

wherein
$R^{1D}$ is CN, $NO_2$, halogen, $NR^{2D}R^{3D}$; $C_1$-$C_4$-alkyl, $C_1$-$C_4$-alkoxy-$C_1$-$C_4$-alkyl, $C_1$-$C_4$-halogenalkyl, $C_1$-$C_4$-alkoxy, $C_1$-$C_4$-haloalkoxy, $C_1$-$C_4$-alkyl-$S(O)_m$—, $C_1$-$C_4$-haloalkyl-$S(O)_m$—, carboxy; or aryl, or hetaryl, which groups are unsubstituted or substituted with one or more, same or different substituents $R^{46}$; or two adjacent groups $R^{1D}$ form together with the neighbouring atoms to which they are bonded a fused 3- to 8-membered heterocycle, which heterocycle contains one or more, same or different heteroatoms N, O, or S, wherein S may be oxidized, and which heterocycle is unsubstituted or substituted with one or more, same or different substituents $R^{46}$;

$R^{2D}$ is H; $C_1$-$C_4$-alkyl, $C_2$-$C_4$-alkenyl, $C_2$-$C_4$-alkynyl, or $C_3$-$C_6$-cycloalkyl, which groups are unsubstituted or substituted with one or more, same or different substituents $R^{43}$ or $R^{44}$;

$R^{3D}$ is H; $C_1$-$C_4$-alkyl, $C_2$-$C_4$-alkenyl, $C_2$-$C_4$-alkynyl, or $C_3$-$C_6$-cycloalkyl, which groups are unsubstituted or substituted with one or more, same or different substituents $R^{43}$ or $R^{44}$; or $R^{2D}$ and $R^{3D}$ together with the nitrogen atom to which they are bonded form a 3- to 8-membered heterocycle, which heterocycle contains one or more, same or different heteroatoms N, O, or S, wherein S may be oxidized, and which heterocycle is unsubstituted or substituted with one or more, same or different substituents $R^{46}$;

or $R^4$ is
(viii) $CR^{4t}R^{4u}R^{4v}$
wherein
$R^{4t}$ is H; CN; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, or 3- to 8-membered heterocyclyl, which heterocyclyl group contains one or more, same or different heteroatoms O, N, $S(O)_m$ or $NR^{1F}$, which cyclic groups may contain one or more, same or different groups CO, and wherein the C-atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

$R^{4u}$ is H; $C_1$-$C_4$-alkyl, which aliphatic groups are unsubstituted or substituted by one or more, same or different substituents $R^{43}$; or $R^{4t}$ and $R^{4u}$ together with the carbon atom to which they are bonded form a 3- to 8-membered carbocyclic or heterocyclic ring, which heterocyclic ring contains one or more, same or different heteroatoms O, N, $S(O)_m$, or $NR^{1F}$, which cyclic groups may contain one or more, same or different groups CO, and wherein the carbocyclic or heterocyclic ring is unsubstituted or substituted with one or more, same or different substituents $R^{A3}$; or $R^{4t}$ and $R^{4u}$ together are $C_2$-$C_6$-alkenyl, which aliphatic groups are unsubstituted or substituted by one or more, same or different substituents $R^{A3}$;

$R^{4v}$ is H; $S(O)_m R^{1E}$, $OR^{2E}$, or $N(R^{3E})(R^{4E})$,
wherein if $R^{4t}$ and/or $R^{4u}$ is H, or $C_1$-$C_8$-alkyl, which aliphatic groups are unsubstituted or substituted by one or more, same or different substituents $R^{A3}$, $R^{4v}$ is $S(O)_m R^{1E}$, $OR^{2E}$, or $N(R^{3E})(R^{4E})$;

$R^{1E}$ is $C_1$-$C_8$-alkyl, $C_3$-$C_8$-alkenyl, or $C_3$-$C_8$-alkynyl, which aliphatic groups are unsubstituted or substituted by one or more, same or different substituents $R^{A9}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

$R^{2E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A9}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

$R^{3E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

$R^{4E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$; or $C(O)N(R^{5E})(R^{6E})$, $C(O)R^{7E}$, $C(O)OR^{8E}$, or $SO_2R^{9E}$; or $R^{3E}$ and $R^{4E}$ together with the nitrogen atom to which they are bonded form a 3- to 9-membered heterocycle, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A8}$; or $R^{5E}$ and $R^{6E}$ are independently of each other H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, or 3- to 8-membered heterocyclyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$; or $R^{5E}$ and $R^{6E}$ together with the nitrogen atom to which they are bonded form a 3- to 8-membered heterocyclic ring, which heterocyclic ring contains one or more, same or different heteroatoms O, or $S(O)_m$, and which heterocycle is unsubstituted or substituted with one or more, same or different substituents $R^{A19}$;

$R^{7E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, S(O)$_m$, or NR$^{1F}$, which cyclic groups may contain one or more, same or different groups CO, and wherein the C-atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

$R^{8E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, S(O)$_m$, or NR$^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, S(O)$_m$, or NR$^{1F}$, which cyclic groups may contain one or more, same or different groups CO, and wherein the C-atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

$R^{9E}$ is $C_1$-$C_8$-alkyl, $C_3$-$C_8$-alkenyl, or $C_3$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, S(O)$_m$, or NR$^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, S(O)$_m$, or NR$^{1F}$, which cyclic groups may contain one or more, same or different groups CO, and wherein the C-atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

$R^{1F}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, wherein the C-atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

and wherein $R^a$, $R^b$, $R^c$ are independently of each other H, $C_1$-$C_4$-haloalkyl, $C_3$-$C_6$-cycloalkyl, $C_3$-$C_6$-cycloalkylmethyl, $C_3$-$C_6$-halocycloalkyl, $C_3$-$C_6$-cycloalkenyl, $C_3$-$C_6$-cycloalkenylmethyl, $C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, 3- to 6-membered heterocyclyl, 3- to 6-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$, $R^d$ is H, $C_1$-$C_4$-alkoxy, $C_1$-$C_4$-haloalkyl, $C_3$-$C_6$-cycloalkyl, $C_3$-$C_6$-cycloalkylmethyl, $C_3$-$C_6$-halocycloalkyl, $C_3$-$C_6$-cycloalkenyl, $C_3$-$C_6$-cycloalkenylmethyl, $C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, 3- to 6-membered heterocyclyl, 3- to 6-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$;

$R^e$, $R^f$ are independently of each other H, $C_1$-$C_8$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_3$-$C_6$-cycloalkenyl, $C_3$-$C_6$-cycloalkenylmethyl, $C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, $C_1$-$C_4$-alkylcarbonyl, $C_1$-$C_4$-haloalkylcarbonyl, $C_1$-$C_4$-alkylsulfonyl, $C_1$-$C_4$-haloalkylsulfonyl, 3- to 6-membered heterocyclyl, 3- to 6-membered heterocyclyl-$C_1$-$C_4$-alkyl, 3- to 6-membered heterocyclylcarbonyl, 3- to 6-membered heterocyclyl-$C_1$-$C_4$-alkyl-carbonyl, 3- to 6-membered heterocyclyl-$C_1$-$C_4$-alkyl-sulfonyl, aryl, arylcarbonyl, aryl-$C_1$-$C_4$-alkyl-carbonyl, arylsulfonyl, hetaryl, hetaryl-$C_1$-$C_4$-alkyl-carbonyl, hetarylcarbonyl, hetarylsulfonyl, aryl-$C_1$-$C_4$-alkyl, or hetaryl-$C_1$-$C_4$-alkyl, wherein the cyclic moieties are unsubstituted or substituted with one or more, same or different substituents $R^{aa}$; or $R^e$ and $R^f$ together with the nitrogen atom to which they are bonded form a 5- or 6-membered, saturated or unsaturated heterocycle, which may contain a further heteroatom O, S, or N, wherein S may be oxidized, and wherein the heterocycles are unsubstituted or substituted with one or more, same or different substituents $R^{aa}$;

$R^g$, $R^h$ are independently of each other H, $C_1$-$C_4$-alkyl, $C_1$-$C_4$-haloalkyl, L-$C_3$-$C_6$-cycloalkyl, L-$C_3$-$C_6$-halocycloalkyl, L-$C_3$-$C_6$-cycloalkenyl, L-$C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, 3- to 6-membered heterocyclyl, 3- to 6-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$;

$R^i$ is H, CN, $C_1$-$C_4$-alkoxy, $C_1$-$C_4$-haloalkyl, L-$C_3$-$C_6$-cycloalkyl, L-$C_3$-$C_6$-halocycloalkyl, L-$C_3$-$C_6$-cycloalkenyl, L-$C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, aryl, or aryl-$C_1$-$C_4$-alkyl, wherein the aryl rings are unsubstituted or substituted with one or more, same or different substituents $R^{aa}$;

$R^j$ bonded to C is halogen, OH, CN, $NO_2$, $C_1$-$C_{10}$-alkyl, $C_1$-$C_{10}$-haloalkyl, $C_1$-$C_{10}$-alkoxy, $C_1$-$C_{10}$-haloalkoxy, $S(O)_m R^k$, $C_3$-$C_6$-cycloalkyl, or 3- to 6-membered heterocycle, which heterocycle contains one or more, same or different heteroatoms N, O, or S, wherein S may be oxidized, which $R^j$ groups are unsubstituted or substituted with one or more, same or different substituents $R^m$ and/or $R^l$, and wherein two groups $R^j$ connected to the same or adjacent ring atoms may together form a 3- to 6-membered carbo- or heterocycle, which heterocycle contains one or more, same or different heteroatoms N, O, or S, wherein S may be oxidised, which cycles are unsubstituted or substituted with one or more, same or different substituents $R^m$ and/or $R^l$;

$R^k$ is H, $C_1$-$C_4$-haloalkyl, or $C_3$-$C_6$-cycloalkyl, which cycle is unsubstituted or substituted with one or more, same or different substituents $R^l$;

$R^l$ bonded to N is $C_1$-$C_4$-alkyl, $C_1$-$C_4$-haloalkyl, $C_1$-$C_4$-alkylcarbonyl, $C_1$-$C_4$-haloalkylcarbonyl, or $C_1$-$C_4$-alkoxycarbonyl;

$R^m$ bonded to C is halogen, OH, CN, $NO_2$, $C_1$-$C_4$-alkyl, $C_1$-$C_4$-haloalkyl, $C_3$-$C_6$-cycloalkyl, $C_1$-$C_4$-alkoxy, $C_1$-$C_4$-haloalkoxy, or $S(O)_m R^k$;

$R^n$ bonded to C is halogen, CN, $NO_2$, $C_1$-$C_2$-alkyl, $C_1$-$C_4$-haloalkyl, $C_2$-$C_6$-alkenyl, $C_2$-$C_6$-alkynyl, $C_3$-$C_6$-cycloalkyl, $C_3$-$C_6$-cycloalkenyl, $C_1$-$C_4$-alkoxy, $C_1$-$C_4$-haloalkoxy, $C_1$-$C_4$-alkylidene, =O, =S, $=NR^{1o}$, $=NOR^{1o}$, $=NSR^{1o}$, or $S(O)_m R^{1o}$, or two adjacent groups $R^n$ form together with the atoms to which they are bonded a 3- to 8-membered carbo- or heterocycle, which heterocycle contains one or more, same or different heteroatoms N, O, or S, wherein S may be oxidised, which cyclic $R^n$ moieties are unsubstituted or substituted with one or more, same or different substituents halogen, $R^o$, and/or $R^l$;

$R^{1o}$ is H, $C_1$-$C_4$-alkyl, $C_1$-$C_4$-haloalkyl, $C_3$-$C_6$-cycloalkyl, or $C_1$-$C_4$-alkoxy;

$R^o$ bonded to C is $C_1$-$C_4$-alkyl, $C_3$-$C_6$-cycloalkyl, $C_1$-$C_4$-alkoxy, $C_1$-$C_4$-alkylcarbonyl, $C_1$-$C_4$-haloalkylcarbonyl, or $C_1$-$C_4$-alkoxycarbonyl;

$R^p$ is halogen, CN, $NO_2$, $C_1$-$C_2$-haloalkyl, $C_3$-$C_6$-cycloalkyl, $C_1$-$C_4$-alkoxy, or $C_1$-$C_2$-haloalkoxy, or two groups $R^p$ can together form a 3- to 6-membered carbo- or heterocycle, which heterocycle contains one or more, same or different heteroatoms N, O, or S, wherein S may be oxidised, which carbo- or heterocycle is unsubstituted or substituted with one or more, same or different substituents $R^q$;

$R^q$ is halogen, CN, $NO_2$, $C_1$-$C_4$-alkyl, $C_1$-$C_4$-haloalkyl, $C_3$-$C_6$-cycloalkyl, $C_1$-$C_4$-alkoxy, or $C_1$-$C_4$-haloalkoxy;

$R^r$ bonded to C is halogen, CN, $NO_2$, $C_1$-$C_2$-alkyl, $C_1$-$C_2$-haloalkyl, $C_1$-$C_4$-alkoxy, $C_1$-$C_2$-haloalkoxy, or $S(O)_m R^k$; or two groups $R^r$ together form a 3- to 6-membered carbo- or heterocycle, which heterocycle contains one or more, same or different heteroatoms N, O, or S, wherein S may be oxidized, and which carbo- or heterocycles are unsubstituted or substituted with $R^s$;

$R^s$ is halogen, CN, $NO_2$, $C_1$-$C_2$-alkyl, $C_1$-$C_2$-haloalkyl, $C_3$-$C_6$-cycloalkyl, $C_1$-$C_4$-alkoxy, or $C_1$-$C_2$-haloalkoxy;

$R^t$ bonded to C is halogen, $NO_2$, CN, $C_1$-$C_6$-alkyl, $C_1$-$C_6$-alkoxy, $C_1$-$C_6$-haloalkyl, $C_1$-$C_6$-haloalkoxy, $C_3$-$C_6$-cycloalkyl, $C_3$-$C_6$-cycloalkoxy, $C_3$-$C_6$-halocycloalkyl, $C_3$-$C_6$-halocycloalkoxy, $C_2$-$C_4$-alkenyl, $C_2$-$C_4$-alkynyl, $S(O)_m R^w$, =O, =S, $=NR^v$, $=NOR^v$, or $=NSR^v$; or two $R^t$ bonded to the same carbon atom or to adjacent carbon atoms together with the carbon atom(s) to which they are bonded form a 3- to 6-membered, saturated or unsaturated carbo- or heterocycle, which heterocycle contains one or more, same or different heteroatoms N, O, or S, wherein S may be oxidized, wherein N is unsubstituted or substituted with one or more, same or different substituents $R^l$;

$R^v$ is $C_1$-$C_4$-alkyl, $C_1$-$C_4$-haloalkyl, $C_3$-$C_6$-cycloalkyl, or $C_3$-$C_6$-halocycloalkyl;

$R^w$ is H, $C_1$-$C_4$-alkyl, $C_3$-$C_6$-cycloalkyl, $C_3$-$C_6$-halocycloalkyl, $C_1$-$C_4$-alkoxy, or $C_1$-$C_4$-haloalkoxy;

$R^x$ is halogen, CN, $NO_2$, $C_1$-$C_4$-alkoxy, $C_1$-$C_4$-haloalkoxy, $C_1$-$C_4$-alkoxy, $C_1$-$C_4$-haloalkoxy, $S(O)_m R^d$, $S(O)_m NR^e R^f$, $NR^e R^f$, $C(O)NR^g R^h$, $C_1$-$C_{10}$-alkylcarbonyl, $C_1$-$C_4$-haloalkylcarbonyl, $C_1$-$C_4$-alkoxycarbonyl, $C_1$-$C_4$-haloalkoxycarbonyl, $C_3$-$C_6$-cycloalkyl, 5- to 7-membered heterocyclyl, 5- or 6-membered hetaryl, aryl, $C_3$-$C_6$-cycloalkoxy, 3- to 6-membered heterocyclyloxy, or phenoxy, wherein the cyclic moieties are unsubstituted or substituted with one or more, same or different substituents $R^y$;

$R^y$ is halogen, CN, $NO_2$, $C_1$-$C_4$-alkyl, $C_1$-$C_4$-haloalkyl, $C_1$-$C_4$-alkoxy, $C_1$-$C_4$-haloalkoxy, $S(O)_m R^d$, $S(O)_m NR^e R^f$, $C_1$-$C_4$-alkylcarbonyl, $C_1$-$C_4$-haloalkylcarbonyl, $C_1$-$C_4$-alkoxycarbonyl, $C_1$-$C_4$-haloalkoxycarbonyl, $C_3$-$C_6$-cycloalkyl, $C_3$-$C_6$-halocycloalkyl, $C_2$-$C_4$-alkenyl, $C_2$-$C_4$-haloalkenyl, $C_2$-$C_4$-alkynyl, or $C_1$-$C_4$-alkoxy-$C_1$-$C_4$-alkyl;

$R^{aa}$ is halogen, CN, $NO_2$, $C_1$-$C_4$-alkyl, $C_1$-$C_4$-haloalkyl, $C_1$-$C_4$-alkoxy, or $C_1$-$C_4$-haloalkoxy;

$R^{A1}$ is CN, halogen, $C_1$-$C_4$-alkoxy, $C_1$-$C_4$-alkyl, $C(O)R^{2A}$, $C(O)NR^{2A}R^{3A}$, or $C(G^A)R^{2A}$;

$R^{A2}$ is CN, halogen, OH, $C_1$-$C_4$-alkoxy, $C_1$-$C_4$-alkoxycarbonyl, or $C_1$-$C_4$-alkyl-$S(O)_m$—;

$R^{A3}$ is CN, halogen, $C_1$-$C_4$-alkoxy, or $C_1$-$C_4$-alkyl-$S(O)_m$—;

$R^{A4}$ is CN, halogen, $C_1$-$C_4$-alkyl, $C_1$-$C_4$-haloalkyl, or $C_1$-$C_4$-alkoxy;

$R^{A5}$ is CN, $NO_2$, halogen, oxime ether, acylamido, $C_1$-$C_4$-alkyl, $C_1$-$C_4$-haloalkyl, $C_1$-$C_4$-alkoxy, $C_1$-$C_4$-haloalkoxy, $C_1$-$C_4$-alkyl-$S(O)_m$—, $C_1$-$C_4$-haloalkyl-$S(O)_m$—; or aryl, aryloxy, hetaryl, or hetaryloxy, which aromatic groups are unsubstituted or substituted by one or more, same or different substituents $R^{Z1}$; wherein $R^{Z1}$ is CN, $NO_2$, halogen, $C_1$-$C_4$-alkyl, $C_1$-$C_4$-haloalkyl, $C_1$-$C_4$-alkoxy, $C_1$-$C_4$-haloalkoxy, $C_1$-$C_4$-alkyl-$S(O)_m$—, $C_1$-$C_4$-haloalkyl-$S(O)_m$—, hetaryloxy, or aryloxy;

$R^{A6}$ is CN, $NO_2$, halogen, $C_1$-$C_4$-alkyl, $C_1$-$C_4$-haloalkyl, $C_1$-$C_4$-alkoxy, $C_1$-$C_4$-haloalkoxy, $C_1$-$C_4$-alkyl-$S(O)_m$—, or $C_1$-$C_4$-haloalkyl-$S(O)_m$—;

$R^{A7}$ is CN, $NO_2$, halogen, $C_1$-$C_4$-alkyl, $C_1$-$C_4$-haloalkyl, OH, $C_1$-$C_4$-alkoxy, $C_1$-$C_4$-haloalkoxy, $C_1$-$C_4$-alkyl-S$(O)_m$—, or $C_1$-$C_4$-haloalkyl-$S(O)_m$—;

$R^{A8}$ is H, CN, $NO_2$, $C_1$-$C_4$-alkyl, $C_3$-$C_6$-cycloalkyl, $C_1$-$C_5$-haloalkyl, $C_1$-$C_4$-alkoxy, $C_1$-$C_4$-haloalkoxy, $C_3$-$C_6$-halogencycloalkyl, $C_1$-$C_4$-alkoxy-$C_1$-$C_4$-alkyl, cyano-$C_1$-$C_4$-alkyl, $C_3$-$C_6$-cycloalkyl-$C_1$-$C_4$-alkyl, $C_2$-$C_6$-alkenyl, $C_3$-$C_6$-alkynyl, $C_1$-$C_4$-alkyl-$S(O)_m$—, $C_1$-$C_4$-alkylcarbonyl, $C_1$-$C_6$-haloalkylcarbonyl, $C_1$-$C_6$-alkoxycarbonyl, $C_1$-$C_6$-alkylaminocarbonyl, di-($C_1$-$C_6$)-alkylaminocarbonyl, $C_1$-$C_6$-alkylcarbonylamino, aryl or hetaryl, wherein the aryl or hetaryl groups are unsubstituted or substituted with one or more, same or different substituents $R^{Z2}$; wherein $R^{Z2}$ is CN, NO$_2$, halogen, C$_1$-C$_6$-alkyl, C$_2$-C$_6$-alkenyl, C$_2$-C$_6$-alkynyl, C$_1$-C$_4$-alkoxy, C$_1$-C$_4$-haloalkyl, C$_1$-C$_6$-haloalkoxy, or C$_1$-C$_4$-alkylthio;

$R^{A9}$ is CN, halogen, C$_1$-C$_4$-alkoxy, C$_1$-C$_4$-alkyl-S(O)$_m$—, C(O)OR$^{2A}$, C(O)NR$^{2A}$R$^{3A}$, or C(G$^A$)R$^{2A}$;

$R^{A10}$ is C$_1$-C$_2$-alkyl, C$_1$-C$_2$-haloalkyl, C$_1$-C$_2$-alkoxy;

Y is O or S;

m is 0, 1 or 2;

and the salts, stereoisomers, tautomers, and N-oxides thereof.

Compounds of formula I, and methods for their manufacture, are known and described inter alia in WO2018/029102, WO2016/128298, WO2018/210625, WO2011/009804, WO2010/034737, WO2016/180833, PCT/EP2019/050537, and EP Appl. No. 16197196.5. If some of the compounds falling under the definition of formula I may not be accessible by standard methods, or by the methods as provided in the prior art documents cited in this paragraph, they are accessible from other compounds of formula I by methods and techniques known to the skilled person and as available as common general knowledge.

The term "active ingredients", or "compounds of formula I" comprises the compound(s) as defined herein as well as a stereoisomer, salt, tautomer or N-oxide thereof.

The radicals attached to the backbone of formula I may contain one or more centers of chirality. In this case, the compounds of formula I are present in the form of different enantiomers or diastereomers, depending on the substituents. The present invention relates to every possible stereoisomer of the formula I, i.e. to single enantiomers or diastereomers, as well as to mixtures thereof.

As already indicated above, the compounds of formula I may also be present in the form of different tautomers depending e.g. on the selection of the radical R$^4$. The present invention relates to every possible tautomer of the formula I.

As already indicated above, the compounds of formula I may be present in the form of different geometric isomers depending e.g. on the selection of R$^4$. If geometric isomers are possible, the present invention relates to both, the E- and Z-isomers of the compounds of formula I.

The compounds of formula I may be amorphous or may exist in one or more different crystal line states (polymorphs) which may have different macroscopic properties such as stability or show different biological properties such as activities. The present invention relates to amorphous and crystalline compounds of formula I, mixtures of different crystalline states of the respective compound I, as well as amorphous or crystalline salts thereof.

Salts of the compounds of the formula I are preferably veterinary and/or agriculturally acceptable salts, preferably agriculturally acceptable salts. They can be formed in a customary manner, e.g. by reacting the compound with an acid of the anion in question if the compound of formula I has a basic functionality.

Veterinary and/or agriculturally useful salts of the compounds of formula I encompass especially the acid addition salts of those acids whose cations and anion, respectively, have no ad verse effect on the pesticidal action of the compounds of formula I.

Anions of useful aid addition salts are primarily chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of C$_1$-C$_4$-alkanoic acids, preferably formate, acetate, propionate and butyrate. They can be formed by reacting compounds of formula I with an acid of the corresponding anion, preferably of hydrochloric acid, hydrobromic acid, sulfuric acid, phosphoric acid or nitric acid.

The term "N-oxide" includes any compound of formula I, which has at least one tertiary nitro gen atom that is oxidized to an N-Oxide moiety.

The organic moieties mentioned in the above definitions of the variables are—like the term halogen—collective terms for individual listings of the individual group members. The prefix C$_n$-C$_m$ indicates in each case the possible number of carbon atoms in the group.

The term "halogen" denotes in each case fluorine, bromine, chlorine or iodine, in particular fluorine, chlorine and bromine.

The term "alkyl" as used herein and in the alkyl moieties of alkylamino, alkylcarbonyl, alkylthio, alkylsulfinyl, alkylsulfonyl and alkoxyalkyl denotes in each case a straight-chain or branched alkyl group having usually from 1 to 10 carbon atoms, frequently from 1 to 6 carbon atoms, preferably from 1 to 4 carbon atoms, more preferably from 1 to 3 carbon atoms. Examples of an alkyl group are methyl, ethyl, n-propyl, iso-propyl, n-butyl, 2-butyl, iso-butyl, tert-butyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethyl-butyl, 1,2-dimethylbutyl, 1,3-dimethyl-butyl, 2,2-dimethylbutyl, 2,3-dimethylbutyl, 3,3-dimethyl-butyl, 1-ethyl-butyl, 2-ethylbutyl, 1,1,2-trimethylpropyl, 1,2,2-trimethylpropyl, 1-ethyl-1-methyl-propyl, and 1-ethyl-2-methylpropyl.

The term "haloalkyl" as used herein and in the haloalkyl moieties of haloalkylcarbonyl, haloalkoxycarbonyl, haloalkylthio, haloalkylsulfonyl, haloalkylsulfinyl, haloalkoxy and haloalkoxyalkyl, denotes in each case a straight-chain or branched alkyl group having usually from 1 to 10 carbon atoms, frequently from 1 to 6 carbon atoms, preferably from 1 to 4 carbon atoms, wherein the hydrogen atoms of this group are partially or totally replaced with halogen atoms. Preferred haloalkyl moieties are selected from C$_1$-C$_4$-haloalkyl, more preferably from C$_1$-C$_3$-haloalkyl or C$_1$-C$_2$-haloalkyl, in particular from C$_1$-C$_2$-fluoroalkyl such as fluoromethyl, difluoromethyl, trifluoromethyl, 1-fluoroethyl, 2-fluoroethyl, 2,2-difluoroethyl, 2,2,2-trifluoroethyl, pentafluoroethyl, and the like.

The term "alkoxy" as used herein denotes in each case a straight-chain or branched alkyl group which is bonded via an oxygen atom and has usually from 1 to 10 carbon atoms, frequently from 1 to 6 carbon atoms, preferably 1 to 4 carbon atoms. Examples of an alkoxy group are methoxy, ethoxy, n-propoxy, iso-propoxy, n-butyloxy, 2-butyloxy, iso-butyloxy, tert-butyloxy, and the like.

The term "alkoxyalkyl" as used herein refers to alkyl usually comprising 1 to 10, frequently 1 to 4, preferably 1 to 2 carbon atoms, wherein 1 carbon atom carries an alkoxy radical usually comprising 1 to 4, preferably 1 or 2 carbon atoms as defined above. Examples are CH$_2$OCH$_3$, CH$_2$—OC$_2$H$_5$, 2-(methoxy)ethyl, and 2-(ethoxy)ethyl.

The term "haloalkoxy" as used herein denotes in each case a straight-chain or branched alkoxy group having from 1 to 10 carbon atoms, frequently from 1 to 6 carbon atoms, preferably 1 to 4 carbon atoms, wherein the hydrogen atoms of this group are partially or totally replaced with halogen atoms, in particular fluorine atoms. Preferred haloalkoxy moieties include C$_1$-C$_4$-haloalkoxy, in particular C$_1$-C$_2$-fluoroalkoxy, such as fluoromethoxy, difluoromethoxy, trifluoromethoxy, 1-fluoroethoxy, 2-fluoroethoxy, 2,2-difluoroethoxy, 2,2,2-trifluoroethoxy, 2-chloro-2-fluoroethoxy, 2-chloro-2,2-difluoro-ethoxy, 2,2-dichloro-2-fluoroethoxy, 2,2,2-trichloroethoxy, pentafluoroethoxy and the like.

The term "alkylthio" "(alkylsulfanyl: alkyl-S—)" as used herein refers to a straight-chain or branched saturated alkyl group having 1 to 10 carbon atoms, preferably 1 to 4 carbon atoms (=$C_1$-$C_4$-alkylthio), more preferably 1 to 3 carbon atoms, which is attached via a sulfur atom.

The term "haloalkylthio" as used herein refers to an alkylthio group as mentioned above wherein the hydrogen atoms are partially or fully substituted by fluorine, chlorine, bromine and/or iodine.

The term "alkylsulfinyl" (alkylsulfoxyl: $C_1$-$C_6$-alkyl-S(=O)—), as used herein refers to a straight-chain or branched saturated alkyl group (as mentioned above) having 1 to 10 carbon atoms, preferably 1 to 4 carbon atoms (=$C_1$-$C_4$-alkylsulfinyl), more preferably 1 to 3 carbon atoms bonded through the sulfur atom of the sulfinyl group at any position in the alkyl group.

The term "haloalkylsulfinyl" as used herein refers to an alkylsulfinyl group as mentioned above wherein the hydrogen atoms are partially or fully substituted by fluorine, chlorine, bromine and/or iodine.

The term "alkylsulfonyl" (alkyl-S(=O)$_2$—) as used herein refers to a straight-chain or branched saturated alkyl group having 1 to 10 carbon atoms, preferably 1 to 4 carbon atoms (=$C_1$-$C_4$ alkylsulfonyl), preferably 1 to 3 carbon atoms, which is bonded via the sulfur atom of the sulfonyl group at any position in the alkyl group.

The term "haloalkylsulfonyl" as used herein refers to an alkylsulfonyl group as mentioned above wherein the hydrogen atoms are partially or fully substituted by fluorine, chlorine, bromine and/or iodine.

The term "alkylcarbonyl" refers to an alkyl group as defined above, which is bonded via the carbon atom of a carbonyl group (C=O) to the remainder of the molecule.

The term "haloalkylcarbonyl" refers to an alkylcarbonyl group as mentioned above, wherein the hydrogen atoms are partially or fully substituted by fluorine, chlorine, bromine and/or iodine.

The term "alkoxycarbonyl" refers to an alkylcarbonyl group as defined above, which is bonded via an oxygen atom to the remainder of the molecule.

The term "haloalkoxycarbonyl" refers to an alkoxycarbonyl group as mentioned above, where in the hydrogen atoms are partially or fully substituted by fluorine, chlorine, bromine and/or iodine.

The term "alkenyl" as used herein denotes in each case a singly unsaturated hydrocarbon radical having usually 2 to 10, frequently 2 to 6, preferably 2 to 4 carbon atoms, e.g. vinyl, ally) (2-propen-1-yl), 1-propen-1-yl, 2-propen-2-yl, methallyl (2-methylprop-2-en-1-yl), 2-buten-1-yl, 3-buten-1-yl, 2-penten-1-yl, 3-penten-1-yl, 4-penten-1-yl, 1-methylbut-2-en-1-yl, 2-ethylprop-2-en-1-yl and the like.

The term "haloalkenyl" as used herein refers to an alkenyl group as defined above, wherein the hydrogen atoms are partially or totally replaced with halogen atoms.

The term "alkynyl" as used herein denotes in each case a singly unsaturated hydrocarbon radical having usually 2 to 10, frequently 2 to 6, preferably 2 to 4 carbon atoms, e.g. ethynyl, propargyl (2-propyn-1-yl), 1-propyn-1-yl, 1-methylprop-2-yn-1-yl), 2-butyn-1-yl, 3-butyn-1-yl, 1-pentyn-1-yl, 3-pentyn-1-yl, 4-pentyn-1-yl, 1-methylbut-2-yn-1-yl, 1-ethylprop-2-yn-1-yl and the like.

The term "haloalkynyl" as used herein refers to an alkynyl group as defined above, wherein the hydrogen atoms are partially or totally replaced with halogen atoms.

The term "cycloalkyl" as used herein and in the cycloalkyl moieties of cycloalkylalkyl, cycloalkoxy and cycloalkylthio denotes in each case a monocyclic cycloaliphatic radical having usually from 3 to 10 or from 3 to 6 carbon atoms, such as cyclopropyl, cyclobutyl, cyclopentyl, cyclohexyl, cycloheptyl, cyclooctyl, cyclononyl and cyclodecyl or cyclopropyl, cyclobutyl, cyclopentyl and cyclohexyl.

The term "halocycloalkyl" as used herein and in the halocycloalkyl moieties of halocycloalkoxy and halocycloalkylthio denotes in each case a monocyclic cycloaliphatic radical having usually from 3 to 10 C atoms or 3 to 6 C atoms, wherein at least one, e.g. 1, 2, 3, 4 or 5 of the hydrogen atoms, are replaced by halogen, in particular by fluorine or chlorine. Examples are 1- and 2-fluorocyclopropyl, 1,2-, 2,2- and 2,3-difluorocyclopropyl, 1,2,2-trifluorocyclopropyl, 2,2,3,3-tetrafluorocyclopropyl, 1- and 2-chlorocyclopropyl, 1,2-, 2,2- and 2,3-dichlorocyclopropyl, 1,2,2-trichlorocyclopropyl, 2,2,3,3-tetrachlorocyclopropyl, 1-, 2- and 3-fluorocyclopentyl, 1,2-, 2,2-, 2,3-, 3,3-, 3,4-, 2,5-difluorocyclopentyl, 1-, 2- and 3-chlorocyclopentyl, 1,2-, 2,2-, 2,3-, 3,3-, 3,4-, 2,5-dichlorocyclopentyl and the like.

The term "cycloalkoxy" refers to a cycloalkyl group as defined above, which is bonded via an oxygen atom to the remainder of the molecule.

The term "halocycloalkoxy" refers to a halocycloalkyl group as defined above, which is bonded via an oxygen atom to the remainder of the molecule.

The term "cycloalkylthio" refers to a cycloalkyl group as defined above, which is bonded via a sulfur atom to the remainder of the molecule.

The term "halocycloalkylthio" refers to a halocycloalkyl group as defined above, which is bonded via a sulfur atom to the remainder of the molecule.

The term "cycloalkylalkyl" refers to a cycloalkyl group as defined above which is bonded via an alkyl group, such as a $C_1$-$C_5$-alkyl group or a $C_1$-$C_4$-alkyl group, in particular a methyl group (=cycloalkylmethyl), to the remainder of the molecule.

The term "cycloalkylsulfonyl" refers to a cycloalkyl group which is bonded via the sulfur atom of the sulfonyl group to the remainder of the molecule.

The term "cycloalkenyl" as used herein and in the cycloalkenyl moieties of cycloalkenylalkyl, cycloalkenyloxy and cycloalkenylthio denotes in each case a monocyclic singly unsaturated non-aromatic radical having usually from 3 to 10, e.g. 3 or 4 or from 5 to 10 carbon atoms, preferably from 3- to 8 carbon atoms, more preferably from 3 to 6 carbon atoms. The cycloalkenyl group may be bonded to the remainder of the molecule via a carbon atom, which forms the double bond, or via a carbon atom, which forms a single bond, preferably via a carbon atom, which forms a double bond. Exemplary cycloalkenyl groups include cyclopropen-1-yl, cyclohex-en-1-yl, cyclohepten-1-yl or cycloocten-1-yl.

The term "halocycloalkenyl" as used herein and in the halocycloalkenyl moieties of halocycloalkenyloxy and halocycloalkenylthio denotes in each case a monocyclic singly unsaturated non-aromatic radical having usually from 3 to 10, e.g. 3 or 4 or from 5 to 10 carbon atoms, preferably from 3- to 8 carbon atoms, more preferably from 3 to 6 carbon atoms, wherein at least one, e.g. 1, 2, 3, 4 or 5 of the hydrogen atoms, are replaced by halogen, in particular by fluorine or chlorine. The halocycloalkenyl group may be bonded to the remainder of the molecule via a carbon atom, which forms the double bond, or via a carbon atom, which forms a single bond, preferably via a carbon atom, which forms a double bond. Examples are 3,3-difluorocyclopropen-1-yl and 3,3-dichlorocyclopropen-1-yl.

The term "cycloalkenyloxy" refers to a cycloalkenyl group as defined above, which is bonded via an oxygen atom to the remainder of the molecule.

The term "halocycloalkenyloxy" refers to a halocycloalkenyl group as defined above, which is bonded via an oxygen atom to the remainder of the molecule.

The term "cycloalkenylthio" refers to a cycloalkenyl group as defined above, which is bonded via a sulfur atom to the remainder of the molecule.

The term "halocycloalkenylthio" refers to a halocycloalkenyl group as defined above, which is bonded via a sulfur atom to the remainder of the molecule.

The term "cycloalkenylalkyl" refers to a cycloalkenyl group as defined above which is bonded via an alkyl group, such as a $C_1$-$C_5$-alkyl group or a $C_1$-$C_4$-alkyl group, in particular a methyl group (=cycloalkenylmethyl), to the remainder of the molecule.

The term "carbocycle" or "carbocyclyl" includes in general a 3- to 12-membered, preferably a 3- to 8-membered or a 5- to 8-membered, more preferably a 5- or 6-membered monocyclic, non-aromatic ring comprising 3 to 12, preferably 3 to 8 or 5 to 8, more preferably 5 or 6 carbon atoms. Preferably, the term "carbocycle" covers cycloalkyl and cycloalkenyl groups as defined above.

The term "heterocycloalkyl" includes in general 3- to 8-membered, in particular 6-membered monocyclic saturated heterocyclic non-aromatic radicals. The heterocyclic non-aromatic radicals usually comprise 1, 2, or 3 heteroatoms selected from N, O and S as ring members, where S atoms as ring members may be present as S, SO or $SO_2$.

The term "heterocycloalkenyl" includes in general 3- to 8-membered, in particular 6-membered monocyclic singly unsaturated heterocyclic non-aromatic radicals. The heterocyclic non-aromatic radicals usually comprise 1, 2, or 3 heteroatoms selected from N, O and S as ring members, where S-atoms as ring members may be present as S, SO or $SO_2$.

The term "heterocycle" or "heterocyclyl" includes in general 3- to 12-membered, preferably 3- to 8-membered or 5- to 8-membered, more preferably 5- or 6-membered, in particular 6-membered monocyclic heterocyclic non-aromatic radicals. The heterocyclic non-aromatic radicals usually comprise 1, 2, 3, 4 or 5, preferably 1, 2 or 3 heteroatoms selected from N, O and S as ring members, where S-atoms as ring members may be present as S, SO or $SO_2$. Examples of 5- or 6-membered heterocyclic radicals comprise saturated or unsaturated, non-aromatic heterocyclic rings, such as oxiranyl, oxetanyl, thietanyl, thietanyl-S-oxide (S-oxothietanyl), thietanyl-S-dioxide (S-dioxothiethanyl), pyrrolidinyl, pyrrolinyl, pyrazolinyl, tetrahydrofuranyl, dihydrofuranyl, 1,3-dioxolanyl, thiolanyl, S-oxothiolanyl, S-dioxothiolanyl, dihydrothienyl, S-oxodihydrothienyl, S-dioxodihydro-thienyl, oxazolidinyl, oxazolinyl, thiazolinyl, oxathiolanyl, piperidinyl, piperazinyl, pyranyl, dihydropyranyl, tetrahydropyranyl, 1,3- and 1,4-dioxanyl, thiopyranyl, S-oxothiopyranyl, S-dioxothiopyranyl, dihydrothiopyranyl, S-oxodihydrothiopyranyl, S-dioxodihydrothiopyranyl, tetrahydrothiopyranyl, S-oxotetrahydrothiopyranyl, S-dioxotetrahydrothiopyranyl, morpholinyl, thiomorpholinyl, S-oxothiomorpholinyl, S-dioxothiomorpholinyl, thiazinyl and the like. Examples for heterocyclic ring also comprising 1 or 2 carbonyl groups as ring members comprise pyrrolidin-2-onyl, pyrrolidin-2,5-dionyl, imidazolidin-2-onyl, oxazolidin-2-onyl, thiazolidin-2-onyl and the like.

The term "aryl" includes mono-, bi- or tricyclic aromatic radicals having usually from 6 to 14, preferably 6, 10 or 14 carbon atoms. Exemplary aryl groups include phenyl, naphthyl and anthracenyl. Phenyl is preferred as aryl group.

The term "hetaryl" includes monocyclic 5- or 6-membered heteroaromatic radicals comprising as ring members 1, 2, 3 or 4 heteroatoms selected from N, O and S. Examples of 5- or 6-membered heteroaromatic radicals include pyridyl, i.e. 2-, 3-, or 4-pyridyl, pyrimidinyl, i.e. 2-, 4- or 5-pyrimidinyl, pyrazinyl, pyridazinyl, i.e. 3- or 4-pyridazinyl, thienyl, i.e. 2- or 3-thienyl, furyl, i.e. 2- or 3-furyl, pyrrolyl, i.e. 2- or 3-pyrrolyl, oxazolyl, i.e. 2-, 3- or 5-oxazolyl, isoxazolyl, i.e. 3-, 4- or 5-isoxazolyl, thiazolyl, i.e. 2-, 3- or 5-thiazolyl, isothiazolyl, i.e. 3-, 4- or 5-isothiazolyl, pyrazolyl, i.e. 1-, 3-, 4- or 5-pyrazolyl, i.e. 1-, 2-, 4- or 5-imidazolyl, oxadiazolyl, e.g. 2- or 5-[1,3,4]oxadiazolyl, 4- or 5-(1,2,3-oxadiazol)yl, 3- or 5-(1,2,4-oxadiazol)yl, 2- or 5-(1,3,4-thiadiazol)yl, thiadiazolyl, e.g. 2- or 5-(1,3,4-thiadiazol)yl, 4- or 5-(1,2,3-thiadiazol)yl, 3- or 5-(1,2,4-thiadiazol)yl, triazolyl, e.g. 1H-, 2H- or 3H-1,2,3-triazol-4-yl, 2H-triazol-3-yl, 1H-, 2H-, or 4H-1,2,4-triazolyl and tetrazolyl, i.e. 1H- or 2H-tetrazolyl. The term "hetaryl" also includes bicyclic 8 to 10-membered heteroaromatic radicals comprising as ring members 1, 2 or 3 heteroatoms selected from N, O and S, wherein a 5- or 6-membered heteroaromatic ring is fused to a phenyl ring or to a 5- or 6-membered heteroaromatic radical. Examples of a 5- or 6-membered heteroaromatic ring fused to a phenyl ring or to a 5- or 6-membered heteroaromatic radical include benzofuranyl, benzo-thienyl, indolyl, indazolyl, benzimidazolyl, benzoxathiazolyl, benzoxadiazolyl, benzothiadiazolyl, benzoxazinyl, quinolinyl, isoquinolinyl, purinyl, 1,8-naphthyridyl, pteridyl, pyrido[3,2-d]pyrimidyl or pyridoimidazolyl and the like. These fused hetaryl radicals may be bonded to the remainder of the molecule via any ring atom of 5- or 6-membered heteroaromatic ring or via a carbon atom of the fused phenyl moiety.

The terms "heterocyclyloxy", "hetaryloxy", "aryloxy" and "phenoxy" refer to heterocyclyl, hetaryl and aryl as defined above and phenyl, which are bonded via an oxygen atom to the remainder of the molecule.

The terms "heterocyclylsulfonyl", "hetarylsulfonyl", "arylsulfonyl", and "phenylsulfonyl" refer to heterocyclyl, hetaryl and aryl as defined above, and phenyl, respectively, which are bonded via the sulfur atom of a sulfonyl group to the remainder of the molecule.

The terms "heterocyclylcarbonyl", "hetarylcarbonyl", "arylcarbonyl", and "phenylcarbonyl" refer to heterocyclyl, hetaryl and aryl as defined above, and phenyl, respectively, which are bonded via the carbon atom of a carbonyl group (C=O) to the remainder of the molecule.

The terms "heterocyclylalkyl" and "hetarylalkyl" refer to heterocyclyl or hetaryl, respectively, as defined above which are bonded via a $C_1$-$C_5$-alkyl group or a $C_1$-$C_4$-alkyl group, in particular a methyl group (=heterocyclylmethyl or hetarylmethyl, respectively), to the remainder of the molecule.

The term "arylalkyl" and "phenylalkyl" refer to aryl as defined above and phenyl, respectively, which are bonded via $C_1$-$C_5$-alkyl group or a $C_1$-$C_4$-alkyl group, in particular a methyl group (=arylmethyl or phenylmethyl), to the remainder of the molecule, examples including benzyl, 1-phenylethyl, 2-phenylethyl, 2-phenoxyethyl etc.

The term "arylalkoxy" and "phenylalkoxy" refer to arylalkyl as defined above and phenylalkyl, respectively, which are bonded via an oxygen atom to the remainder of the molecule.

The term "phenylalkoxycarbonyl" refers to phenylalkoxy as defined above which are bonded via a carbonyl group (C=O) to the remainder of the molecule.

The terms "alkylene", "cycloalkylene", "heterocycloalkylene", "alkenylene", "cycloalkenylene", "heterocycloalkenylene" and "alkynylene" refer to alkyl, cycloalkyl, heterocycloalkyl, alkenyl, cycloalkenyl, heterocycloalkenyl and alkynyl as defined above, respectively, which are bonded to the remainder of the molecule, via two atoms, preferably via two carbon atoms, of the respective group, so that they represent a linker between two moieties of the molecule.

The term "cyclic moiety" can refer to any cyclic groups, which are present in the compounds of formula I, and which are defined above, e.g. cycloalkyl, cycloalkenyl, carbocycle, heterocycloalkyl, heterocycloalkenyl, heterocycle, aryl, hetaryl and the like.

The term "aliphatic" can refer to any non-aromatic hydrocarbon group, wherein the constituent carbon atoms can be straight-chain, branched-chain, or cyclic and/or wherein heteroatoms can be bond to the carbon chain. Furthermore, these aliphatic groups can be substituted by one or more, same or different substituents.

The term "carboxy" refers to any carboxyl groups, which are bonded via the carbon atom of the carboxyl group (—COOH) to the remainder of the molecule.

The term

With respect to the variables, the particularly preferred embodiments of the intermediates correspond to those of the compounds of the formula I.

The variables of the compounds of the formula I have the following meanings, these meanings, both on their own and in combination with one another, being preferred embodiments of the compounds of the formula I:

In one embodiment, the active ingredient is a compound of formula I, wherein T is O, S or $NR^{1b}$. These compounds correspond to formula I.1, formula I.2 and formula I.3, respectively. In one embodiment, the active ingredient is a compound of formula I.1.

adjacent to the group $NR^2$ of the 5-membered ring. Such compounds correspond to compounds of formula I.A. In another embodiment, the present invention relates to compounds of formula I, wherein the 5-membered ring is bonded to the 6-membered ring via an amide group in the position adjacent to the group $Z^3$ of the 5-membered ring. Such compounds correspond to compounds of formula I.B.

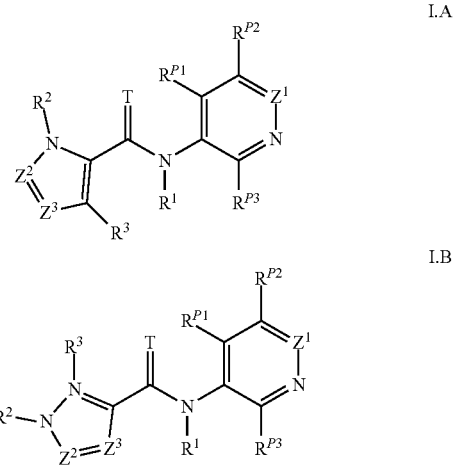

Agrochemical compositions, wherein the active ingredient is a compound of formula I.B are particularly preferred according to the present invention.

The compounds of formula I may be present in three tautomeric forms T.A, T.B, or T.C, if $R^1$ is H.

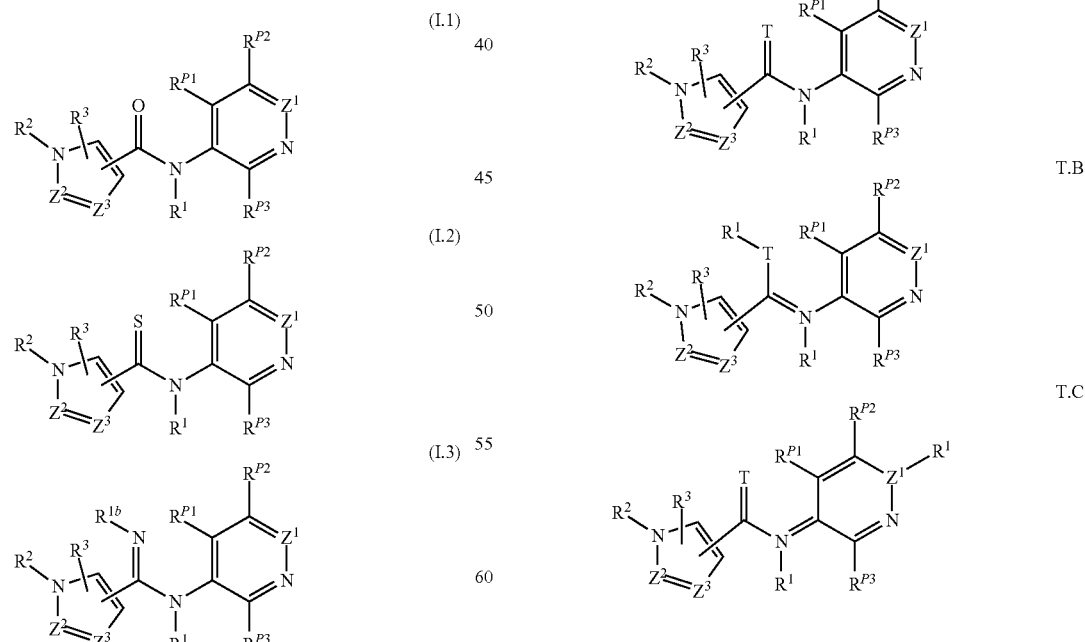

In one embodiment, the present invention relates to compounds of formula I, wherein the 5-membered ring is bonded to the 6-membered ring via an amide group in position For reasons of clarity it is referred to tautomers T-A only throughout the specification, but its description embraces the disclosure of the other tautomers as well.

In a preferred embodiment of the compounds of formula I, T is O and the 5-membered ring is bonded to the remainder of the molecule in the position adjacent to the group $NR^2$, corresponding to formula I.1.A, or adjacent to the group $Z^3$, corresponding to formula I.1.B, with the compounds of formula I.1.B being preferred.

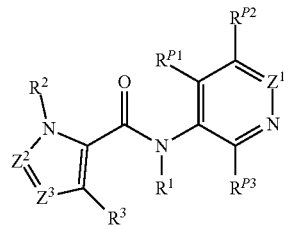

I.1.A

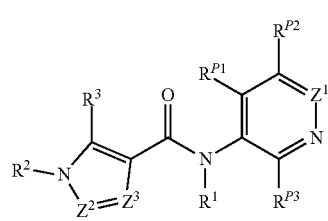

I.1.B

In one further embodiment of the compounds of formula I, $R^{P1}$, $R^{P2}$ and $R^{P3}$ are H. These compounds correspond to formula I*.

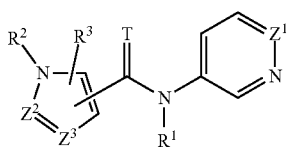

(I*)

In a preferred embodiment, the active ingredient is a compound of formula I.A, and $R^{P1}$, $R^{P2}$ and $R^{P3}$ are H, corresponding to formula I*.A, or a compound of formula I.B, corresponding to formula I*.B, with the compounds of formula I*.B being preferred.

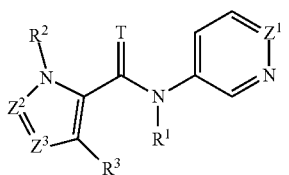

(I*.A)

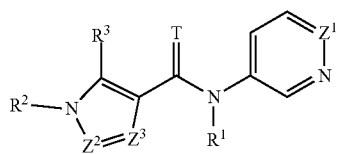

(I*.B)

In another preferred embodiment of the compounds of formula I, $R^{P1}$, $R^{P2}$ and $R^{P3}$ are H and T is O. Such compounds correspond to compounds of formula I*.1.

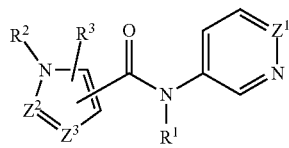

(I*.1)

In a more preferred embodiment, the active ingredient is a compound of formula I.A or I.B, $R^{P1}$, $R^{P2}$ and $R^{P3}$ are H and T is O. These compounds correspond to formula I*.1.A, or I*.1.B, with the compounds of formula I*.1.B being preferred.

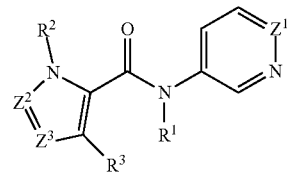

(I*.1.A)

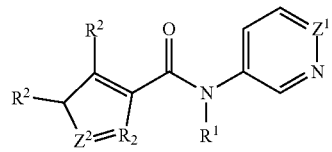

(I*.1.B)

In one embodiment, the active ingredient is a compound of formula I, preferably a compound of formula I.A or I.B, more preferably of formula I*.1.A or I*.1.B, more preferably of formula I*.1.B, wherein $Z^1$ is N, $Z^2$ is N, and $Z^3$ is $CR^5$.

In another embodiment, the active ingredient is a compound of formula I, preferably a compound of formula I.A or I.B, more preferably of formula I*.1.A or I*.1.B, more preferably of formula I*.1.B, wherein $Z^1$ is CH, $Z^2$ is $CR^4$, and $Z^3$ is N.

In one embodiment, the active ingredient is a compound of formula I*.1.A, wherein $Z^1$ is N, and wherein $R^1$ is H, $C_1$-$C_2$-alkyl, or $C_1$-$C_2$-alkoxy-$C_1$-$C_2$-alkyl.

In another embodiment, the active ingredient is a compound of formula I*.1.A, wherein $Z^1$ and $Z^2$ are N, $Z^3$ is $CR^5$, and wherein $R^1$ is H, $C_1$-$C_2$-alkyl, or $C_1$-$C_2$-alkoxy-$C_1$-$C_2$-alkyl, and $R^5$ is H, or $C_1$-$C_2$-alkyl.

In another embodiment, the active ingredient is a compound of formula I*.1.A, wherein $Z^1$ and $Z^2$ are N, $Z^3$ is $CR^5$, and wherein $R^1$ is H, $C_1$-$C_2$-alkyl, or $C_1$-$C_2$-alkoxy-$C_1$-$C_2$-alkyl; $R^3$ is $C_1$-$C_4$-alkyl, which is unsubstituted, or halogenated; and $R^5$ is H, or $C_1$-$C_2$-alkyl.

In another embodiment, the active ingredient is a compound of formula I*.1.A, wherein $Z^1$ and $Z^3$ are N, and wherein $R^1$ is H, $C_1$-$C_2$-alkyl, or $C_1$-$C_2$-alkoxy-$C_1$-$C_2$-alkyl; $R^3$ is $C_1$-$C_4$-alkyl, which is unsubstituted, or halogenated; $R^5$ is H, or $C_1$-$C_2$-alkyl; and $R^2$ is $CHR^{21}R^{22}$; and wherein
 a) $R^{21}$ is $CH_3$, $R^{22}$ is $CH_3$;
 b) $R^{21}$ is $CF_3$, $R^{22}$ is $CH_3$;
 c) $R^{21}$ is $CH(CH_3)_2$, $R^{22}$ is $CH_3$;
 d) $R^{21}$ is $CHFCH_3$, $R^{22}$ is $CH_3$;
 e) $R^{21}$ is 1-CN-$cC_3H_4$, $R^{22}$ is $CH_3$;
 f) $R^{21}$ is 1-C(O)$NH_2$-$cC_3H_4$, $R^{22}$ is $CH_3$; or
 g) $R^{21}$ and $R^{22}$ together are $CH_2CH_2CF_2CH_2CH_2$.

In one embodiment, the active ingredient is a compound of formula I*.1.A, wherein $Z^1$ and $Z^2$ are N, and wherein $R^1$ is $CH_2CH_3$; $R^3$ is $CH_3$; $R^5$ is H; $R^2$ is $CHR^{21}R^{22}$; wherein a) $R^{21}$ is $CH_3$, $R^{22}$ is $CH_3$;
b) $R^{21}$ is $CF_3$, $R^{22}$ is $CH_3$;
c) $R^{21}$ is $CH(CH_3)_2$, $R^{22}$ is $CH_3$;
d) $R^{21}$ is $CHFCH_3$, $R^{22}$ is $CH_3$;
e) $R^{21}$ is 1-CN-c$C_3H_4$, $R^{22}$ is $CH_3$;
f) $R^{21}$ is 1-C(O)$NH_2$-c$C_3H_4$, $R^{22}$ is $CH_3$; or
g) $R^{21}$ and $R^{22}$ together are $CH_2CH_2CF_2CH_2CH_2$.

In one embodiment, the active ingredient is a compound of formula I*.1.B, wherein $Z^1$ is N, and wherein $R^1$ is H, $C_1$-$C_2$-alkyl, or $C_1$-$C_2$-alkoxy-$C_1$-$C_2$-alkyl.

In another embodiment, the active ingredient is a compound of formula I*.1.B, wherein $Z^1$ and $Z^2$ are N, $Z^3$ is $CR^5$, and wherein $R^1$ is H, $C_1$-$C_2$-alkyl, or $C_1$-$C_2$-alkoxy-$C_1$-$C_2$-alkyl, and $R^5$ is H, or $C_1$-$C_2$-alkyl.

In another embodiment, the active ingredient is a compound of formula I*.1.B, wherein $Z^1$ and $Z^2$ are N, $Z^3$ is $CR^5$, and wherein $R^1$ is H, $C_1$-$C_2$-alkyl, or $C_1$-$C_2$-alkoxy-$C_1$-$C_2$-alkyl; $R^3$ is $C_1$-$C_4$-alkyl, which is unsubstituted, or halogenated; and $R^5$ is H, or $C_1$-$C_2$-alkyl.

In another embodiment, the active ingredient is a compound of formula I*.1.B, wherein $Z^1$ and $Z^3$ are N, and wherein $R^1$ is H, $C_1$-$C_2$-alkyl, or $C_1$-$C_2$-alkoxy-$C_1$-$C_2$-alkyl; $R^3$ is $C_1$-$C_4$-alkyl, which is unsubstituted, or halogenated; $R^5$ is H, or $C_1$-$C_2$-alkyl; and $R^2$ is $CHR^{21}R^{22}$; and wherein
a) $R^{21}$ is $CH_3$, $R^{22}$ is $CH_3$;
b) $R^{21}$ is $CF_3$, $R^{22}$ is $CH_3$;
c) $R^{21}$ is $CH(CH_3)_2$, $R^{22}$ is $CH_3$;
d) $R^{21}$ is $CHFCH_3$, $R^{22}$ is $CH_3$;
e) $R^{21}$ is 1-CN-c$C_3H_4$, $R^{22}$ is $CH_3$;
f) $R^{21}$ is 1-C(O)$NH_2$-c$C_3H_4$, $R^{22}$ is $CH_3$; or
g) $R^{21}$ and $R^{22}$ together are $CH_2CH_2CF_2CH_2CH_2$.

In one embodiment, the active ingredient is a compound of formula I*.1.B, wherein $Z^1$ and $Z^2$ are N, $Z^3$ is CH, $R^1$ is $CH_2CH_3$; $R^3$ is $CH_3$; $R^5$ is H; $R^2$ is $CHR^{21}R^{22}$; wherein
a) $R^{21}$ is $CH_3$, $R^{22}$ is $CH_3$;
b) $R^{21}$ is $CF_3$, $R^{22}$ is $CH_3$;
c) $R^{21}$ is $CH(CH_3)_2$, $R^{22}$ is $CH_3$;
d) $R^{21}$ is $CHFCH_3$, $R^{22}$ is $CH_3$;
e) $R^{21}$ is 1-CN-c$C_3H_4$, $R^{22}$ is $CH_3$;
f) $R^{21}$ is 1-C(O)$NH_2$-c$C_3H_4$, $R^{22}$ is $CH_3$; or
g) $R^{21}$ and $R^{22}$ together are $CH_2CH_2CF_2CH_2CH_2$.

In one embodiment, the active ingredient is a compound of formula I*.1.B, wherein $Z^1$ and $Z^2$ are N, $Z^3$ is CH, $R^1$ is $CH_2CH_3$; $R^3$ is $CH_3$; and $R^2$ is $CH(CH_3)CH(CH_3)_2$. Accordingly, such a particularly preferred compound I is 1-(1,2-dimethylpropyl)-N-ethyl-5-methyl-N-pyridazin-4-yl-pyrazole-4-carboxamide, which is also known as dimpropyridaz.

In one further embodiment, the active ingredient is a compound of formula I, $Z^2$ is N and $Z^3$ is $CR^4$, and $R^4$ is any one of the groups (i), (ii), (iiia), (iiib), (iiic), (iiid), (iva), (ivb), (va), (vb), (vc), (via), (vib), (vic), (vid), (vii), or (viii). These compounds correspond to compounds of formulae I(i), I(ii), I(iiia), I(iiib), I(iiic), I(iiid), I(iva), I(ivb), I(va), I(vb), I(vc), I(via), I(vib), I(vic), I(vid), I(vii), or (I(viii).

In one further embodiment, the active ingredient is a compound of formula I, wherein $Z^2$ is N, $R^{P1}$, $R^{P2}$ and $R^{P3}$ are H, $Z^3$ is $CR^4$, and $R^4$ is any one of the groups (i), (ii), (iiia), (iiib), (iiic), (iiid), (iva), (ivb), (va), (vb), (vc), (via), (vib), (vic), (vid), (vii), or (viii). These compounds correspond to compounds of formulae I*(i), I*(ii), I*(iiia), I*(iiib), I*(iiic), I*(iiid), I*(iva), I*(ivb), I*(va), I*(vb), I*(vc), I*(via), I*(vib), I*(vic), I*(vid), I*(vii), or I*(viii).

In one further embodiment, the active ingredient is a compound of formula I.A, wherein $R^{P1}$, $R^{P2}$ and $R^{P3}$ are H, $Z^2$ is N, $Z^3$ is $CR^4$, and $R^4$ is any one of the groups (i), (ii), (iiia), (iiib), (iiic), (iiid), (iva), (ivb), (va), (vb), (vc), (via), (vib), (vic), (vid), (vii), or (viii). These compounds correspond to compounds of formulae I*.A(i), I*.A(ii), I*.A(iiia), I*.A(iiib), I*.A(iiic), I*.A(iiid), I*.A(iva), I*.A(ivb), I*.A(va), I*.A(vb), I*.A(vc), I*.A(via), I*.A(vib), I*.A(vic), I*.A(vid), I*.A(vii), or I*.A(viii).

In one further embodiment, the active ingredient is a compound of formula I.B, wherein $R^{P1}$, $R^{P2}$ and $R^{P3}$ are H, $Z^2$ is N, $Z^3$ is $CR^4$, and $R^4$ is any one of the groups (i), (ii), (iiia), (iiib), (iiic), (iiid), (iva), (ivb), (va), (vb), (vc), (via), (vib), (vic), (vid), (vii), or (viii), corresponding to 1*.B(i), 1*.B(ii), 1*.B(iiia), 1*.B(iiib), 1*.B(iiic), 1*.B(iiid), 1*.B(iva), 1*.B(ivb), 1*.B(va), 1*.B(vb), 1*.B(vc), 1*.B(via), 1*.B(vib), 1*.B(vic), 1*.B(vid), 1*.B(vii), or I*.B(viii).

The compounds of 1*.A(i), 1*.A(ii), 1*.A(iiia), 1*.A(iiib), 1*.A(iiic), 1*.A(iiid), 1*.A(iva), 1*.A(ivb), 1*.A(va), 1*.A(vb), 1*.A(vc), 1*.A(via), 1*.A(vib), 1*.A(vic), 1*.A(vid), 1*.A(vii), or I*.A(viii) are preferred.

In one further embodiment, the active ingredient is a compound of formula, wherein $R^{P1}$, $R^{P2}$ and $R^{P3}$ are H, $Z^2$ is N, $Z^3$ is $CR^4$, and $R^4$ is any one of the groups (i), (ii), (iiia), (iiib), (iiic), (iiid), (iva), (ivb), (va), (vb), (vc), (via), (vib), (vic), (vid), (vii), or (viii), and T is O, corresponding to compounds of formulae I*.1(i), I*.1(ii), I*.1(iiia), I*.1(iiib), I*.1(iiic), I*.1(iiid), I*.1(iva), I*.1(ivb), I*.1(va), I*.1(vb), I*.1(vc), I*.1(via), I*.1(vib), I*.1(vic), I*.1(vid), I*.1(vii), or I*.1(viii).

In one further embodiment, the active ingredient is a compound of formula I.A, wherein $R^{P1}$, $R^{P2}$ and $R^{P3}$ are H, $Z^2$ is N, $Z^3$ is $CR^4$, and $R^4$ is any one of the groups (i), (ii), (iiia), (iiib), (iiic), (iiid), (iva), (ivb), (va), (vb), (vc), (via), (vib), (vic), (vid), (vii), or (viii), and T is O.

In one further embodiment, the active ingredient is a compound of formula I.A, wherein $R^{P1}$, $R^{P2}$ and $R^{P3}$ are H, $Z^2$ is N, $Z^3$ is $CR^4$, T is O, and $R^4$ is any one of the groups (i), (ii), (iiia), (iiib), (iiic), (iiid), (iva), (ivb), (va), (vb), (vc), (via), (vib), (vic), (vid), (vii), or (viii), corresponding to compounds of formulae I*.A.1(i), 1*.A.1(ii), 1*.A.1(iiia), 1*.A.1(iiib), 1*.A.1(iiic), 1*.A.1(iiid), 1*.A.1(iva), 1*.A.1(ivb), 1*.A.1(va), 1*.A.1(vb), 1*.A.1(vc), 1*.A.1(via), 1*.A.1(vib), 1*.A.1(vic), 1*.A.1(vid), 1*.A.1(vii), or I*.A.1(viii).

In one further embodiment, the active ingredient is a compound of formula I.B, wherein $R^{P1}$, $R^{P2}$ and $R^{P3}$ are H, $Z^2$ is N, $Z^3$ is $CR^4$, and $R^4$ is any one of the groups (i), (ii), (iiia), (iiib), (iiic), (iiid), (iva), (ivb), (va), (vb), (vc), (via), (vib), (vic), (vid), (vii), or (viii), corresponding to compounds of formulae I*.B(i), 1*.B(ii), 1*.B(iiia), 1*.B(iiib), 1*.B(iiic), 1*.B(iiid), 1*.B(iva), 1*.B(ivb), 1*.B(va), 1*.B(vb), 1*.B(vc), 1*.B(via), 1*.B(vib), 1*.B(vic), 1*.B(vid), 1*.B(vii), or I*.B(viii).

In one further embodiment, the active ingredient is a compound of formula I.B, wherein $R^{P1}$, $R^{P2}$ and $R^{P3}$ are H, $Z^2$ is N, $Z^3$ is $CR^4$, $Z^2$ is $CR^4$, T is O, and $R^4$ is any one of the groups (i), (ii), (iiia), (iiib), (iiic), (iiid), (iva), (ivb), (va), (vb), (vc), (via), (vib), (vic), (vid), (vii), or (viii), corresponding to compounds of formulae I*.B.1(i), 1*.B.1(ii), 1*.B.1(iiia), 1*.B.1(iiib), 1*.B.1(iiic), 1*.B.1(iiid), 1*.B.1(iva), 1*.B.1(ivb), 1*.B.1(va), 1*.B.1(vb), 1*.B.1(vc), 1*.B.1(via), 1*.B.1(vib), 1*.B.1(vic), 1*.B.1(vid), 1*.B.1(vii), or I*.B.1(viii).

In one preferred embodiment, the active ingredient is a compound of formula I.1.A(iiia).

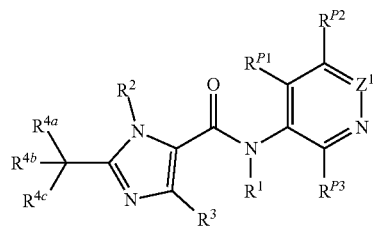

I.1.A(iiia)

In a further preferred embodiment, the active ingredient is a compound of formula I.1.A(iiib), I.1.A(iiic), or I.1.A(iiid).

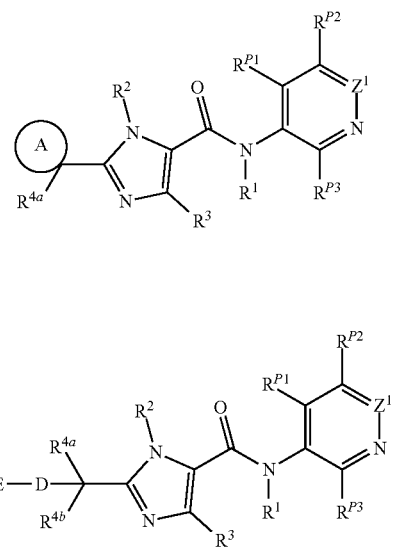

I.1.A(iiib)

I.1.A(iiic)

I.1.A(iiid)

In a further preferred embodiment, the active ingredient is a compound of formula I.1.A(iva) or I.1.A(ivb).

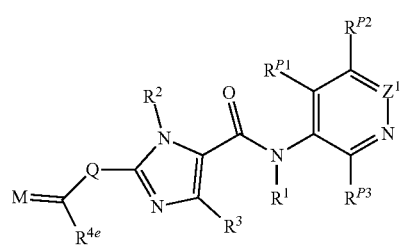

I.1.A(iva)

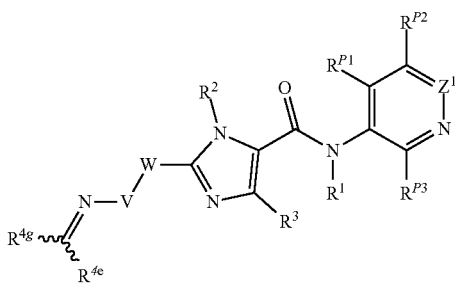

I.1.A(ivb)

In a further preferred embodiment, the active ingredient is a compound of formula I.1.A(va), I.1.A(vb), or I.1.A(vc).

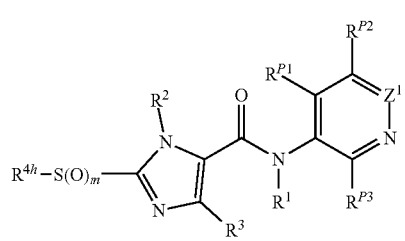

I.1.A(va)

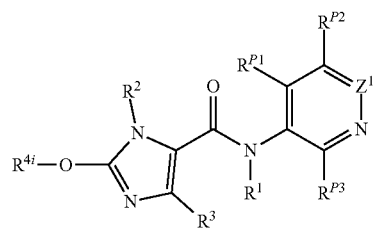

I.1.a(vb)

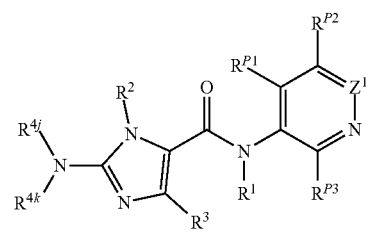

I.1.A(vc)

In a further preferred embodiment, the active ingredient is a compound of formula I.1.A(via), I.1.A(vib), I.1.A(vic), or I.1.A(vid),

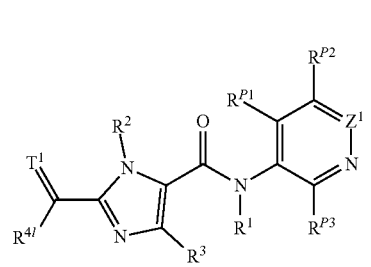

I.1.A(via)

I.1.A(vib)

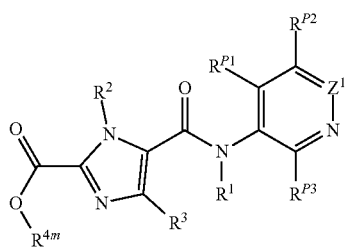

I.1.A(vic)

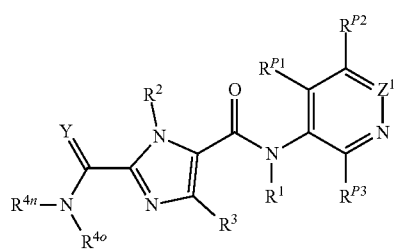

I.1.A(vid)

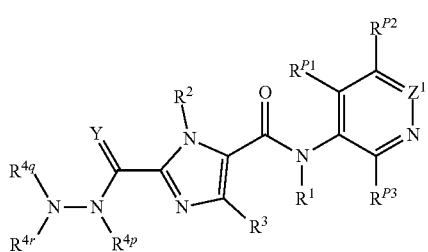

In a further preferred embodiment, the active ingredient is a compound of formula I.1.A(vii), or I.1.A(viii).

I.1.A(vii)

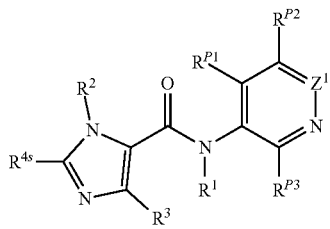

I.1.A(viii)

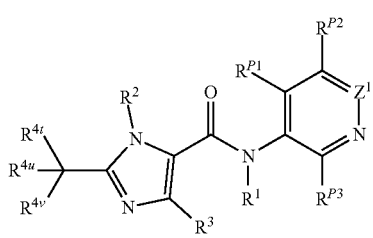

A preferred group of I.1.A compounds are those of formula I.1.A(iiia), wherein $R^{P1}$, $R^{P2}$ and $R^{P3}$ are H. Such compounds are compounds of formula I*.1.A(iiia).

I*.1.A(iiia)

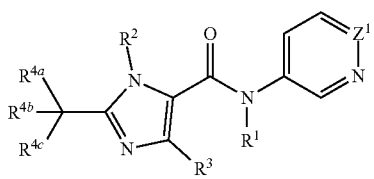

Another preferred group of I.1.A compounds are those of formula I.1.A(iiib), wherein $R^{P1}$, $R^{P2}$ and $R^{P3}$ are H. Such compounds are compounds of formula I*.1.A(iiib).

I*.1.A(iiib)

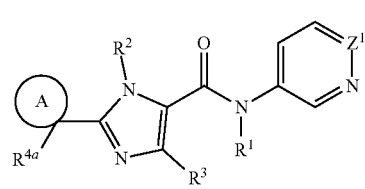

Another preferred group of I.1.A compounds are those of formula I.1.A(iiic), wherein $R^{P1}$, $R^{P2}$ and $R^{P3}$ are H. Such compounds are compounds of formula I*.1.A(iiic).

I*.1.A(iiic)

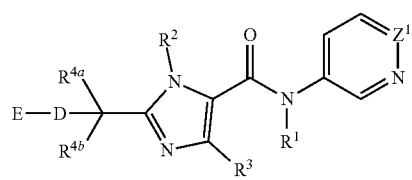

Another preferred group of I.1.A compounds are those of formula I.1.A(iiid), wherein $R^{P1}$, $R^{P2}$ and $R^{P3}$ are H. Such compounds are compounds of formula I*.1.A(iiid).

I*.1.A(iiid)

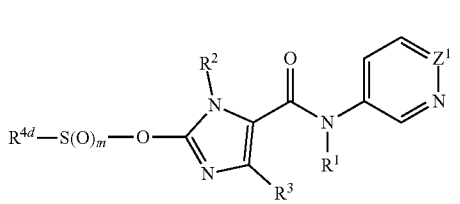

Another preferred group of I.1.A compounds are those of formula I.1.A(iva), wherein $R^{P1}$, $R^{P2}$ and $R^{P3}$ are H. Such compounds are compounds of formula I*.1.A(iva).

I*.1.A(iva)

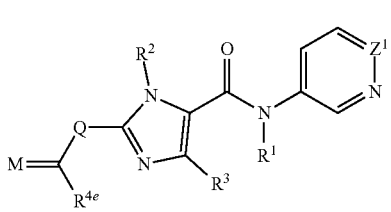

Another preferred group of I.1.A compounds are those of formula I.1.A(ivb), wherein $R^{P1}$, $R^{P2}$ and $R^{P3}$ are H. Such compounds are compounds of formula I*.1.A(ivb).

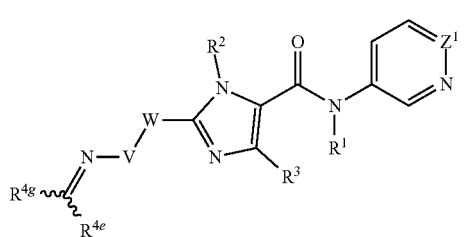

I*.1.A(ivb)

Another preferred group of I.1.A compounds are those of formula I.1.A(va), wherein $R^{P1}$, $R^{P2}$ and $R^{P3}$ are H. Such compounds are compounds of formula I*.1.A(va).

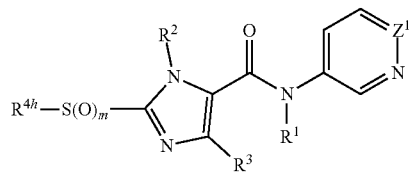

I*.1.A(va)

Another preferred group of I.1.A compounds are those of formula I.1.A(vb), wherein $R^{P1}$, $R^{P2}$ and $R^{P3}$ are H. Such compounds are compounds of formula I*.1.A(vb).

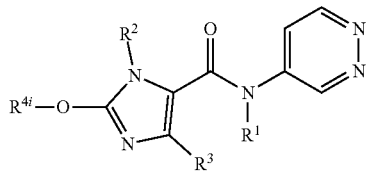

I*.1.A(vb)

Another preferred group of I.1.A compounds are those of formula I.1.A(vc), wherein $R^{P1}$, $R^{P2}$ and $R^{P3}$ are H. Such compounds are compounds of formula I*.1.A(vc).

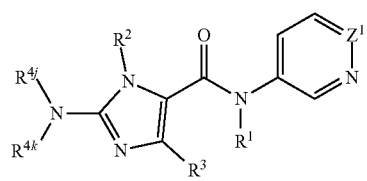

I*.1.A(vc)

Another preferred group of I.1.A compounds are those of formula I.1.A(via), wherein $R^{P1}$, $R^{P2}$ and $R^{P3}$ are H. Such compounds are compounds of formula I*.1.A(via).

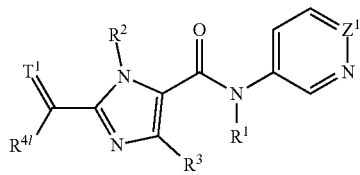

I*.1.A(via)

Another preferred group of I.1.A compounds are those of formula I.1.A(vib), wherein $R^{P1}$, $R^{P2}$ and $R^{P3}$ are H. Such compounds are compounds of formula I*.1.A(vib).

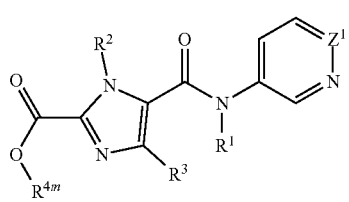

I.1.A(vib)

Another preferred group of I.1.A compounds are those of formula I.1.A(vic), wherein $R^{P1}$, $R^{P2}$ and $R^{P3}$ are H. Such compounds are compounds of formula I*.1.A(vic).

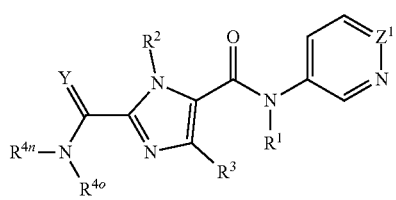

I*.1.A(vic)

Another preferred group of I.1.A compounds are those of formula I.1.A(vid), wherein $R^{P1}$, $R^{P2}$ and $R^{P3}$ are H. Such compounds are compounds of formula I*.1.A(vid).

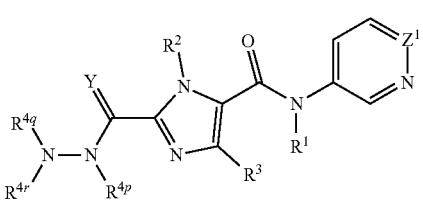

I*.1.A(vid)

Another preferred group of I.1.A compounds are those of formula I.1.A(vii), wherein $R^{P1}$, $R^{P2}$ and $R^{P3}$ are H. Such compounds are compounds of formula I*.1.A(vii).

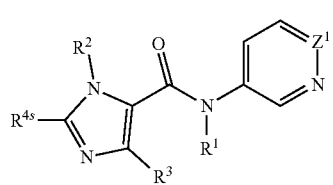

I*.1.A(vii)

Another preferred group of I.1.A compounds are those of formula I.1.A(viii), wherein $R^{P1}$, $R^{P2}$ and $R^{P3}$ are H. Such compounds are compounds of formula I*.1.A(viii).

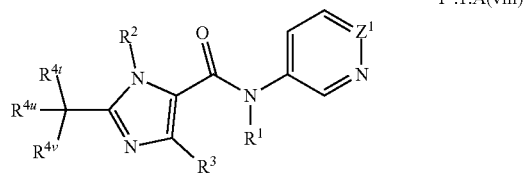

I*.1.A(viii)

Typically, in the structures of this application, $Z^1$ is CH. In another embodiment, $Z^1$ is N.

In one further embodiment, the active ingredient is a compound of formula I, wherein $R^1$ is H, $C_1$-$C_2$-alkyl, $C_3$-$C_5$-cycloalkyl, or $C_1$-$C_2$-alkoxy-$C_1$-$C_2$-alkyl. Preferably, $R^1$ is H, or $C_1$-$C_2$-alkyl.

In one further embodiment, the active ingredient is a compound of formula I, wherein $R^2$ and $R^3$ are independently of each other H, halogen, CN, $C_1$-$C_4$-alkyl, $C_1$-$C_4$-haloalkyl, $C_3$-$C_4$-cycloalkyl, or benzyl. Preferably, $R^2$ is $C_1$-$C_2$-alkyl, $C_1$-$C_2$-haloalkyl, $C_3$-cycloalkyl, or benzyl, more preferably, $R^2$ is $C_1$-$C_2$-alkyl, or $C_1$-$C_2$-haloalkyl. Preferably, $R^3$ is H, halogen, $C_1$-$C_2$-alkyl, or $C_1$-$C_2$-haloalkyl, more preferably, $R^3$ is H.

In one preferred embodiment,
$R^1$ is H, $CH_3$, or $C_2H_5$, preferably H, or $CH_3$;
$R^2$ is $CH_3$, $CH_2CH_3$, benzyl, or halomethyl;
$R^3$ is H, Br, or Cl.
In another preferred embodiment,
$R^1$ is H, $CH_3$, or $C_2H_5$, preferably H, or $CH_3$;
$R^2$ is $CH_3$, or halomethyl;
$R^3$ is H.

In a particularly preferred embodiment, the active ingredient is a compound of formula I, wherein $R^1$ is H, $CH_3$ or $CH_2CH_3$.

In a particularly preferred embodiment, the active ingredient is a compound of formula I, wherein $R^2$ is $CH_3$, or halomethyl, more preferably $CH_3$, or fluoromethyl.

In another particularly preferred embodiment, the active ingredient is a compound of formula I, wherein $R^3$ is H.

It is to be understood that the preferences regarding $R^1$, $R^2$ and $R^3$ are also preferred in connection with the above described preferred compounds, in particular the 1* compounds, the I.1 compounds, the I*.1 compounds, the I.A compounds, the I*.A compounds, the I.1.A compounds, the I*.1.A compounds, wherein $R^4$ is preferably any one of the options (i), (ii), (iiia), (iiib), (iiic), (iiid), (iva), (ivb), (va), (vb), (vc), (via), (vib), (vic), (vid), (vii), or (viii).

In one further embodiment, the active ingredient is a compound of formula I, in particular to the I* compounds, the I.1 compounds, the I*.1 compounds, the I.A compounds, the I*.A compounds, the I.1.A compounds, the I*.1.A compounds as defined above, wherein $R^4$ is any one of the options (iiia), (iiib), (iiic), (iiid), (iva), (ivb), (va), (vb), (vc), (via), (vib), (vic), (vid), (vii), or (viii) as depicted below,

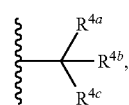

(iiia)

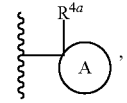

(iiib)

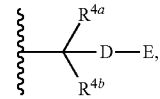

(iiic)

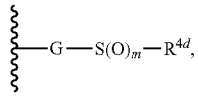

(iiid)

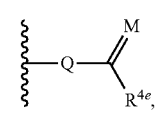

(iva)

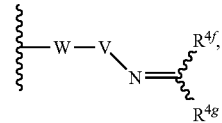

(ivb)

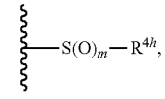

(va)

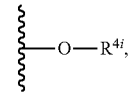

(vb)

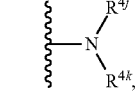

(vc)

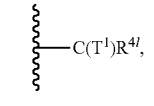

(via)

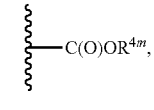

(vib)

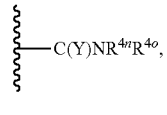

(vic)

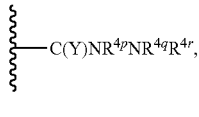

(vid)

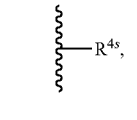

(vii)

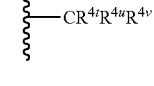

(viii)

wherein $R^{4a}$, $R^{4b}$, $R^{4c}$, $R^{4d}$, $R^{4e}$, $R^{4f}$, $R^{4g}$, $R^{4h}$, $R^{4i}$, $R^{4j}$, $R^{4k}$, $R^{4l}$, $R^{4m}$, $R^{4n}$, $R^{4o}$, $R^{4p}$, $R^{4q}$, $R^{4r}$, $R^{4s}$, $R^{4t}$, $R^{4u}$, $R^{4v}$, A, D, E, G, M, Q, $T^1$, V, W, Y and m are as defined above.

It is particularly preferred that in group (iiia)
$R^{4a}$ is CN, $C_2$-$C_6$-alkyl, $C_1$-$C_2$-haloalkyl, $C_1$-$C_2$-alkoxy-$C_1$-$C_2$-alkyl, or $C_3$-$C_6$-cycloalkyl, wherein the C-atoms may be substituted as indicated above;
$R^{4b}$ $C_1$-$C_4$-alkyl, $C_1$-$C_4$-haloalkyl, or $C_3$-$C_6$-cycloalkyl, wherein the C-atoms may be substituted as indicated above; and
$R^{4c}$ is H or $CH_3$.

Further, it is preferred that in group (iiib)
$R^{4a}$ is H, F, CN, $C_1$-$C_2$-alkyl, or halomethyl; and
A is a cycloalkyl ring, preferably a cyclohexyl, a cyclopentyl, or a cyclobutyl ring, or a tetrahydropyrane, or tetrahydrofurane ring, which rings may be substituted as indicated above.

Further, it is preferred that in group (iiic)
$R^{4a}$ is CN, $C_1$-$C_2$-alkyl, $C_1$-$C_2$-haloalkyl, or cyclopropyl, wherein the C-atoms may be substituted as indicated above;
$R^{4b}$ is H, CN, $C_1$-$C_2$-alkyl, or $C_1$-$C_2$-haloalkyl, wherein the C-atoms may be substituted as indicated above;
D is a direct bond, or $C_1$-$C_4$-alkylene; and
E is a non-aromatic heterocyclic group, wherein the heterocycle may be substituted as indicated above, and wherein a phenyl group may be optionally annealed to the heterocycle.

Further, it is preferred that in group (iiid)
G is an □-branched $C_2$-$C_3$-alkylene, preferably $CH(CH_3)$, or $CH(CH_3)CH_2$;
m is 0, or 1; and
$R^{4d}$ is $C_1$-$C_2$-haloalkyl, or $c$-$C_3H_5$, wherein the C-atoms may be halogenated.

Further, it is preferred that in group (iva)
Q is a direct bond, or an □-branched or straight chain $C_1$-$C_8$-alkylene, $C_2$-$C_8$-alkenylene, or $C_2$-$C_8$-alkynylene, which carbon chains can be substituted or unsubstituted as indicated above; and
$R^{4e}$ is H, or $CH_3$; or
Q and $R^{4e}$ together form a 4- to 6-membered carbocyclic ring or a 4- to 6-membered hetero cyclic ring, which contains O or S as heteroatom, and which groups may be substituted as indicated above; and
M is O, S, $NOCH_3$, or $NSCH_3$;
$R^M$ is a group mentioned for $R^{4e}$, or wherein
$R^M$ and Q together form a 4- to 6-membered unsaturated, non-aromatic N-containing heterocycle, which heterocycle may contain an additional heteroatom O, or S, wherein S may be oxidized, and which ring is unsubstituted or substituted as indicated above.

Further, it is preferred that in group (ivb)
W is an □-branched or straight chain $C_1$-$C_8$-alkylene, $C_3$-$C_8$-cycloalkylene, or $C_3$-$C_8$-heterocycloalkylene, wherein W is substituted as indicated above;
V is O, or S;
$R^{4g}$ is H, $C_1$-$C_4$-alkyl, or $C_3$-$C_6$-cycloalkyl; and
$R^{4f}$ is H, $C_1$-$C_4$-alkyl, or $C_3$-$C_6$-cycloalkyl; or
$R^{4g}$ and $R^{4f}$ together with the carbon atom to which they are bonded form a 3- to 8-membered, saturated or unsaturated carbo- or heterocycle, which heterocycle contains one or more, same or different heteroatoms N, O, or S, wherein S may be oxidized, and wherein the carbo- or heterocycles are unsubstituted or substituted as indicated above.

Further, it is preferred that in group (va)
$R^{4h}$ is methyl, ethyl, n-butyl, n-pentyl, n-propyl, iso-propyl, allyl, 3,3-dimethylallyl, propargyl, cyclohexyl, tetrahydro-pyranyl, tetrahydro-thiopyranyl, 3-oxetanyl, 5-oxa-[3.3.0]-bicycloheptanyl, methoxyethyl, methoxypropyl, ethoxyethyl, ethylthioethyl, methylthioethyl, difluoromethyl, trifluoromethyl, 2,2,2-trifluoroethyl, 3,3,3-trifluoropropyl, 3-chloro-2,2,3,3-tetrafluoropropyl, 3-fluoropropyl, 3,3-difluoropropyl, 2,2,2-trifluoroethylthio-ethyl, methylcarbonyl-methyl, c-propylcarbonyl-methyl, tert-butylcarbonyl-methyl, methoxycarbonyl-methyl, ethoxycarbonyl-methyl, hydroxycarbonyl-methyl, carbamoyl-methyl, N-methylcarbamoyl-methyl, N-c-propylcarbamoyl-methyl, N,N-dimethylcarbamoyl-methyl, 2-methoximino-propyl, cyclopropylmethyl, phenyl, 4-methylphenyl, 2-nitrophenyl, 3-methylthiophenyl, 4-chloro-phenyl, 4-fluoro-phenyl, 4-tert-butyl-phenyl, 4-methoxy-phenyl, 4-nitrophenyl, 4-dimethylamino-phenyl, 2-fluoro-phenyl, 2-methoxy-phenyl, 2-dimethylaminosulfonyl-phenyl, 2-dimethylaminocarbamoyl-phenyl, 3-nitrophenyl, 3-trifluoromethyl-phenyl, 3-chloro-phenyl, 2,5-dichloro-phenyl, 3,5-dichloro-phenyl, 4-chloro-3-trifluoromethyl-phenyl, 2,4,5-trichloro-phenyl, 2-pyridyl, 5-(2-chloro)pyridyl, 2-(5-methyl)-pyridyl, 2-(6-methyl)-pyridyl, 2-(3-trifluoromethyl)-pyridyl, 2-pyrimidyl, 2-(4-methyl)-pyrimidyl, 2-(5-methyl)-pyrimidyl, 2-(4-methoxy)-pyrimidyl, 2-(5-fluoro)-pyrimidyl, 2-(4-trifluoromethyl)-pyrimidyl, 2-(5-trifluoromethyl)-pyrimidyl, 2-(4,6-dimethyl)-pyrimidyl, 2-(4,5-dimethyl)-pyrimidyl, 2-(4,6-dimethoxy)-pyrimidyl, —$CH_2$-2-pyrimidyl, —$CH_2$-2-pyrazinyl, —$CH_2$-5-(1-methyl)-imidazolyl, —$CH_2$-3-(1-methyl)-pyrazolyl, —$CH_2$-4-pyridyl, —$CH_2$-2-pyridyl, —$CH_2$-2-(1-methyl)-imidazolyl, —$CH_2$-3-pyridyl, $CH_2$-2-furanyl, —$CH_2$-5-(2-chloro)-pyridyl, benzyl, 3,4-dichloro-benzyl, 2,6-difluoro-benzyl, 2-fluoro-6-methoxy-benzyl, 2,6-dichloro-benzyl, 2-chloro-6-trifluoromethyl-benzyl, 2-chloro-6-fluoro-benzyl, —$CH_2$-2-(4,6-dimethoxy)-pyrimidyl, 2,6-dimethyl-benzyl, —$CH_2$-1-(3-nitro-5-methyl)-pyrazolyl, 2-(1-methyl)-benzimidazolyl, 2-(5-methyl)-oxdiazolyl, 2-[3-methyl-6-(trifluoromethyl)-imidazo[4.5]-pyridinyl, 3-[4-ethyl-5-(trifluoromethyl)-]-1,2,4-triazolyl, 3-[4-methyl-5-(trifluoromethyl)]-1,2,4-triazolyl-3-[4-methyl-5-(difluoromethyl)]-1,2,4-triazolyl, 2-(5-phenyl)-1,3,4-thiadiazolyl, 2-(1-methyl-5-phenyl)-imidazolyl, 2-(4,5-dimethyl)-oxazolyl, 2-(1-methyl-5-methoxycarbonyl)-imidazolyl, 2-(1-methyl)-imidazolyl, or 1,2-ethanediyl; and
m is 0, 1, or 2, preferably 0, or 2, particularly preferrably 0.

Further, it is preferred that in group (vb)
$R^{4i}$ is methyl, ethyl, propyl, iso-propyl, cyclopentyl, sec-butyl, allyl, 3-methoxypropyl, 3-cyanopropyl, cyclohexyl, 3,3,3-trifluoro-propyl, 3-fluoro-propyl, 2-methylsulfanylethyl, 2-[(2,2,2-trifluoroethyl)sulfanyl]ethyl, 3,4,4,4-tetrafluoro-3-trifluoromethyl, tetrahydrofuran-3-yl, tetrahydro-2H-pyran-4-yl, tetrahydro-2H-thiopyran-4-yl, phenyl, 3-methylsulfanylphenyl, 4-chloro-phenyl, 4-fluorophenyl, 2,5-difluorophenyl, 2,4-difluorophenyl, 3,5-difluorophenyl, 2-chlorophenyl, 3,4-dichlorophenyl, 3-chlorophenyl, 3-trifluoromethylphenyl, 3-trifluoromethoxy-phenyl, 4-fluorobenzyl, pyridin-2-yl, pyrimidin-2-yl-methyl, 5-chloropyridin-3-yl, 6-chloropyridin-3-yl, 5-fluoropyridin-3-yl, 6-methoxypyridin-3-yl, 5-trifluoromethyl-pyridin-3-yl, pyridin-3-yl-methyl, 6-fluoropyridin-3-yl, 6-methylpyridin-3-yl, 6-[6-chloropyridin-3-yloxy]pyridin-3-yl, 6-[6-fluoropyridin-3-yloxy]pyridin-3-yl, 6-{6-[6-fluoropyridin-3-yloxy]pyridin-3-yl}oxypyridin-3-yl, 4-methylpyridin-3-yl, 5-methylpyridin-3-yl, pyridin-3-yl, 6-trifluoromethylpyridin-3-yl, 6-chloro-5-methylpyridin-3-yl, 6-cyanopyridin-3-yl, 6-chloro-4-methylpyridin-3-yl, 5-methoxypyridin-3-yl, 6-bromopyridin-3-yl, 5-cyanopyridin-3-yl, quinolin-3-yl, 5,6-dimethoxypyridin-3-yl, 4-chloropyridin-3-yl, 2-chloropyridin-3-yl, 5-bromopyridin-3-yl, 5-chloro-2-methoxypyridin-3-yl, 2-fluoro-6-methylpyridin-3-yl, 3-cyanophenyl, 3-ethoxyphenyl, 3-acetamidophenyl, 3-ethylphenyl, 3-methoxyphenyl, 3-propylphenyl, 2-fluoro-3-trifluoromethylphenyl, 3-methylphenyl, 3-methylsulfonylphenyl, 3-phenoxyphenyl, 3-butylsulfanylphenyl, 4-fluoro-3-trifluoromethylphenyl, 3-methoxycarbonoimidoylphenyl, 3-chloro-4-methylphenyl, 3-fluoro-5-trifluoromethylphenyl, 3-chloro-5-trifluoromethylphenyl, 3-chloro-5-methoxyphenyl, or 3-chloro-4-fluorophenyl, 3-trifluoromethylphenyl;

Further, it is preferred that in group (vc)
$R^{4i}$ and $R^{4k}$ together with the nitrogen atom to which they are bonded form a 5- or 6-membered heterocycle, which heterocycle contains the nitrogen atom as heteroatom, and may further contain one or two, same or different heteroatoms N or O, and which rings are substituted as indicated above;

Further, it is preferred that in group (via)
$R^{4l}$ is H, methyl, ethyl, iso-propyl, 1-cyano-1-methylethyl, or cyclopropyl;
$T^1$ is O, N—$OR^{1C}$, N—$NR^{2C}R^{3C}$, or a cycle of formula $T^{11}$ as indicated above, and wherein the substituents are defined as indicated above;

Further, it is preferred that in group (vib)
$R^{4m}$ is methyl or ethyl;

Further, it is preferred that in group (vic)
$R^{4n}$ is H, methyl, ethyl, methylsulfonyl, or cyclopropylsulfonyl;
$R^{4o}$ is H, methyl, ethyl, iso-propyl, iso-butyl, tert-butyl, 2,2,2-trifluoroethyl, 2-hydroxyethyl, 2-methoxyethyl, cyanomethyl, methoxycarbonylmethyl, ethoxycarbonylmethyl, cyclopropyl, 1-cyanocyclopropyl, cyclopentyl, cyclopropylmethyl, methoxy, ethoxy, phenyl, pyridin-3-yl, phenylmethyl, or 1-phenyl-2-hydroxyethyl; or
$R^{4n}$ and $R^{4o}$ together are $(CH_2)_5$, $(CH_2)_4$, $(CH_2)_3$, or $(CH_2)_2O(CH_2)_2$;
Y is O or S;

Further, it is preferred that in group (vid)
$R^{4p}$ is H, $C_1$-$C_6$-alkyl, $C_3$-$C_6$-alkenyl, or $C_3$-$C_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above; and
$R^{4q}$ is H, $C_1$-$C_6$-alkyl, $C_3$-$C_6$-alkenyl, or $C_3$-$C_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above; and
$R^{4r}$ is H, $C_1$-$C_4$-alkyl, $C_3$-$C_6$-alkenyl, or $C_3$-$C_6$-alkynyl, which are unsubstituted or substituted as indicated above, or $C_3$-$C_8$-cycloalkyl, or $C_3$-$C_8$-cycloalkyl-$C_1$-$C_4$-alkyl, which are unsubstituted or substituted as indicated above, or aryl, hetaryl, arylalkyl, or hetarylalkyl, which are unsubstituted or substituted as indicated above.

Further, it is preferred that in group (vii)
$R^{4s}$ is 3-[(2,2,2-trifluoroethyl)sulfanyl]phenyl, 2-fluoro-4-methyl-5-[(2,2,2-trifluoroethyl)sulfanyl]phenyl, 3-(methylsulfanyl)phenyl, pyrimidin-2-yl, 3-[(2,2,2-trifluoroethyl)sulfinyl]phenyl, phenyl, pyridin-3-yl, 3,5-di methyl phenyl, 2-chlorophenyl, 3-chlorophenyl, 4-chlorophenyl, 2,4-dichlorophenyl, 3,4-dichlorophenyl, 1-methyl-1H-pyrrol-2-yl, 3-furyl, 2,5-dimethyl-3-thienyl, 3-[(trifluoromethyl)sulfanyl]phenyl, 3-[(cyclopropylmethyl)sulfanyl]phenyl, 3-(methoxymethyl)phenyl, 3-[(tetrahydro-2H-pyran-4-yloxy)methyl]phenyl, 3-(dimethylsulfamoyl)phenyl, 3-(methylsulfonyl)phenyl, 4-methyl-3-(methylsulfanyl) phenyl, 1-(2-cyanophenyl)-1H-pyrazol-4-yl, 1-(4-fluorophenyl)-1H-pyrazol-4-yl, 1-phenyl-1H-pyrazol-4-yl, 1-naphthyl, 5-(methoxycarbonyl)-1-naphthyl, 4-fluoro-2-(methoxycarbonyl)phenyl, 4-fluoro-1-naphthyl, 4-chloro-3-(ethoxycarbonyl)phenyl, 2-(methoxycarbonyl)phenyl, pyridin-4-yl, 6-(ethoxycarbonyl)pyridin-2-yl, 3-(ethoxycarbonyl)phenyl, 2-naphthyl, 4-methoxy-3-(methoxycarbonyl)phenyl, 4-chloro-2-(methoxycarbonyl)phenyl, 3-thienyl, 3-(2-ethoxy-2-oxoethoxy)-4-methylphenyl, 3-(2-ethoxy-2-oxoethoxy)phenyl, 3-(2-ethoxy-2-oxoethoxy)-4,5-difluorophenyl, 3-(2-ethoxy-2-oxoethoxy)-4-fluorophenyl, 3-(ethoxycarbonyl)-4-fluorophenyl, (3-{[(cyclopropylcarbonyl)oxy]methyl}phenyl, 3-{[(cyclopropylcarbonyl)oxy]methyl}-4-fluorophenyl, pyridin-2-yl, 3-(difluoromethyl)phenyl, 3-[(trifluoromethyl)sulfinyl]phenyl, 4-fluoro-3-(trifluoromethyl)phenyl, 3-chloro-5-(trifluoromethyl)phenyl, 3-(trifluoromethyl)phenyl, 3,5-bis(trifluoromethyl)phenyl, 3-fluoro-5-(trifluoromethyl)phenyl, 4-cyano-3-(trifluoromethyl)phenyl, 3-(2,2,2-trifluoroethyl)phenyl, 3-(pentafluoroethyl)phenyl, 3-cyanophenyl, 4-chloro-3-cyanophenyl, 3-cyano-5-fluorophenyl, 3-cyano-5-(trifluoromethyl)phenyl, 5-cyano-2-methoxyphenyl, 3-cyano-4-fluorophenyl, 5-cyanopyridin-3-yl, 5-cyano-6-(dimethylamine)pyridin-3-yl, 5-cyano-6-(morpholin-4-yl)pyridin-3-yl, 5-cyano-6-ethoxypyridin-3-yl, 5-cyano-6-methoxypyridin-3-yl, 3-chloro-5-cyanophenyl, 1-benzofuran-2-yl, 3-phenyl-1,2-oxazol-5-yl, 3-(ethoxycarbonyl)-1,2-oxazol-5-yl, 1-isopropyl-1H-1,2,3-triazol-4-yl, 1-methyl-1H-1,2,3-triazol-4-yl, 5-cyano-6-methoxypyridin-3-yl, 6-methoxypyridin-2-yl, 2,3-dihydro-1-benzofuran-7-yl, 1-benzofuran-7-yl, 2,6-dimethoxypyridin-3-yl, 2-methoxyphenyl, 1,3-benzodioxol-4-yl, 2,4-dimethoxyphenyl, 2,5-dimethoxyphenyl, 6-(trifluoromethyl)pyridin-2-yl, 5-chloro-2-methoxypyridin-3-yl, 2-methoxypyridin-3-yl, 6-ethoxypyridin-3-yl, 5-chloro-6-methoxypyridin-3-yl, 2-(methylsulfanyl)pyridin-3-yl, 2-ethoxypyridin-3-yl, 5,6-dimethoxypyridin-3-yl, 2-methoxypyridin-4-yl, 6-methoxy-5-(trifluoromethyl)pyridin-3-yl, 6-methoxy-5-nitropyridin-3-yl, 2,6-di methoxypyridin-4-yl, 2-(methylsulfanyl)phenyl, 2-methoxy-6-(trifluoromethyl)-pyridin-4-yl, 3-cyano-5-methoxyphenyl, 5-fluoro-2-methoxypyridin-3-yl, 6-isopropoxypyridin-3-yl, 6-methoxypyridin-3-yl, 2-(2-amino-2-oxoethoxy)phenyl, 3-cyano-4-isopropoxyphenyl, or 3-chloropyridin-2-yl.

Further, it is preferred that in group (viii)
$R^{4t}$ is H, methyl, trifluoromethyl, trichloromethyl, isopropyl, isobutyl, isopentyl, phenyl, 2-chlorophenyl, 3-chlorophenyl, 4-chlorophenyl, 3,4-dichlorophenyl, 2-pyridinyl, 3-pyridinyl, 4-pyridinyl, 4-chloropyridin-3-yl, 2-pyrimidyl, or benzyl;

$R^{4u}$ is H, or methyl; or $R^{4t}$ and $R^{4u}$ together are vinyl, prop-1-en-2-yl, (1E)-prop-1-en-1-yl, (1Z)-prop-1-en-1-yl, or cyclopropyl;

$R^{4v}$ is H, $S(O)_m R^{1E}$, $OR^{2E}$, or $N(R^{3E})(R^{4E})$, wherein if $R^{4t}$ and/or $R^{4u}$ is H, or $C_1$-$C_8$-alkyl, $R^{4v}$ is $S(O)_m R^{1E}$, $OR^{2E}$, or $N(R^{3E})(R^{4E})$;

$R^{1E}$ is methyl, ethyl, isopropyl, isobutyl, tert-butyl, cyclopropylmethyl, 2,2-dimethylpropyl, 2-methoxy-2-oxoethyl, phenyl, 2-chlorophenyl, 3-chlorophenyl, 4-chlorophenyl, or 2-pyrimidyl;

$R^{2E}$ is H, methyl, ethyl, 2,2,2-trifluoroethyl, isopropyl, cyclopropylmethyl, benzyl, 3-chlorophenyl, or 4-chloro-phenyl;

$R^{3E}$ and $R^{4E}$ together with the nitrogen atom to which they are bonded form a 5-membered heterocycle, which heterocyclyl group contains one or two N-atoms, which cyclic groups may contain one group CO, and wherein the C-atoms are substituted with trifluoromethyl, methyl, or cyclopropyl.

In connection with the above preferences regarding the $R^4$ groups (iiia), (iiib), (iiic), (iiid), (iva), (ivb), (va), (vb), (vc), (via), (vib), (vic), (vid), (vii), or (viii), which are relevant for the compounds of formula I, in particular to the 1* compounds, the I.1 compounds, the I*.1 compounds, the I.A compounds, the I*.A compounds, the I.1.A compounds, the I*.1.A compounds as defined above, it is further preferred that $R^1$, $R^2$, and $R^3$ correspond to the preferred options provided above. For example, it is preferred in connection with the above preferences regarding the $R^4$ groups that $R^1$ is H, $CH_3$, or $C_2H_5$, preferably H, or $CH_3$;
$R^2$ is $CH_3$, $CH_2CH_3$, benzyl, or halomethyl;
$R^3$ is H, Br, or Cl;

or that $R^1$ is H, $CH_3$, or $C_2H_5$, preferably H, or $CH_3$;
$R^2$ is $CH_3$, or halomethyl;
$R^3$ is H.

In view of the above, the following compounds are particularly preferred as active ingredients according to the present invention.

One preferred embodiment relates to compounds of formula I*.A(iiia) as active ingredient, wherein
$R^1$ is H, $CH_3$, or $C_2H_5$, preferably H, or $CH_3$;
$R^2$ is $CH_3$, or halomethyl;
$R^3$ is H; and wherein
at least one of $R^{4a}$, $R^{4b}$ and $R^{4c}$ is $C_3$-$C_4$-cycloalkenyl, $C_3$-$C_4$-halocycloalkenyl, $OR^a$, or $SR^a$, wherein $R^a$ is $C_3$-$C_4$-cycloalkenyl, or $C_3$-$C_4$-halocycloalkenyl; and
T is O, S or $NR^{1b}$.

Another preferred embodiment relates to compounds of formula I*.A(iiib) as active ingredient, wherein
$R^1$ is H, $CH_3$, or $C_2H_5$, preferably H, or $CH_3$;
$R^2$ is $CH_3$, or halomethyl;
$R^3$ is H;
$R^{4a}$ is as defined above;
A is a $C_3$-$C_4$-cycloalkenyl, or $C_3$-$C_4$-halocycloalkenyl group; and
T is O, S or $NR^{1b}$.

Another preferred embodiment relates to compounds of formula I*.A(iiic) as active ingredient, wherein
$R^1$ is H, $CH_3$, or $C_2H_5$, preferably H, or $CH_3$;
$R^2$ is $CH_3$, or halomethyl;
$R^3$ is H;
$R^{4a}$ and $R^{4b}$ are as defined above;

E is a $C_3$-$C_4$-cycloalkenyl, or $C_3$-$C_4$-halocycloalkenyl group; and
T is O, S or $NR^{1b}$.

Another preferred embodiment relates to compounds of formula I*.A(iiid) as active ingredient, wherein
$R^1$ is H, $CH_3$, or $C_2H_5$, preferably H, or $CH_3$;
$R^2$ is $CH_3$, or halomethyl;
$R^3$ is H;
$R^{4d}$ is $C_1$-$C_2$-haloalkyl, or c-$C_3H_5$, wherein the C-atoms may be halogenated;
G is a $C_3$-$C_4$-cycloalkenyl, or $C_3$-$C_4$-halocycloalkenyl group; and
T is O, S or $NR^{1b}$.

Another preferred embodiment relates to compounds of formula I*.A(iva) as active ingredient, wherein
$R^1$ is H, $CH_3$, or $C_2H_5$, preferably H, or $CH_3$;
$R^2$ is $CH_3$, or halomethyl;
$R^3$ is H;
$R^{4e}$ is H, or $CH_3$;
Q is a direct bond, or an □-branched or straight chain $C_1$-$C_8$-alkylene, $C_2$-$C_8$-alkenylene, or $C_2$-$C_8$-alkynylene, which carbon chains can be substituted or unsubstituted as indicated above;
M is O, S, $NOCH_3$, or $NSCH_3$;
T is O, S or $NR^{1b}$.

Another preferred embodiment relates to compounds of formula I*.A(ivb) as active ingredient, wherein
$R^1$ is H, $CH_3$, or $C_2H_5$, preferably H, or $CH_3$;
$R^2$ is $CH_3$, or halomethyl,
$R^3$ is H;
$R^{4f}$ is H, $C_1$-$C_4$-alkyl, or $C_3$-$C_6$-cycloalkyl;
$R^{4g}$ is H, $C_1$-$C_4$-alkyl, or $C_3$-$C_6$-cycloalkyl;
V is O, or S;
W is an □-branched or straight chain $C_1$-$C_8$-alkylene, $C_3$-$C_8$-cycloalkylene, or —$C_5$-$C_8$-heterocycloalkylene, wherein W is substituted as indicated above;
T is O, S or $NR^{1b}$.

Another preferred embodiment relates to compounds of formula I*.A(va) as active ingredient, wherein
$R^1$ is H, or $CH_3$, preferably $CH_3$;
$R^2$ is $CH_3$;
$R^3$ is H, chlorine, or bromine, preferably H;
$R^{4h}$ is methyl, ethyl, n-butyl, n-pentyl, n-propyl, isopropyl, allyl, 3,3-dimethylallyl, propargyl, cyclohexyl, tetrahydro-pyranyl, tetrahydro-thiopyranyl, 3-oxetanyl, 5-oxa-[3.3.0]-bicycloheptanyl, methoxyethyl, methoxypropyl, ethoxyethyl, ethylthioethyl, methylthioethyl, difluoromethyl, trifluoromethyl, 2,2,2-trifluoroethyl, 3,3,3-trifluoropropyl, 3-chloro-2,2,3,3-tetrafluoropropyl, 3-fluoropropyl, 3,3-difluoropropyl, 2,2,2-trifluoroethylthio-ethyl, methylcarbonyl-methyl, c-propylcarbonyl-methyl, tert-butylcarbonyl-methyl, methoxycarbonyl-methyl, ethoxycarbonyl-methyl, hydroxycarbonyl-methyl, carbamoyl-methyl, N-methylcarbamoyl-methyl, N-c-propylcarbamoyl-methyl, N,N-dimethylcarbamoyl-methyl, 2-methoximino-propyl, cyclopropylmethyl, phenyl, 4-methylphenyl, 2-nitrophenyl, 3-methylthiophenyl, 4-chloro-phenyl, 4-fluoro-phenyl, 4-tert-butyl-phenyl, 4-methoxy-phenyl, 4-nitrophenyl, 4-dimethylamino-phenyl, 2-fluorophenyl, 2-methoxy-phenyl, 2-dimethylaminosulfonyl-phenyl, 2-dimethylaminocarbamoyl-phenyl, 3-nitrophenyl, 3-trifluoromethyl-phenyl, 3-chloro-phenyl, 2,5-dichloro-phenyl, 3,5-dichloro-phenyl, 4-chloro-3-trifluoromethyl-phenyl, 2,4,5-trichloro-phenyl, 2-pyridyl, 5-(2-chloro)pyridyl, 2-(5-methyl)-pyridyl, 2-(6-methyl)-pyridyl, 2-(3-trifluoromethyl)- pyridyl, 2-pyrimidyl, 2-(4-methyl)-pyrimidyl, 2-(5-methyl)-pyrimidyl, 2-(4-methoxy)-pyrimidyl, 2-(5-fluoro)-pyrimidyl, 2-(4-trifluoromethyl)-pyrimidyl, 2-(5-trifluoromethyl)-pyrimidyl, 2-(4,6-dimethyl)-pyrimidyl, 2-(4,5-dimethyl)-pyrimidyl, 2-(4,6-dimethoxy)-pyrimidyl, —CH$_2$-2-pyrimidyl, —CH$_2$-2-pyrazinyl, —CH$_2$-5-(1-methyl)-imidazolyl, —CH$_2$-3-(1-methyl)-pyrazolyl, —CH$_2$-4-pyridyl, —CH$_2$-2-pyridyl, —CH$_2$-2-(1-methyl)-imidazolyl, —CH$_2$-3-pyridyl, CH$_2$-2-furanyl, —CH$_2$-5-(2-chloro)-pyridyl, benzyl, 3,4-dichloro-benzyl, 2,6-difluoro-benzyl, 2-fluoro-6-methoxy-benzyl, 2,6-dichloro-benzyl, 2-chloro-6-trifluoromethyl-benzyl, 2-chloro-6-fluoro-benzyl, —CH$_2$-2-(4,6-dimethoxy)-pyrimidyl, 2,6-dimethyl-benzyl, —CH$_2$-1-(3-nitro-5-methyl)-pyrazolyl, 2-(1-methyl)-benzimidazolyl, 2-(5-methyl)-oxdiazolyl, 2-[3-methyl-6-(trifluoromethyl)-imidazo[4.5]-pyridinyl, 3-[4-ethyl-5-(trifluoromethyl)-]-1,2,4-triazolyl, 3-[4-methyl-5-(trifluoromethyl)]-1,2,4-triazolyl3-[4-methyl-5-(difluoromethyl)]-1,2,4-triazolyl, 2-(5-phenyl)-1,3,4-thiadiazolyl, 2-(1-methyl-5-phenyl)-imidazolyl, 2-(4,5-dimethyl)-oxazolyl, 2-(1-methyl-5-methoxycarbonyl)-imidazolyl, 2-(1-methyl)-imidazolyl, or 1,2-ethanediyl;

m is 0, or 2, preferably 0;

T is O, S or NR$^{1b}$.

Another preferred embodiment relates to compounds of formula I*.A(vb) as active ingredient, wherein $R^1$ is H, methyl, ethyl, or cyclopropyl;

$R^2$ is CH$_3$;

$R^3$ is H, chlorine, or bromine, preferably H;

$R^{4i}$ is methyl, ethyl, propyl, iso-propyl, cyclopentyl, sec-butyl, allyl, 3-methoxypropyl, 3-cyanopropyl, cyclohexyl, 3,3,3-trifluoro-propyl, 3-fluoro-propyl, 2-methylsulfanylethyl, 2-[(2,2,2-trifluoroethyl)sulfanyl]ethyl, 3,4,4,4-tetrafluoro-3-trifluoromethyl, tetrahydrofuran-3-yl, tetrahydro-2H-pyran-4-yl, tetrahydro-2H-thiopyran-4-yl, phenyl, 3-methylsulfanylphenyl, 4-chlorophenyl, 4-fluorophenyl, 2,5-difluorophenyl, 2,4-difluorophenyl, 3,5-difluorophenyl, 2-chlorophenyl, 3,4-dichlorophenyl, 3-chlorophenyl, 3-trifluoromethyl-phenyl, 3-trifluoromethoxy-phenyl, 4-fluorobenzyl, pyridin-2-yl, pyrimidin-2-ylmethyl, 5-chloropyridin-3-yl, 6-chloropyridin-3-yl, 5-fluoropyridin-3-yl, 6-methoxypyridin-3-yl, 5-trifluoromethyl-pyridin-3-yl, pyridin-3-ylmethyl, 6-fluoropyridin-3-yl, 6-methylpyridin-3-yl, 6-[6-chloropyridin-3-yloxy]pyridin-3-yl, 6-[6-fluoropyridin-3-yloxy]pyridin-3-yl, 6-{6-[6-fluoropyridin-3-yloxy]pyridin-3-yl}oxypyridin-3-yl, 4-methylpyridin-3-yl, 5-methylpyridin-3-yl, pyridin-3-yl, 6-trifluoromethylpyridin-3-yl, 6-chloro-5-methylpyridin-3-yl, 6-cyanopyridin-3-yl, 6-chloro-4-methylpyridin-3-yl, 5-methoxypyridin-3-yl, 6-bromopyridin-3-yl, 5-cyanopyridin-3-yl, quinolin-3-yl, 5,6-dimethoxypyridin-3-yl, 4-chloropyridin-3-yl, 2-chloropyridin-3-yl, 5-bromopyridin-3-yl, 5-chloro-2-methoxypyridin-3-yl, 2-fluoro-6-methylpyridin-3-yl, 3-cyanophenyl, 3-ethoxyphenyl, 3-acetamidophenyl, 3-ethylphenyl, 3-methoxyphenyl, 3-propylphenyl, 2-fluoro-3-trifluoromethyl phenyl, 3-methylphenyl, 3-methylsulfonylphenyl, 3-phenoxyphenyl, 3-butylsulfanylphenyl, 4-fluoro-3-trifluoromethylphenyl, 3-methoxycarbonoimidoylphenyl, 3-chloro-4-methylphenyl, 3-fluoro-5-trifluoromethylphenyl, 3-chloro-5-trifluoromethylphenyl, 3-chloro-5-methoxyphenyl, or 3-chloro-4-fluorophenyl, or 3-trifluoromethylphenyl;

T is O, S or NR$^{1b}$.

Another preferred embodiment relates to compounds of formula I*.A(vc) as active ingredient, wherein $R^1$ is methyl, ethyl, or cyclopropyl;

$R^2$ is CH$_3$;

$R^3$ is H;

$R^{4j}$ and $R^{4k}$ together with the nitrogen atom to which they are bonded form a 5- or 6-membered heterocycle, which heterocycle contains the nitrogen atom as heteroatom;

T is O, S or NR$^{1b}$.

Another preferred embodiment relates to compounds of formula I*.A(via) as active ingredient, wherein $R^1$ is methyl, ethyl, or cyclopropyl;

$R^2$ is CH$_3$;

$R^3$ is H;

$R^{4l}$ is H, methyl, ethyl, iso-propyl, 1-cyano-1-methyl-ethyl, or cyclopropyl;

$T^1$ is as defined above;

T is O, S or NR$^{1b}$.

Another preferred embodiment relates to compounds of formula I*.A(vib) as active ingredient, wherein $R^1$ is methyl, ethyl, or cyclopropyl;

$R^2$ is CH$_3$;

$R^3$ is H;

$R^{4m}$ is methyl, or ethyl;

T is O, S or NR$^{1b}$.

Another preferred embodiment relates to compounds of formula I*.A(vic) as active ingredient, wherein $R^1$ is methyl, ethyl, or cyclopropyl;

$R^2$ is CH$_3$;

$R^3$ is H;

$R^{4n}$ is H, methyl, ethyl, methylsulfonyl, or cyclopropylsulfonyl;

$R^{4o}$ is H, methyl, ethyl, iso-propyl, iso-butyl, tert-butyl, 2,2,2-trifluoroethyl, 2-hydroxyethyl, 2-methoxyethyl, cyanomethyl, methoxycarbonylmethyl, ethoxycarbonylmethyl, cyclopropyl, 1-cyanocyclopropyl, cyclopentyl, cyclopropylmethyl, methoxy, ethoxy, phenyl, pyridin-3-yl, phenylmethyl, or 1-phenyl-2-hydroxyethyl; or $R^{4n}$ and $R^{4o}$ together are (CH$_2$)$_5$, (CH$_2$)$_4$, (CH$_2$)$_3$, or (CH$_2$)$_2$O(CH$_2$)$_2$;

Y is O, or S;

T is O, S or NR$^{1b}$.

Another preferred embodiment relates to compounds of formula I*.A(vid) as active ingredient, wherein $R^1$ is methyl, ethyl, or cyclopropyl;

$R^2$ is CH$_3$;

$R^3$ is H;

$R^{4p}$ is H, C$_1$-C$_6$-alkyl, C$_3$-C$_6$-alkenyl, or C$_3$-C$_6$-alkynyl, which are unsubstituted or substituted as indicated above, or C$_3$-C$_6$-cycloalkyl, C$_1$-C$_6$-alkylcarbonyl, C$_1$-C$_6$-alkoxycarbonyl, aryl-C$_1$-C$_4$-alkyl, or aryl-C$_1$-C$_4$-alkoxy, which are unsubstituted or substituted as indicated above;

$R^{4q}$ is H, C$_1$-C$_6$-alkyl, C$_3$-C$_6$-alkenyl, or C$_3$-C$_6$-alkynyl, which are unsubstituted or substituted as indicated above, or C$_3$-C$_6$-cycloalkyl, C$_1$-C$_6$-alkylcarbonyl, C$_1$-C$_6$-alkoxycarbonyl, aryl-C$_1$-C$_4$-alkyl, or aryl-C$_1$-C$_4$-alkoxy, which are unsubstituted or substituted as indicated above; and $R^{4r}$ is H, C$_1$-C$_4$-alkyl, C$_3$-C$_6$-alkenyl, or C$_3$-C$_6$-alkynyl, which are unsubstituted or substituted as indicated above, or C$_3$-C$_8$-cycloalkyl, or C$_3$-C$_8$-cycloalkyl-C$_1$-C$_4$-alkyl, which are unsubstituted or substituted as indicated above, or aryl, hetaryl, arylalkyl, or hetarylalkyl, which are unsubstituted or substituted as indicated above;

Y is O, or S;

T is O, S or $NR^{1b}$.

Another preferred embodiment relates to compounds of formula I*.A(vii) as active ingredient, wherein $R^1$ is H, methyl, ethyl, preferably methyl and ethyl;

$R^2$ is $CH_3$;

$R^3$ is H, chlorine, bromine, preferably H;

$R^{4s}$ is 3-[(2,2,2-trifluoroethyl)sulfanyl]phenyl, 2-fluoro-4-methyl-5-[(2,2,2-trifluoroethyl)sulfanyl]phenyl, 3-(methylsulfanyl)phenyl, pyrimidin-2-yl, 3-[(2,2,2-trifluoroethyl)sulfinyl]phenyl, phenyl, pyridin-3-yl, 3,5-di methyl phenyl, 2-chlorophenyl, 3-chlorophenyl, 4-chlorophenyl, 2,4-dichlorophenyl, 3,4-dichlorophenyl, 1-methyl-1H-pyrrol-2-yl, 3-furyl, 2,5-dimethyl-3-thienyl, 3-[(trifluoromethyl)sulfanyl]phenyl, 3-[(cyclopropylmethyl)sulfanyl]phenyl, 3-(methoxymethyl)phenyl, 3-[(tetrahydro-2H-pyran-4-yloxy)methyl]phenyl, 3-(dimethylsulfamoyl)phenyl, 3-(methylsulfonyl)phenyl, 4-methyl-3-(methylsulfanyl)phenyl, 1-(2-cyanophenyl)-1H-pyrazol-4-yl, 1-(4-fluorophenyl)-1H-pyrazol-4-yl, 1-phenyl-1H-pyrazol-4-yl, 1-naphthyl, 5-(methoxycarbonyl)-1-naphthyl, 4-fluoro-2-(methoxycarbonyl)phenyl, 4-fluoro-1-naphthyl, 4-chloro-3-(ethoxycarbonyl)phenyl, 2-(methoxycarbonyl)phenyl, pyridin-4-yl, 6-(ethoxycarbonyl)pyridin-2-yl, 3-(ethoxycarbonyl)phenyl, 2-naphthyl, 4-methoxy-3-(methoxycarbonyl)phenyl, 4-chloro-2-(methoxycarbonyl)phenyl, 3-thienyl, 3-(2-ethoxy-2-oxoethoxy)-4-methylphenyl, 3-(2-ethoxy-2-oxoethoxy)phenyl, 3-(2-ethoxy-2-oxoethoxy)4,5-difluorophenyl, 3-(2-ethoxy-2-oxoethoxy)-4-fluorophenyl, 3-(ethoxycarbonyl)-4-fluorophenyl, (3-{[(cyclopropylcarbonyl)oxy]methyl}phenyl, 3-{[(cyclopropylcarbonyl)oxy]methyl}-4-fluorophenyl, pyridin-2-yl, 3-(difluoromethyl)phenyl, 3-[(trifluoromethyl)sulfinyl]phenyl, 4-fluoro-3-(trifluoromethyl)phenyl, 3-chloro-5-(trifluoromethyl)phenyl, 3-(trifluoromethyl)phenyl, 3,5-bis(trifluoromethyl)phenyl, 3-fluoro-5-(trifluoromethyl)phenyl, 4-cyano-3-(trifluoromethyl)phenyl, 3-(2,2,2-trifluoroethyl)phenyl, 3-(pentafluoroethyl)phenyl, 3-cyanophenyl, 4-chloro-3-cyanophenyl, 3-cyano-5-fluorophenyl, 3-cyano-5-(trifluoromethyl)phenyl, 5-cyano-2-methoxyphenyl, 3-cyano-4-fluorophenyl, 5-cyanopyridin-3-yl, 5-cyano-6-(dimethylamine)pyridin-3-yl, 5-cyano-6-(morpholin-4-yl)pyridin-3-yl, 5-cyano-6-ethoxypyridin-3-yl, 5-cyano-6-methoxypyridin-3-yl, 3-chloro-5-cyanophenyl, 1-benzofuran-2-yl, 3-phenyl-1,2-oxazol-5-yl, 3-(ethoxycarbonyl)-1,2-oxazol-5-yl, 1-isopropyl-1H-1,2,3-triazol-4-yl, 1-methyl-1H-1,2,3-triazol-4-yl, 5-cyano-6-methoxypyridin-3-yl, 6-methoxypyridin-2-yl, 2,3-dihydro-1-benzofuran-7-yl, 1-benzofuran-7-yl, 2,6-dimethoxypyridin-3-yl, 2-methoxyphenyl, 1,3-benzodioxol-4-yl, 2,4-dimethoxyphenyl, 2,5-dimethoxyphenyl, 6-(trifluoromethyl)pyridin-2-yl, 5-chloro-2-methoxypyridin-3-yl, 2-methoxypyridin-3-yl, 6-ethoxypyridin-3-yl, 5-chloro-6-methoxypyridin-3-yl, 2-(methylsulfanyl)pyridin-3-yl, 2-ethoxypyridin-3-yl, 5,6-dimethoxypyridin-3-yl, 2-methoxypyridin-4-yl, 6-methoxy-5-(trifluoromethyl)pyridin-3-yl, 6-methoxy-5-nitropyridin-3-yl, 2,6-di methoxypyridin-4-yl, 2-(methylsulfanyl)phenyl, 2-methoxy-6-(trifluoromethyl)-pyridin-4-yl, 3-cyano-5-methoxyphenyl, 5-fluoro-2-methoxypyridin-3-yl, 6-isopropoxypyridin-3-yl, 6-methoxypyridin-3-yl, 2-(2-amino-2-oxoethoxy)phenyl, 3-cyano-4-isopropoxyphenyl, or 3-chloropyridin-2-yl;

T is O, S or $NR^{1b}$.

Another preferred embodiment relates to compounds of formula I*.A(viii) as active ingredient, wherein $R^1$ is methyl, ethyl, or cyclopropyl;

$R^2$ is $CH_3$;

$R^3$ is H;

$R^{4t}$ is H, methyl, trifluoromethyl, trichloromethyl, isopropyl, isobutyl, isopentyl, phenyl, 2-chlorophenyl, 3-chlorophenyl, 4-chlorophenyl, 3,4-dichlorophenyl, 2-pyridinyl, 3-pyridinyl, 4-pyridinyl, 4-chloropyridin-3-yl, 2-pyrimidyl, or benzyl;

$R^{4u}$ is H, or methyl; or $R^{4t}$ and $R^{4u}$ together are vinyl, prop-1-en-2-yl, (1E)-prop-1-en-1-yl, (1Z)-prop-1-en-1-yl, or cyclopropyl;

$R^{4v}$ is H, $S(O)_m R^{1E}$, $OR^{2E}$, or $N(R^{3E})(R^{4E})$, wherein if $R^{4t}$ and/or $R^{4u}$ is H, or $C_1$-$C_8$-alkyl, $R^{4v}$ is $S(O)_m R^{1E}$, $OR^{2E}$, or $N(R^{3E})(R^{4E})$;

$R^{1E}$ is methyl, ethyl, isopropyl, isobutyl, tert-butyl, cyclopropylmethyl, 2,2-dimethylpropyl, 2-methoxy-2-oxoethyl, phenyl, 2-chlorophenyl, 3-chlorophenyl, 4-chlorophenyl, or 2-pyrimidyl;

$R^{2E}$ is H, methyl, ethyl, 2,2,2-trifluoroethyl, isopropyl, cyclopropylmethyl, benzyl, 3-chlorophenyl, or 4-chloro-phenyl;

$R^{3E}$ and $R^{4E}$ together with the nitrogen atom to which they are bonded form a 5-membered heterocycle, which heterocyclyl group contains one or two N-atoms, which cyclic groups may contain one group CO, and wherein the C-atoms are substituted with trifluoromethyl, methyl, or cyclopropyl;

T is O, S or $NR^{1b}$.

Another preferred embodiment refers to compounds of formula I*.B(iiia) as active ingredient, wherein $R^1$ is H, $CH_3$, or $C_2H_5$, preferably H, or $CH_3$;

$R^2$ is $CH_3$, or halomethyl;

$R^3$ is H; and wherein at least one of $R^{4a}$, $R^{4b}$ and $R^{4o}$ is $C_3$-$C_4$-cycloalkenyl, $C_3$-$C_4$-halocycloalkenyl, $OR^a$, or $SR^a$, wherein $R^a$ is $C_3$-$C_4$-cycloalkenyl, or $C_3$-$C_4$-halocycloalkenyl; and T is O, S or $NR^{1b}$.

Another preferred embodiment relates to compounds of formula I*.B(iiib) as active ingredient, wherein $R^1$ is H, $CH_3$, or $C_2H_5$, preferably H, or $CH_3$;

$R^2$ is $CH_3$, or halomethyl;

$R^3$ is H;

$R^{4a}$ is as defined above;

A is a $C_3$-$C_4$-cycloalkenyl, or $C_3$-$C_4$-halocycloalkenyl group; and

T is O, S or $NR^{1b}$.

Another preferred embodiment relates to compounds of formula I*.B(iiic) as active ingredient, wherein $R^1$ is H, $CH_3$, or $C_2H_5$, preferably H, or $CH_3$;

$R^2$ is $CH_3$, or halomethyl;

$R^3$ is H;

$R^{4a}$ and $R^{4b}$ are as defined above;

E is a $C_3$-$C_4$-cycloalkenyl, or $C_3$-$C_4$-halocycloalkenyl group; and

T is O, S or $NR^{1b}$.

Another preferred embodiment relates to compounds of formula I*.B(iiid) as active ingredient, wherein $R^1$ is H, $CH_3$, or $C_2H_5$, preferably H, or $CH_3$;

$R^2$ is $CH_3$, or halomethyl;

$R^3$ is H;

$R^{4d}$ is $C_1$-$C_2$-haloalkyl, or c-$C_3H_5$, wherein the C-atoms may be halogenated;

G is a $C_3$-$C_4$-cycloalkenyl, or $C_3$-$C_4$-halocycloalkenyl group; and

T is O, S or $NR^{1b}$.

Another preferred embodiment relates to compounds of formula I*.B(iva) as active ingredient, wherein $R^1$ is H, $CH_3$, or $C_2H_5$, preferably H, or $CH_3$;

$R^2$ is $CH_3$, or halomethyl;

$R^3$ is H;

$R^{4e}$ is H, or $CH_3$;

Q is a direct bond, or an □-branched or straight chain $C_1$-$C_8$-alkylene, $C_2$-$C_8$-alkenylene, or $C_2$-$C_8$-alkynylene, which carbon chains can be substituted or unsubstituted as indicated above;

M is O, S, $NOCH_3$, or $NSCH_3$;

T is O, S or $NR^{1b}$.

Another preferred embodiment relates to compounds of formula I*.B(ivb) as active ingredient, wherein $R^1$ is H, $CH_3$, or $C_2H_5$, preferably H, or $CH_3$;

$R^2$ is $CH_3$, or halomethyl;

$R^3$ is H;

$R^{4f}$ is H, $C_1$-$C_4$-alkyl, or $C_3$-$C_6$-cycloalkyl;

$R^{4g}$ is H, $C_1$-$C_4$-alkyl, or $C_3$-$C_6$-cycloalkyl;

V is O, or S;

W is an □-branched or straight chain $C_1$-$C_8$-alkylene, $C_3$-$C_8$-cycloalkylene, or —$C_3$-$C_8$-heterocycloalkylene, wherein W is substituted as indicated above;

T is O, S or $NR^{1b}$.

Another preferred embodiment relates to compounds of formula I*.B(va) as active ingredient, wherein $R^1$ is H, or $CH_3$, preferably $CH_3$;

$R^2$ is $CH_3$;

$R^3$ is H, chlorine, or bromine, preferably H;

$R^{4h}$ is methyl, ethyl, n-butyl, n-pentyl, n-propyl, iso-propyl, allyl, 3,3-dimethylallyl, propargyl, cyclohexyl, tetrahydro-pyranyl, tetrahydro-thiopyranyl, 3-oxetanyl, 5-oxa-[3.3.0]-bicycloheptanyl, methoxyethyl, methoxypropyl, ethoxyethyl, ethylthioethyl, methylthioethyl, difluoromethyl, trifluoromethyl, 2,2,2-trifluoroethyl, 3,3,3-trifluoropropyl, 3-chloro-2,2,3,3-tetrafluoropropyl, 3-fluoropropyl, 3,3-difluoropropyl, 2,2,2-trifluoroethylthio-ethyl, methylcarbonyl-methyl, c-propylcarbonyl-methyl, tert-butylcarbonyl-methyl, methoxycarbonyl-methyl, ethoxycarbonyl-methyl, hydroxycarbonyl-methyl, carbamoyl-methyl, N-methylcarbamoyl-methyl, N-c-propylcarbamoyl-methyl, N,N-dimethylcarbamoyl-methyl, 2-methoximino-propyl, cyclopropylmethyl, phenyl, 4-methylphenyl, 2-nitrophenyl, 3-methylthiophenyl, 4-chloro-phenyl, 4-fluoro-phenyl, 4-tert-butyl-phenyl, 4-methoxy-phenyl, 4-nitrophenyl, 4-dimethylamino-phenyl, 2-fluoro-phenyl, 2-methoxy-phenyl, 2-dimethylaminosulfonyl-phenyl, 2-dimethylaminocarbamoyl-phenyl, 3-nitrophenyl, 3-trifluoromethyl-phenyl, 3-chloro-phenyl, 2,5-dichloro-phenyl, 3,5-dichloro-phenyl, 4-chloro-3-trifluoromethyl-phenyl, 2,4,5-trichloro-phenyl, 2-pyridyl, 5-(2-chloro)pyridyl, 2-(5-methyl)-pyridyl, 2-(6-methyl)-pyridyl, 2-(3-trifluoromethyl)-pyridyl, 2-pyrimidyl, 2-(4-methyl)-pyrimidyl, 2-(5-methyl)-pyrimidyl, 2-(4-methoxy)-pyrimidyl, 2-(5-fluoro)-pyrimidyl, 2-(4-trifluoromethyl)-pyrimidyl, 2-(5-trifluoromethyl)-pyrimidyl, 2-(4,6-dimethyl)-pyrimidyl, 2-(4,5-dimethyl)-pyrimidyl, 2-(4,6-dimethoxy)-pyrimidyl, —$CH_2$-2-pyrimidyl, —$CH_2$-2-pyrazinyl, —$CH_2$-5-(1-methyl)-imidazolyl, —$CH_2$-3-(1-methyl)-pyrazolyl, —$CH_2$-4-pyridyl, —$CH_2$-2-pyridyl, —$CH_2$-2-(1-methyl)-imidazolyl, —$CH_2$-3-pyridyl, $CH_2$-2-furanyl, —$CH_2$-5-(2-chloro)-pyridyl, benzyl, 3,4-dichloro-benzyl, 2,6-difluoro-benzyl, 2-fluoro-6-methoxy-benzyl, 2,6-dichloro-benzyl, 2-chloro-6-trifluoromethyl-benzyl, 2-chloro-6-fluoro-benzyl, —$CH_2$-2-(4,6-dimethoxy)-pyrimidyl, 2,6-dimethyl-benzyl, —$CH_2$-1-(3-nitro-5-methyl)-pyrazolyl, 2-(1-methyl)-benzimidazolyl, 2-(5-methyl)-oxdiazolyl, 2-[3-methyl-6-(trifluoromethyl)-imidazo[4.5]-pyridinyl, 3-[4-ethyl-5-(trifluoromethyl)-]-1,2,4-triazolyl, 3-[4-methyl-5-(trifluoromethyl)]-1,2,4-triazolyl, 3-[4-methyl-5-(difluoromethyl)]-1,2,4-triazolyl, 2-(5-phenyl)-1,3,4-thiadiazolyl, 2-(1-methyl-5-phenyl)-imidazolyl, 2-(4,5-dimethyl)-oxazolyl, 2-(1-methyl-5-methoxycarbonyl)-imidazolyl, 2-(1-methyl)-imidazolyl, or 1,2-ethanediyl;

m is 0, or 2, preferably 0;

T is O, S or $NR^{1b}$.

Another preferred embodiment relates to compounds of formula I*.B(vb) as active ingredient, wherein $R^1$ is H, methyl, ethyl, or cyclopropyl;

$R^2$ is $CH_3$;

$R^3$ is H, chlorine, or bromine, preferably H;

$R^{4i}$ is methyl, ethyl, propyl, iso-propyl, cyclopentyl, sec-butyl, allyl, 3-methoxypropyl, 3-cyanopropyl, cyclohexyl, 3,3,3-trifluoro-propyl, 3-fluoro-propyl, 2-methylsulfanylethyl, 2-[(2,2,2-trifluoroethyl)sulfanyl]ethyl, 3,4,4,4-tetrafluoro-3-trifluoromethyl, tetrahydrofuran-3-yl, tetrahydro-2H-pyran-4yl, tetrahydro-2H-thiopyran-4-yl, phenyl, 3-methylsulfanylphenyl, 4-chlorophenyl, 4-fluorophenyl, 2,5-difluorophenyl, 2,4-difluorophenyl, 3,5-difluorophenyl, 2-chlorophenyl, 3,4-dichlorophenyl, 3-chlorophenyl, 3-trifluoromethylphenyl, 3-trifluoromethoxy-phenyl, 4-fluorobenzyl, pyridin-2-yl, pyrimidin-2-ylmethyl, 5-chloropyridin-3-yl, 6-chloropyridin-3-yl, 5-fluoropyridin-3-yl, 6-methoxypyridin-3-yl, 5-trifluoromethyl-pyridin-3-yl, pyridin-3-ylmethyl, 6-fluoropyridin-3-yl, 6-methylpyridin-3-yl, 6-[6-chloropyridin-3-yloxy]pyridin-3-yl, 6-[6-fluoropyridin-3-yloxy]pyridin-3-yl, 6-{6-[6-fluoropyridin-3-yloxy]pyridin-3-yl}oxypyridin-3-yl, 4-methylpyridin-3-yl, 5-methylpyridin-3-yl, pyridin-3-yl, 6-trifluoromethylpyridin-3-yl, 6-chloro-5-methylpyridin-3-yl, 6-cyanopyridin-3-yl, 6-chloro-4-methylpyridin-3-yl, 5-methoxypyridin-3-yl, 6-bromopyridin-3-yl, 5-cyanopyridin-3-yl, quinolin-3-yl, 5,6-dimethoxypyridin-3-yl, 4-chloropyridin-3-yl, 2-chloropyridin-3-yl, 5-bromopyridin-3-yl, 5-chloro-2-methoxypyridin-3-yl, 2-fluoro-6-methylpyridin-3-yl, 3-cyanophenyl, 3-ethoxyphenyl, 3-acetamidophenyl, 3-ethylphenyl, 3-methoxyphenyl, 3-propylphenyl, 2-fluoro-3-trifluoromethyl phenyl, 3-methylphenyl, 3-methylsulfonylphenyl, 3-phenoxyphenyl, 3-butylsulfanylphenyl, 4-fluoro-3-trifluoromethylphenyl, 3-methoxycarbonoimidoylphenyl, 3-chloro-4-methylphenyl, 3-fluoro-5-trifluoromethylphenyl, 3-chloro-5-trifluoromethylphenyl, 3-chloro-5-methoxyphenyl, or 3-chloro-4-fluorophenyl, or 3-trifluoromethylphenyl;

T is O, S or $NR^{1b}$.

Another preferred embodiment relates to compounds of formula I*.B(vc) as active ingredient, wherein $R^1$ is methyl, ethyl, or cyclopropyl;

$R^2$ is $CH_3$;

$R^3$ is H;

$R^{4j}$ and $R^{4k}$ together with the nitrogen atom to which they are bonded form a 5- or 6-membered heterocycle, which heterocycle contains the nitrogen atom as heteroatom;

T is O, S or $NR^{1b}$.

Another preferred embodiment relates to compounds of formula I*.B(via) as active ingredient, wherein $R^1$ is methyl, ethyl, or cyclopropyl;

$R^2$ is $CH_3$;

$R^3$ is H;

$R^{4l}$ is H, methyl, ethyl, iso-propyl, 1-cyano-1-methylethyl, or cyclopropyl;

$T^1$ is as defined above;

T is O, S or $NR^{1b}$.

Another preferred embodiment relates to compounds of formula I*.B(vib) as active ingredient, wherein $R^1$ is methyl, ethyl, or cyclopropyl;

$R^2$ is $CH_3$;

$R^3$ is H;

$R^{4m}$ is methyl, or ethyl;

T is O, S or $NR^{1b}$.

Another preferred embodiment relates to compounds of formula I*.B(vic) as active ingredient, wherein $R^1$ is methyl, ethyl, or cyclopropyl;

$R^2$ is $CH_3$;

$R^3$ is H;

$R^{4n}$ is H, methyl, ethyl, methylsulfonyl, or cyclopropylsulfonyl;

$R^{4o}$ is H, methyl, ethyl, iso-propyl, iso-butyl, tert-butyl, 2,2,2-trifluoroethyl, 2-hydroxyethyl, 2-methoxyethyl, cyanomethyl, methoxycarbonylmethyl, ethoxycarbonylmethyl, cyclopropyl, 1-cyanocyclopropyl, cyclopentyl, cyclopropylmethyl, methoxy, ethoxy, phenyl, pyridin-3-yl, phenylmethyl, or 1-phenyl-2-hydroxyethyl; or $R^{4n}$ and $R^{4o}$ together are $(CH_2)_5$, $(CH_2)_4$, $(CH_2)_3$, or $(CH_2)_2O(CH_2)_2$;

Y is O, or S;

T is O, S or $NR^{1b}$.

Another preferred embodiment relates to compounds of formula I*.B(vid) as active ingredient, wherein $R^1$ is methyl, ethyl, or cyclopropyl;

$R^2$ is $CH_3$;

$R^3$ is H;

$R^{4p}$ is H, $C_1$-$C_6$-alkyl, $C_3$-$C_6$-alkenyl, or $C_3$-$C_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above;

$R^{4q}$ is H, $C_1$-$C_6$-alkyl, $C_3$-$C_6$-alkenyl, or $C_3$-$C_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above; and $R^{4r}$ is H, $C_1$-$C_4$-alkyl, $C_3$-$C_6$-alkenyl, or $C_3$-$C_6$-alkynyl, which are unsubstituted or substituted as indicated above, or $C_3$-$C_8$-cycloalkyl, or $C_3$-$C_8$-cycloalkyl-$C_1$-$C_4$-alkyl, which are unsubstituted or substituted as indicated above, or aryl, hetaryl, arylalkyl, or hetarylalkyl, which are unsubstituted or substituted as indicated above;

Y is O, or S;

T is O, S or $NR^{1b}$.

Another preferred embodiment relates to compounds of formula I*.B(vii) as active ingredient, wherein $R^1$ is H, methyl, ethyl, preferably methyl and ethyl;

$R^2$ is $CH_3$;

$R^3$ is H, chlorine, bromine, preferably H;

$R^{4s}$ is 3-[(2,2,2-trifluoroethyl)sulfanyl]phenyl, 2-fluoro-4-methyl-5-[(2,2,2-trifluoroethyl)sulfanyl]phenyl, 3-(methylsulfanyl)phenyl, pyrimidin-2-yl, 3-[(2,2,2-trifluoroethyl)sulfinyl]phenyl, phenyl, pyridin-3-yl, 3,5-di methyl phenyl, 2-chlorophenyl, 3-chlorophenyl, 4-chlorophenyl, 2,4-dichlorophenyl, 3,4-dichlorophenyl, 1-methyl-1H-pyrrol-2-yl, 3-furyl, 2,5-dimethyl-3-thienyl, 3-[(trifluoromethyl)sulfanyl]phenyl, 3-[(cyclopropylmethyl)sulfanyl]phenyl, 3-(methoxymethyl)phenyl, 3-[(tetrahydro-2H-pyran-4-yloxy)methyl]phenyl, 3-(dimethylsulfamoyl)phenyl, 3-(methylsulfonyl)phenyl, 4-methyl-3-(methylsulfanyl) phenyl, 1-(2-cyanophenyl)-1H-pyrazol-4-yl, 1-(4-fluorophenyl)-1H-pyrazol-4-yl, 1-phenyl-1H-pyrazol-4-yl, 1-naphthyl, 5-(methoxycarbonyl)-1-naphthyl, 4-fluoro-2-(methoxycarbonyl)phenyl, 4-fluoro-1-naphthyl, 4-chloro-3-(ethoxycarbonyl)phenyl, 2-(methoxycarbonyl)phenyl, pyridin-4-yl, 6-(ethoxycarbonyl)pyridin-2-yl, 3-(ethoxycarbonyl)phenyl, 2-naphthyl, 4-methoxy-3-(methoxycarbonyl)phenyl, 4-chloro-2-(methoxycarbonyl)phenyl, 3-thienyl, 3-(2-ethoxy-2-oxoethoxy)-4-methylphenyl, 3-(2-ethoxy-2-oxoethoxy)phenyl, 3-(2-ethoxy-2-oxoethoxy)4,5-difluorophenyl, 3-(2-ethoxy-2-oxoethoxy)-4-fluorophenyl, 3-(ethoxycarbonyl)-4-fluorophenyl, (3-{[(cyclopropylcarbonyl)oxy]methyl}phenyl, 3-{[(cyclopropylcarbonyl)oxy]methyl}-4-fluorophenyl, pyridin-2-yl, 3-(difluoromethyl)phenyl, 3-[(trifluoromethyl)sulfinyl]phenyl, 4-fluoro-3-(trifluoromethyl)phenyl, 3-chloro-5-(trifluoromethyl)phenyl, 3-(trifluoromethyl)phenyl, 3,5-bis(trifluoromethyl)phenyl, 3-fluoro-5-(trifluoromethyl)phenyl, 4-cyano-3-(trifluoromethyl)phenyl, 3-(2,2,2-trifluoroethyl)phenyl, 3-(pentafluoroethyl)phenyl, 3-cyanophenyl, 4-chloro-3-cyanophenyl, 3-cyano-5-fluorophenyl, 3-cyano-5-(trifluoromethyl)phenyl, 5-cyano-2-methoxyphenyl, 3-cyano-4-fluorophenyl, 5-cyanopyridin-3-yl, 5-cyano-6-(dimethylamine)pyridin-3-yl, 5-cyano-6-(morpholin-4-yl)pyridin-3-yl, 5-cyano-6-ethoxypyridin-3-yl, 5-cyano-6-methoxypyridin-3-yl, 3-chloro-5-cyanophenyl, 1-benzofuran-2-yl, 3-phenyl-1,2-oxazol-5-yl, 3-(ethoxycarbonyl)-1,2-oxazol-5-yl, 1-isopropyl-1H-1,2,3-triazol-4-yl, 1-methyl-1H-1,2,3-triazol-4-yl, 5-cyano-6-methoxypyridin-3-yl, 6-methoxypyridin-2-yl, 2,3-dihydro-1-benzofuran-7-yl, 1-benzofuran-7-yl, 2,6-dimethoxypyridin-3-yl, 2-methoxyphenyl, 1,3-benzodioxol-4-yl, 2,4-dimethoxyphenyl, 2,5-dimethoxyphenyl, 6-(trifluoromethyl)pyridin-2-yl, 5-chloro-2-methoxypyridin-3-yl, 2-methoxypyridin-3-yl, 6-ethoxypyridin-3-yl, 5-chloro-6-methoxypyridin-3-yl, 2-(methylsulfanyl)pyridin-3-yl, 2-ethoxypyridin-3-yl, 5,6-dimethoxypyridin-3-yl, 2-methoxypyridin-4-yl, 6-methoxy-5-(trifluoromethyl)pyridin-3-yl, 6-methoxy-5-nitropyridin-3-yl, 2,6-di methoxypyridin-4-yl, 2-(methylsulfanyl)phenyl, 2-methoxy-6-(trifluoromethyl)-pyridin-4-yl, 3-cyano-5-methoxyphenyl, 5-fluoro-2-methoxypyridin-3-yl, 6-isopropoxypyridin-3-yl, 6-methoxypyridin-3-yl, 2-(2-amino-2-oxoethoxy)phenyl, 3-cyano-4-isopropoxyphenyl, or 3-chloropyridin-2-yl;

T is O, S or $NR^{1b}$.

Another preferred embodiment relates to compounds of formula I*.B(viii) as active ingredient, wherein $R^1$ is methyl, ethyl, or cyclopropyl;

$R^2$ is $CH_3$;

$R^3$ is H;

$R^{4t}$ is H, methyl, trifluoromethyl, trichloromethyl, isopropyl, isobutyl, isopentyl, phenyl, 2-chlorophenyl, 3-chlorophenyl, 4-chlorophenyl, 3,4-dichlorophenyl, 2-pyridinyl, 3-pyridinyl, 4-pyridinyl, 4-chloropyridin-3-yl, 2-pyrimidyl, or benzyl;

$R^{4u}$ is H, or methyl; or $R^{4t}$ and $R^{4u}$ together are vinyl, prop-1-en-2-yl, (1E)-prop-1-en-1-yl, (1Z)-prop-1-en-1-yl, or cyclopropyl;

$R^{4v}$ is H, $S(O)_m R^{1E}$, $OR^{2E}$, or $N(R^{3E})(R^{4E})$, wherein if $R^{4t}$ and/or $R^{4u}$ is H, or $C_1$-$C_8$-alkyl, $R^{4v}$ is $S(O)_m R^{1E}$, $OR^{2E}$, or $N(R^{3E})(R^{4E})$;

$R^{1E}$ is methyl, ethyl, isopropyl, isobutyl, tert-butyl, cyclopropylmethyl, 2,2-dimethylpropyl, 2-methoxy-2-oxo-ethyl, phenyl, 2-chlorophenyl, 3-chlorophenyl, 4-chlorophenyl, or 2-pyrimidyl;

$R^{2E}$ is H, methyl, ethyl, 2,2,2-trifluoroethyl, isopropyl, cyclopropylmethyl, benzyl, 3-chlorophenyl, or 4-chloro-phenyl;

$R^{3E}$ and $R^{4E}$ together with the nitrogen atom to which they are bonded form a 5-membered heterocycle, which heterocyclyl group contains one or two N-atoms, which cyclic groups may contain one group CO, and wherein the C-atoms are substituted with trifluoromethyl, methyl, or cyclopropyl;

T is O, S or $NR^{1b}$.

More preferred embodiments relate to compounds of formula I*.1.A(iiia) as active ingredient, wherein $R^1$ is H, $CH_3$, or $C_2H_5$, preferably H, or $CH_3$;

$R^2$ is $CH_3$, or halomethyl;

$R^3$ is H; and wherein at least one of $R^{4a}$, $R^{4b}$ and $R^{4o}$ is $C_3$-$C_4$-cycloalkenyl, $C_3$-$C_4$-halocycloalkenyl, $OR^a$, or $SR^a$, wherein $R^a$ is $C_3$-$C_4$-cycloalkenyl, or $C_3$-$C_4$-halocycloalkenyl.

Further more preferred embodiments relate to compounds of formula I*.1.A(iiib) as active ingredient, wherein $R^1$ is H, $CH_3$, or $C_2H_5$, preferably H, or $CH_3$;

$R^2$ is $CH_3$, or halomethyl;

$R^3$ is H;

$R^{4a}$ is as defined above;

A is a $C_3$-$C_4$-cycloalkenyl, or $C_3$-$C_4$-halocycloalkenyl group.

Further more preferred embodiments relate to compounds of formula I*.1.A(iiic) as active ingredient, wherein $R^1$ is H, $CH_3$, or $C_2H_5$, preferably H, or $CH_3$;

$R^2$ is $CH_3$, or halomethyl;

$R^3$ is H;

$R^{4a}$ and $R^{4b}$ as defined above;

E is a $C_3$-$C_4$-cycloalkenyl, or $C_3$-$C_4$-halocycloalkenyl group.

Further more preferred embodiments relate to compounds of formula I*.1.A(iiid) as active ingredient, wherein $R^1$ is H, $CH_3$, or $C_2H_5$, preferably H, or $CH_3$;

$R^2$ is $CH_3$, or halomethyl;

$R^3$ is H;

$R^{4d}$ is $C_1$-$C_2$-haloalkyl, or $c$-$C_3H_5$, wherein the C-atoms may be halogenated;

G is a $C_3$-$C_4$-cycloalkenyl, or $C_3$-$C_4$-halocycloalkenyl group.

Further more preferred embodiments relate to compounds of formula I*.1.A(iva) as active ingredient, wherein $R^1$ is H, $CH_3$, or $C_2H_5$, preferably H, or $CH_3$;

$R^2$ is $CH_3$, or halomethyl;

$R^3$ is H;

$R^{4e}e$ is H, or $CH_3$;

Q is a direct bond, or an □-branched or straight chain $C_1$-$C_8$-alkylene, $C_2$-$C_8$-alkenylene, or $C_2$-$C_8$-alkynylene, which carbon chains can be substituted or unsubstituted as indicated above;

M is O, S, $NOCH_3$, or $NSCH_3$.

Further more preferred embodiments relate to compounds of formula I*.1.A(ivb) as active ingredient, wherein $R^1$ is H, $CH_3$, or $C_2H_5$, preferably H, or $CH_3$;

$R^2$ is $CH_3$, or halomethyl;

$R^3$ is H;

$R^{4f}$ is H, $C_1$-$C_4$-alkyl, or $C_3$-$C_6$-cycloalkyl;

$R^{4g}$ is H, $C_1$-$C_4$-alkyl, or $C_3$-$C_6$-cycloalkyl;

V is O, or S;

W is an □-branched or straight chain $C_1$-$C_8$-alkylene, $C_3$-$C_8$-cycloalkylene, or —$C_5$-$C_8$-heterocycloalkylene, wherein W is substituted as indicated above.

Further more preferred embodiments relate to compounds of formula I*.1.A(va) as active ingredient, wherein $R^1$ is H, or $CH_3$, preferably $CH_3$;

$R^2$ is $CH_3$;

$R^3$ is H, chlorine, or bromine, preferably H;

$R^{4h}$ is methyl, ethyl, n-butyl, n-pentyl, n-propyl, isopropyl, allyl, 3,3-dimethylallyl, propargyl, cyclohexyl, tetrahydro-pyranyl, tetrahydro-thiopyranyl, 3-oxetanyl, 5-oxa-[3.3.0]-bicycloheptanyl, methoxyethyl, methoxypropyl, ethoxyethyl, ethylthioethyl, methylthioethyl, difluoromethyl, trifluoromethyl, 2,2,2-trifluoroethyl, 3,3,3-trifluoropropyl, 3-chloro-2,2,3,3-tetrafluoropropyl, 3-fluoropropyl, 3,3-difluoropropyl, 2,2,2-trifluoroethylthio-ethyl, methylcarbonyl-methyl, c-propylcarbonyl-methyl, tert-butylcarbonyl-methyl, methoxycarbonyl-methyl, ethoxycarbonyl-methyl, hydroxycarbonyl-methyl, carbamoyl-methyl, N-methylcarbamoyl-methyl, N-c-propylcarbamoyl-methyl, N,N-dimethylcarbamoyl-methyl, 2-methoximino-propyl, cyclopropylmethyl, phenyl, 4-methylphenyl, 2-nitrophenyl, 3-methylthiophenyl, 4-chloro-phenyl, 4-fluoro-phenyl, 4-tert-butyl-phenyl, 4-methoxy-phenyl, 4-nitrophenyl, 4-dimethylamino-phenyl, 2-fluoro-phenyl, 2-methoxy-phenyl, 2-dimethylaminosulfonyl-phenyl, 2-dimethylaminocarbamoyl-phenyl, 3-nitrophenyl, 3-trifluoromethyl-phenyl, 3-chloro-phenyl, 2,5-dichloro-phenyl, 3,5-dichloro-phenyl, 4-chloro-3-trifluoromethyl-phenyl, 2,4,5-trichloro-phenyl, 2-pyridyl, 5-(2-chloro)pyridyl, 2-(5-methyl)-pyridyl, 2-(6-methyl)-pyridyl, 2-(3-trifluoromethyl)-pyridyl, 2-pyrimidyl, 2-(4-methyl)-pyrimidyl, 2-(5-methyl)-pyrimidyl, 2-(4-methoxy)-pyrimidyl, 2-(5-fluoro)-pyrimidyl, 2-(4-trifluoromethyl)-pyrimidyl, 2-(5-trifluoromethyl)-pyrimidyl, 2-(4,6-dimethyl)-pyrimidyl, 2-(4,5-dimethyl)-pyrimidyl, 2-(4,6-dimethoxy)-pyrimidyl, —$CH_2$-2-pyrimidyl, —$CH_2$-2-pyrazinyl, —$CH_2$-5-(1-methyl)-imidazolyl, —$CH_2$-3-(1-methyl)-pyrazolyl, —$CH_2$-4-pyridyl, —$CH_2$-2-pyridyl, —$CH_2$-2-(1-methyl)-imidazolyl, —$CH_2$-3-pyridyl, $CH_2$-2-furanyl, —$CH_2$-5-(2-chloro)-pyridyl, benzyl, 3,4-dichloro-benzyl, 2,6-difluoro-benzyl, 2-fluoro-6-methoxy-benzyl, 2,6-dichloro-benzyl, 2-chloro-6-trifluoromethyl-benzyl, 2-chloro-6-fluoro-benzyl, —$CH_2$-2-(4,6-dimethoxy)-pyrimidyl, 2,6-dimethyl-benzyl, —$CH_2$-1-(3-nitro-5-methyl)-pyrazolyl, 2-(1-methyl)-benzimidazolyl, 2-(5-methyl)-oxdiazolyl, 2-[3-methyl-6-(trifluoromethyl)-imidazo[4.5]-pyridinyl, 3-[4-ethyl-5-(trifluoromethyl)-]-1,2,4-triazolyl, 3-[4-methyl-5-(trifluoromethyl)]-1,2,4-triazolyl, 3-[4-methyl-5-(difluoromethyl)]-1,2,4-triazolyl, 2-(5-phenyl)-1,3,4-thiadiazolyl, 2-(1-methyl-5-phenyl)-imidazolyl, 2-(4,5-dimethyl)-oxazolyl, 2-(1-methyl-5- methoxycarbonyl)-imidazolyl, 2-(1-methyl)-imidazolyl, or 1,2-ethanediyl;
m is 0, or 2, preferably 0.

Further more preferred embodiments relate to compounds of formula I*.1.A(vb) as active ingredient, wherein
$R^1$ is H, methyl, ethyl, or cyclopropyl;
$R^2$ is $CH_3$;
$R^3$ is H, chlorine, or bromine, preferably H;
$R^{4i}$ is methyl, ethyl, propyl, iso-propyl, cyclopentyl, sec-butyl, allyl, 3-methoxypropyl, 3-cyanopropyl, cyclohexyl, 3,3,3-trifluoro-propyl, 3-fluoro-propyl, 2-methylsulfanylethyl, 2-[(2,2,2-trifluoroethyl)sulfanyl]ethyl, 3,4,4,4-tetrafluoro-3-trifluoromethyl, tetrahydrofuran-3-yl, tetrahydro-2H-pyran-4yl, tetrahydro-2H-thiopyran-4-yl, phenyl, 3-methylsulfanylphenyl, 4-chlorophenyl, 4-fluorophenyl, 2,5-difluorophenyl, 2,4-difluorophenyl, 3,5-difluorophenyl, 2-chlorophenyl, 3,4-dichlorophenyl, 3-chlorophenyl, 3-trifluoromethylphenyl, 3-trifluoromethoxy-phenyl, 4-fluorobenzyl, pyridin-2-yl, pyrimidin-2-ylmethyl, 5-chloropyridin-3-yl, 6-chloropyridin-3-yl, 5-fluoropyridin-3-yl, 6-methoxypyridin-3-yl, 5-trifluoromethyl-pyridin-3-yl, pyridin-3-ylmethyl, 6-fluoropyridin-3-yl, 6-methylpyridin-3-yl, 6-[6-chloropyridin-3-yloxy]pyridin-3-yl, 6-[6-fluoropyridin-3-yloxy]pyridin-3-yl, 6-{6-[6-fluoropyridin-3-yloxy]pyridin-3-yl}oxypyridin-3-yl, 4-methylpyridin-3-yl, 5-methylpyridin-3-yl, pyridin-3-yl, 6-trifluoromethylpyridin-3-yl, 6-chloro-5-methylpyridin-3-yl, 6-cyanopyridin-3-yl, 6-chloro-4-methylpyridin-3-yl, 5-methoxypyridin-3-yl, 6-bromopyridin-3-yl, 5-cyanopyridin-3-yl, quinolin-3-yl, 5,6-dimethoxypyridin-3-yl, 4-chloropyridin-3-yl, 2-chloropyridin-3-yl, 5-bromopyridin-3-yl, 5-chloro-2-methoxypyridin-3-yl, 2-fluoro-6-methylpyridin-3-yl, 3-cyanophenyl, 3-ethoxyphenyl, 3-acetamidophenyl, 3-ethylphenyl, 3-methoxyphenyl, 3-propylphenyl, 2-fluoro-3-trifluoromethyl phenyl, 3-methylphenyl, 3-methylsulfonylphenyl, 3-phenoxyphenyl, 3-butylsulfanylphenyl, 4-fluoro-3-trifluoromethylphenyl, 3-methoxycarbonoimidoylphenyl, 3-chloro-4-methylphenyl, 3-fluoro-5-trifluoromethylphenyl, 3-chloro-5-trifluoromethylphenyl, 3-chloro-5-methoxyphenyl, or 3-chloro-4-fluorophenyl, or 3-trifluoromethylphenyl.

Further more preferred embodiments relate to compounds of formula I*.1.A(vc) as active ingredient, wherein
$R^1$ is methyl, ethyl, or cyclopropyl;
$R^2$ is $CH_3$;
$R^3$ is H;
$R^{4j}$ and $R^{4k}$ together with the nitrogen atom to which they are bonded form a 5- or 6-membered heterocycle, which heterocycle contains the nitrogen atom as heteroatom.

Further more preferred embodiments relate to compounds of formula I*.1.A(via) as active ingredient, wherein
$R^1$ is methyl, ethyl, or cyclopropyl;
$R^2$ is $CH_3$;
$R^3$ is H;
$R^{4l}$ is H, methyl, ethyl, iso-propyl, 1-cyano-1-methyl-ethyl, or cyclopropyl;
$T^1$ is as defined above.

Further more preferred embodiments relate to compounds of formula I*.1.A(vib) as active ingredient, wherein
$R^1$ is methyl, ethyl, or cyclopropyl;
$R^2$ is $CH_3$;
$R^3$ is H;
$R^{4m}$ is methyl, or ethyl.

Further more preferred embodiments relate to compounds of formula I*.1.A(vic) as active ingredient, wherein
$R^1$ is methyl, ethyl, or cyclopropyl;
$R^2$ is $CH_3$;
$R^3$ is H;
$R^{4n}$ is H, methyl, ethyl, methylsulfonyl, or cyclopropylsulfonyl;
$R^{4o}$ is H, methyl, ethyl, iso-propyl, iso-butyl, tert-butyl, 2,2,2-trifluoroethyl, 2-hydroxyethyl, 2-methoxyethyl, cyanomethyl, methoxycarbonylmethyl, ethoxycarbonylmethyl, cyclopropyl, 1-cyanocyclopropyl, cyclopentyl, cyclopropylmethyl, methoxy, ethoxy, phenyl, pyridin-3-yl, phenylmethyl, or 1-phenyl-2-hydroxyethyl; or
$R^{4n}$ and $R^{4o}$ together are $(CH_2)_5$, $(CH_2)_4$, $(CH_2)_3$, or $(CH_2)_2O(CH_2)_2$;
Y is O, or S.

Further more preferred embodiments relates to compounds of formula I*.1.A(vid) as active ingredient, wherein
$R^1$ is methyl, ethyl, or cyclopropyl;
$R^2$ is $CH_3$;
$R^3$ is H;
$R^{4p}$ is H, $C_1$-$C_6$-alkyl, $C_3$-$C_6$-alkenyl, or $C_3$-$C_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above;
$R^{4q}$ is H, $C_1$-$C_6$-alkyl, $C_3$-$C_6$-alkenyl, or $C_3$-$C_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above;
$R^{4r}$ is H, $C_1$-$C_4$-alkyl, $C_3$-$C_6$-alkenyl, or $C_3$-$C_6$-alkynyl, which are unsubstituted or substituted as indicated above, or $C_3$-$C_8$-cycloalkyl, or $C_3$-$C_8$-cycloalkyl-$C_1$-$C_4$-alkyl, which are unsubstituted or substituted as indicated above, or aryl, hetaryl, arylalkyl, or hetarylalkyl, which are unsubstituted or substituted as indicated above;
Y is O, or S.

Further more preferred embodiments relate to compounds of formula I*.1.A(vii) as active ingredient, wherein
$R^1$ is H, methyl, ethyl, preferably methyl and ethyl;
$R^2$ is $CH_3$;
$R^3$ is H, chlorine, bromine, preferably H;
$R^{4s}$ is 3-[(2,2,2-trifluoroethyl)sulfanyl]phenyl, 2-fluoro-4-methyl-5-[(2,2,2-trifluoroethyl)sulfanyl]phenyl, 3-(methylsulfanyl)phenyl, pyrimidin-2-yl, 3-[(2,2,2-trifluoroethyl)sulfinyl]phenyl, phenyl, pyridin-3-yl, 3,5-di methyl phenyl, 2-chlorophenyl, 3-chlorophenyl, 4-chlorophenyl, 2,4-dichlorophenyl, 3,4-dichlorophenyl, 1-methyl-1H-pyrrol-2-yl, 3-furyl, 2,5-dimethyl-3-thienyl, 3-[(trifluoromethyl)sulfanyl]phenyl, 3-[(cyclopropylmethyl)sulfanyl]phenyl, 3-(methoxymethyl)phenyl, 3-[(tetrahydro-2H-pyran-4-yloxy)methyl]phenyl, 3-(dimethylsulfamoyl)phenyl, 3-(methylsulfonyl)phenyl, 4-methyl-3-(methylsulfanyl)phenyl, 1-(2-cyanophenyl)-1H-pyrazol-4-yl, 1-(4-fluorophenyl)-1H-pyrazol-4-yl, 1-phenyl-1H-pyrazole-4-yl, 1-naphthyl, 5-(methoxycarbonyl)-1-naphthyl, 4-fluoro-2-(methoxycarbonyl) phenyl, 4-fluoro-1-naphthyl, 4-chloro-3-(ethoxycarbonyl)phenyl, 2-(methoxycarbonyl)phenyl, pyridin-4-yl, 6-(ethoxycarbonyl)pyridin-2-yl, 3-(ethoxycarbonyl)phenyl, 2-naphthyl, 4-methoxy-3-(methoxycarbonyl)phenyl, 4-chloro-2-(methoxycarbonyl) phenyl, 3-thienyl, 3-(2-ethoxy-2-oxoethoxy)-4-methylphenyl, 3-(2-ethoxy-2-oxoethoxy)phenyl, 3-(2-ethoxy-2-oxoethoxy)4,5-difluorophenyl, 3-(2-ethoxy-2-oxoethoxy)-4-fluorophenyl, 3-(ethoxycarbonyl)-4-fluorophenyl, (3-{[(cyclopropylcarbonyl)oxy]methyl}phenyl, 3-{[(cyclopropylcarbonyl)oxy]methyl}-4-fluorophenyl, pyridin-2-yl, 3-(difluoromethyl)phenyl, 3-[(trifluoromethyl)sulfinyl]phenyl, 4-fluoro-3-(trifluoromethyl)phenyl, 3-chloro-5-(trifluoromethyl)phenyl, 3-(trifluoromethyl)phenyl, 3,5-bis(trifluoromethyl)phenyl, 3-fluoro-5-(trifluoromethyl)phenyl, 4-cyano-3-(trifluoromethyl)phenyl, 3-(2,2,2-trifluoroethyl)phenyl, 3-(pentafluoroethyl)phenyl, 3-cyanophenyl, 4-chloro-3-cyanophenyl, 3-cyano-5-fluorophenyl, 3-cyano-5-(trifluoromethyl)phenyl, 5-cyano-2-methoxyphenyl, 3-cyano-4-fluorophenyl, 5-cyanopyridin-3-yl, 5-cyano-6-(dimethylamine)pyridin-3-yl, 5-cyano-6-(morpholin-4-yl)pyridin-3-yl, 5-cyano-6-ethoxypyridin-3-yl, 5-cyano-6-methoxypyridin-3-yl, 3-chloro-5-cyanophenyl, 1-benzofuran-2-yl, 3-phenyl-1,2-oxazol-5-yl, 3-(ethoxycarbonyl)-1,2-oxazol-5-yl, 1-isopropyl-1H-1,2,3-triazol-4-yl, 1-methyl-1H-1,2,3-triazol-4-yl, 5-cyano-6-methoxypyridin-3-yl, 6-methoxypyridin-2-yl, 2,3-dihydro-1-benzofuran-7-yl, 1-benzofuran-7-yl, 2,6-dimethoxypyridin-3-yl, 2-methoxyphenyl, 1,3-benzodioxol-4-yl, 2,4-dimethoxyphenyl, 2,5-dimethoxyphenyl, 6-(trifluoromethyl)pyridin-2-yl, 5-chloro-2-methoxypyridin-3-yl, 2-methoxypyridin-3-yl, 6-ethoxypyridin-3-yl, 5-chloro-6-methoxypyridin-3-yl, 2-(methylsulfanyl)pyridin-3-yl, 2-ethoxypyridin-3-yl, 5,6-dimethoxypyridin-3-yl, 2-methoxypyridin-4-yl, 6-methoxy-5-(trifluoromethyl)pyridin-3-yl, 6-methoxy-5-nitropyridin-3-yl, 2,6-di methoxypyridin-4-yl, 2-(methylsulfanyl)phenyl, 2-methoxy-6-(trifluoromethyl)-pyridin-4-yl, 3-cyano-5-methoxyphenyl, 5-fluoro-2-methoxypyridin-3-yl, 6-isopropoxypyridin-3-yl, 6-methoxypyridin-3-yl, 2-(2-amino-2-oxoethoxy)phenyl, 3-cyano-4-isopropoxyphenyl, or 3-chloropyridin-2-yl.

Further more preferred embodiments relate to compounds of formula I*.1.A(viii) as active ingredient, wherein
$R^1$ is methyl, ethyl, or cyclopropyl;
$R^2$ is $CH_3$;
$R^3$ is H;
$R^{4t}$ is H, methyl, trifluoromethyl, trichloromethyl, isopropyl, isobutyl, isopentyl, phenyl, 2-chlorophenyl, 3-chlorophenyl, 4-chlorophenyl, 3,4-dichlorophenyl, 2-pyridinyl, 3-pyridinyl, 4-pyridinyl, 4-chloropyridin-3-yl, 2-pyrimidyl, or benzyl;
$R^{4u}$ is H, or methyl; or
$R^{4t}$ and $R^{4u}$ together are vinyl, prop-1-en-2-yl, (1E)-prop-1-en-1-yl, (1Z)-prop-1-en-1-yl, or cyclopropyl;
$R^{4v}$ is H, $S(O)_mR^{1E}$, $OR^{2E}$, or $N(R^{3E})(R^{4E})$, wherein if $R^{4t}$ and/or $R^{4u}$ is H, or $C_1$-$C_8$-alkyl, $R^{4v}$ is $S(O)_mR^{1E}$, $OR^{2E}$, or $N(R^{3E})(R^{4E})$;
$R^{1E}$ is methyl, ethyl, isopropyl, isobutyl, tert-butyl, cyclopropylmethyl, 2,2-dimethylpropyl, 2-methoxy-2-oxoethyl, phenyl, 2-chlorophenyl, 3-chlorophenyl, 4-chlorophenyl, or 2-pyrimidyl;
$R^{2E}$ is H, methyl, ethyl, 2,2,2-trifluoroethyl, isopropyl, cyclopropylmethyl, benzyl, 3-chlorophenyl, or 4-chloro-phenyl;
$R^{3E}$ and $R^{4E}$ together with the nitrogen atom to which they are bonded form a 5-membered heterocycle, which heterocyclyl group contains one or two N-atoms, which cyclic groups may contain one group CO, and wherein the C-atoms are substituted with trifluoromethyl, methyl, or cyclopropyl.

Further more preferred embodiments relate to compounds of formula I*.1.B(iiia) as active ingredient
$R^1$ is H, $CH_3$, or $C_2H_5$, preferably H, or $CH_3$;
$R^2$ is $CH_3$, or halomethyl;
$R^3$ is H; and wherein
at least one of $R^{4a}$, $R^{4b}$ and $R^{4o}$ is $C_3$-$C_4$-cycloalkenyl, $C_3$-$C_4$-halocycloalkenyl, $OR^a$, or $SR^a$, wherein $R^a$ is $C_3$-$C_4$-cycloalkenyl, or $C_3$-$C_4$-halocycloalkenyl.

Further more preferred embodiments relate to compounds of formula I*.1.B(iiib) as active ingredient, wherein
$R^1$ is H, $CH_3$, or $C_2H_5$, preferably H, or $CH_3$;
$R^2$ is $CH_3$, or halomethyl;
$R^3$ is H;
$R^{4a}$ is as defined above;
A is a $C_3$-$C_4$-cycloalkenyl, or $C_3$-$C_4$-halocycloalkenyl group.

Further more preferred embodiments relate to compounds of formula I*.1.B(iiic) as active ingredient, wherein
$R^1$ is H, $CH_3$, or $C_2H_5$, preferably H, or $CH_3$;
$R^2$ is $CH_3$, or halomethyl;
$R^3$ is H;
$R^{4a}$ and $R^{4b}$ as defined above;
E is a $C_3$-$C_4$-cycloalkenyl, or $C_3$-$C_4$-halocycloalkenyl group.

Further more preferred embodiments relate to compounds of formula I*.1.B(iiid) as active ingredient, wherein
$R^1$ is H, $CH_3$, or $C_2H_5$, preferably H, or $CH_3$;
$R^2$ is $CH_3$, or halomethyl;
$R^3$ is H;
$R^{4d}$ is $C_1$-$C_2$-haloalkyl, or c-$C_3H_5$, wherein the C-atoms may be halogenated;
G is a $C_3$-$C_4$-cycloalkenyl, or $C_3$-$C_4$-halocycloalkenyl group.

Further more preferred embodiments relate to compounds of formula I*.1.B(iva) as active ingredient, wherein
$R^1$ is H, $CH_3$, or $C_2H_5$, preferably H, or $CH_3$;
$R^2$ is $CH_3$, or halomethyl;
$R^3$ is H;
$R^{4e}$ is H, or $CH_3$;
Q is a direct bond, or an □-branched or straight chain $C_1$-$C_8$-alkylene, $C_2$-$C_8$-alkenylene, or $C_2$-$C_8$-alkynylene, which carbon chains can be substituted or unsubstituted as indicated above;
M is O, S, $NOCH_3$, or $NSCH_3$.

Further more preferred embodiments relate to compounds of formula I*.1.B(ivb) as active ingredient, wherein
$R^1$ is H, $CH_3$, or $C_2H_5$, preferably H, or $CH_3$;
$R^2$ is $CH_3$, or halomethyl;
$R^3$ is H;
$R^{4f}$ is H, $C_1$-$C_4$-alkyl, or $C_3$-$C_6$-cycloalkyl;
$R^{4g}$ is H, $C_1$-$C_4$-alkyl, or $C_3$-$C_6$-cycloalkyl;
V is O, or S;
W is an □-branched or straight chain $C_1$-$C_8$-alkylene, $C_3$-$C_8$-cycloalkylene, or $C_3$-$C_8$-heterocycloalkylene, wherein W is substituted as indicated above.

Further more preferred embodiments relate to compounds of formula I*.1.B(va) as active ingredient, wherein
$R^1$ is H, or $CH_3$, preferably $CH_3$;
$R^2$ is $CH_3$;
$R^3$ is H, chlorine, or bromine, preferably H;
$R^{4h}$ is methyl, ethyl, n-butyl, n-pentyl, n-propyl, isopropyl, allyl, 3,3-dimethylallyl, propargyl, cyclohexyl, tetrahydro-pyranyl, tetrahydro-thiopyranyl, 3-oxetanyl, 5-oxa-[3.3.0]-bicycloheptanyl, methoxyethyl, methoxypropyl, ethoxyethyl, ethylthioethyl, methylthioethyl, difluoromethyl, trifluoromethyl, 2,2,2-trifluoroethyl, 3,3,3-trifluoropropyl, 3-chloro-2,2,3,3-tetrafluoropropyl, 3-fluoropropyl, 3,3-difluoropropyl, 2,2,2-trifluoroethylthio-ethyl, methylcarbonyl-methyl, c-propylcarbonyl-methyl, tert-butylcarbonyl-methyl, methoxycarbonyl-methyl, ethoxycarbonyl-methyl, hydroxycarbonyl-methyl, carbamoyl-methyl, N-methylcarbamoyl-methyl, N-c-propylcarbamoyl-methyl, N,N-dimethylcarbamoyl-methyl, 2-methoximino-propyl, cyclopropylmethyl, phenyl, 4-methylphenyl, 2-nitrophenyl, 3-methylthiophenyl, 4-chloro-phenyl, 4-fluoro-phenyl, 4-tert-butyl-phenyl, 4-methoxy-phenyl, 4-nitrophenyl, 4-dimethylamino-phenyl, 2-fluoro-phenyl, 2-methoxy-phenyl, 2-dimethylaminosulfonyl-phenyl, 2-dimethylaminocarbamoyl-phenyl, 3-nitrophenyl, 3-trifluoromethyl-phenyl, 3-chloro-phenyl, 2,5-dichloro-phenyl, 3,5-dichloro-phenyl, 4-chloro-3-trifluoromethyl-phenyl, 2,4,5-trichloro-phenyl, 2-pyridyl, 5-(2-chloro)pyridyl, 2-(5-methyl)-pyridyl, 2-(6-methyl)-pyridyl, 2-(3-trifluoromethyl)-pyridyl, 2-pyrimidyl, 2-(4-methyl)-pyrimidyl, 2-(5-methyl)-pyrimidyl, 2-(4-methoxy)-pyrimidyl, 2-(5-fluoro)-pyrimidyl, 2-(4-trifluoromethyl)-pyrimidyl, 2-(5-trifluoromethyl)-pyrimidyl, 2-(4,6-dimethyl)-pyrimidyl, 2-(4,5-dimethyl)-pyrimidyl, 2-(4,6-dimethoxy)-pyrimidyl, —CH$_2$-2-pyrimidyl, —CH$_2$-2-pyrazinyl, —CH$_2$-5-(1-methyl)-imidazolyl, —CH$_2$-3-(1-methyl)-pyrazolyl, —CH$_2$-4-pyridyl, —CH$_2$-2-pyridyl, —CH$_2$-2-(1-methyl)-imidazolyl, —CH$_2$-3-pyridyl, CH$_2$-2-furanyl, —CH$_2$-5-(2-chloro)-pyridyl, benzyl, 3,4-dichloro-benzyl, 2,6-difluoro-benzyl, 2-fluoro-6-methoxy-benzyl, 2,6-dichloro-benzyl, 2-chloro-6-trifluoromethyl-benzyl, 2-chloro-6-fluoro-benzyl, —CH$_2$-2-(4,6-dimethoxy)-pyrimidyl, 2,6-dimethyl-benzyl, —CH$_2$-1-(3-nitro-5-methyl)-pyrazolyl, 2-(1-methyl)-benzimidazolyl, 2-(5-methyl)-oxdiazolyl, 2-[3-methyl-6-(trifluoromethyl)-imidazo[4.5]-pyridinyl, 3-[4-ethyl-5-(trifluoromethyl)-]-1,2,4-triazolyl, 3-[4-methyl-5-(trifluoromethyl)]-1,2,4-triazolyl, 3-[4-methyl-5-(difluoromethyl)]-1,2,4-triazolyl, 2-(5-phenyl)-1,3,4-thiadiazolyl, 2-(1-methyl-5-phenyl)-imidazolyl, 2-(4,5-dimethyl)-oxazolyl, 2-(1-methyl-5-methoxycarbonyl)-imidazolyl, 2-(1-methyl)-imidazolyl, or 1,2-ethanediyl;

m is 0, or 2, preferably 0.

Further more preferred embodiments relate to compounds of formula I*.1.B(vb) as active ingredient, wherein $R^1$ is H, methyl, ethyl, or cyclopropyl;
$R^2$ is CH$_3$;
$R^3$ is H, chlorine, or bromine, preferably H;
$R^{4i}$ is methyl, ethyl, propyl, iso-propyl, cyclopentyl, sec-butyl, allyl, 3-methoxypropyl, 3-cyanopropyl, cyclohexyl, 3,3,3-trifluoro-propyl, 3-fluoro-propyl, 2-methylsulfanylethyl, 2-[(2,2,2-trifluoroethyl)sulfanyl]ethyl, 3,4,4,4-tetrafluoro-3-trifluoromethyl, tetrahydrofuran-3-yl, tetrahydro-2H-pyran-4yl, tetrahydro-2H-thiopyran-4-yl, phenyl, 3-methylsulfanylphenyl, 4-chlorophenyl, 4-fluorophenyl, 2,5-difluorophenyl, 2,4-difluorophenyl, 3,5-difluorophenyl, 2-chlorophenyl, 3,4-dichlorophenyl, 3-chlorophenyl, 3-trifluoromethylphenyl, 3-trifluoromethoxy-phenyl, 4-fluorobenzyl, pyridin-2-yl, pyrimidin-2-ylmethyl, 5-chloropyridin-3-yl, 6-chloropyridin-3-yl, 5-fluoropyridin-3-yl, 6-methoxypyridin-3-yl, 5-trifluoromethyl-pyridin-3-yl, pyridin-3-ylmethyl, 6-fluoropyridin-3-yl, 6-methylpyridin-3-yl, 6-[6-chloropyridin-3-yloxy]pyridin-3-yl, 6-[6-fluoropyridin-3-yloxy]pyridin-3-yl, 6-{6-[6-fluoropyridin-3-yloxy]pyridin-3-yl}oxypyridin-3-yl, 4-methylpyridin-3-yl, 5-methylpyridin-3-yl, pyridin-3-yl, 6-trifluoromethylpyridin-3-yl, 6-chloro-5-methylpyridin-3-yl, 6-cyanopyridin-3-yl, 6-chloro-4-methylpyridin-3-yl, 5-methoxypyridin-3-yl, 6-bromopyridin-3-yl, 5-cyanopyridin-3-yl, quinolin-3-yl, 5,6-dimethoxypyridin-3-yl, 4-chloropyridin-3-yl, 2-chloropyridin-3-yl, 5-bromopyridin-3-yl, 5-chloro-2-methoxypyridin-3-yl, 2-fluoro-6-methylpyridin-3-yl, 3-cyanophenyl, 3-ethoxyphenyl, 3-acetamidophenyl, 3-ethylphenyl, 3-methoxyphenyl, 3-propylphenyl, 2-fluoro-3-trifluoromethyl phenyl, 3-methylphenyl, 3-methylsulfonylphenyl, 3-phenoxyphenyl, 3-butylsulfanylphenyl, 4-fluoro-3-trifluoromethylphenyl, 3-methoxycarbonoimidoylphenyl, 3-chloro-4-methylphenyl, 3-fluoro-5-trifluoromethylphenyl, 3-chloro-5-trifluoromethylphenyl, 3-chloro-5-methoxyphenyl, or 3-chloro-4-fluorophenyl, or 3-trifluoromethylphenyl.

Further more preferred embodiments relate to compounds of formula I*.1.B(vc) as active ingredient, wherein
$R^1$ is methyl, ethyl, or cyclopropyl;
$R^2$ is CH$_3$;
$R^3$ is H;
$R^{4j}$ and $R^{4k}$ together with the nitrogen atom to which they are bonded form a 5- or 6-membered heterocycle, which heterocycle contains the nitrogen atom as heteroatom.

Further more preferred embodiments relate to compounds of formula I*.1.B(via) as active ingredient, wherein
$R^1$ is methyl, ethyl, or cyclopropyl;
$R^2$ is CH$_3$;
$R^3$ is H;
$R^{4l}$ is H, methyl, ethyl, iso-propyl, 1-cyano-1-methylethyl, or cyclopropyl;
$T^1$ is as defined above.

Further more preferred embodiments relate to compounds of formula I*.1.B(vib) as active ingredient, wherein
$R^1$ is methyl, ethyl, or cyclopropyl;
$R^2$ is CH$_3$;
$R^3$ is H;
$R^{4m}$ is methyl, or ethyl.

Further more preferred embodiments relate to compounds of formula I*.1.B(vic) as active ingredient, wherein
$R^1$ is methyl, ethyl, or cyclopropyl;
$R^2$ is CH$_3$;
$R^3$ is H;
$R^{4n}$ is H, methyl, ethyl, methylsulfonyl, or cyclopropylsulfonyl;
$R^{4o}$ is H, methyl, ethyl, iso-propyl, iso-butyl, tert-butyl, 2,2,2-trifluoroethyl, 2-hydroxyethyl, 2-methoxyethyl, cyanomethyl, methoxycarbonylmethyl, ethoxycarbonylmethyl, cyclopropyl, 1-cyanocyclopropyl, cyclopentyl, cyclopropylmethyl, methoxy, ethoxy, phenyl, pyridin-3-yl, phenylmethyl, or 1-phenyl-2-hydroxyethyl; or
$R^{4n}$ and $R^{4o}$ together are (CH$_2$)$_5$, (CH$_2$)$_4$, (CH$_2$)$_3$, or (CH$_2$)$_2$O(CH$_2$)$_2$;
Y is O, or S.

Further more preferred embodiments relates to compounds of formula I*.1.B(vid) as active ingredient, wherein
$R^1$ is methyl, ethyl, or cyclopropyl;
$R^2$ is CH$_3$;
$R^3$ is H;
$R^{4p}$ is H, C$_1$-C$_6$-alkyl, C$_3$-C$_6$-alkenyl, or C$_3$-C$_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above;

$R^{4q}$ is H, $C_1$-$C_6$-alkyl, $C_3$-$C_6$-alkenyl, or $C_3$-$C_6$-alkynyl, which are unsubstituted or substituted as indicated above, or $C_3$-$C_6$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which are unsubstituted or substituted as indicated above;

$R^{4r}$ is H, $C_1$-$C_4$-alkyl, $C_3$-$C_6$-alkenyl, or $C_3$-$C_6$-alkynyl, which are unsubstituted or substituted as indicated above, or $C_3$-$C_8$-cycloalkyl, or $C_3$-$C_8$-cycloalkyl-$C_1$-$C_4$-alkyl, which are unsubstituted or substituted as indicated above, or aryl, hetaryl, arylalkyl, or hetarylalkyl, which are unsubstituted or substituted as indicated above;

Y is O, or S.

Further more preferred embodiments relate to compounds of formula I*.1.B(vii) as active ingredient, wherein $R^1$ is H, methyl, ethyl, preferably methyl and ethyl;
$R^2$ is $CH_3$;
$R^3$ is H, chlorine, bromine, preferably H;
$R^{4s}$ is 3-[(2,2,2-trifluoroethyl)sulfanyl]phenyl, 2-fluoro-4-methyl-5-[(2,2,2-trifluoroethyl)sulfanyl]phenyl, 3-(methylsulfanyl)phenyl, pyrimidin-2-yl, 3-[(2,2,2-trifluoroethyl)sulfinyl]phenyl, phenyl, pyridin-3-yl, 3,5-di methyl phenyl, 2-chlorophenyl, 3-chlorophenyl, 4-chlorophenyl, 2,4-dichlorophenyl, 3,4-dichlorophenyl, 1-methyl-1H-pyrrol-2-yl, 3-furyl, 2,5-dimethyl-3-thienyl, 3-[(trifluoromethyl)sulfanyl]phenyl, 3-[(cyclopropylmethyl)sulfanyl]phenyl, 3-(methoxymethyl)phenyl, 3-[(tetrahydro-2H-pyran-4-yloxy)methyl]phenyl, 3-(dimethylsulfamoyl)phenyl, 3-(methylsulfonyl)phenyl, 4-methyl-3-(methylsulfanyl) phenyl, 1-(2-cyanophenyl)-1H-pyrazol-4-yl, 1-(4-fluorophenyl)-1H-pyrazol-4-yl, 1-phenyl-1H-pyrazole-4-yl, 1-naphthyl, 5-(methoxycarbonyl)-1-naphthyl, 4-fluoro-2-(methoxycarbonyl) phenyl, 4-fluoro-1-naphthyl, 4-chloro-3-(ethoxycarbonyl)phenyl, 2-(methoxycarbonyl)phenyl, pyridin-4-yl, 6-(ethoxycarbonyl)pyridin-2-yl, 3-(ethoxycarbonyl)phenyl, 2-napthyl, 4-methoxy-3-(methoxycarbonyl)phenyl, 4-chloro-2-(methoxycarbonyl) phenyl, 3-thienyl, 3-(2-ethoxy-2-oxoethoxy)-4-methylphenyl, 3-(2-ethoxy-2-oxoethoxy)phenyl, 3-(2-ethoxy-2-oxoethoxy)4,5-difluorophenyl, 3-(2-ethoxy-2-oxoethoxy)-4-fluorophenyl, 3-(ethoxycarbonyl)-4-fluorophenyl, (3-{[(cyclopropylcarbonyl)oxy]methyl}phenyl, 3-{[(cyclopropylcarbonyl)oxy]methyl}-4-fluorophenyl, pyridin-2-yl, 3-(difluoromethyl)phenyl, 3-[(trifluoromethyl)sulfinyl]phenyl, 4-fluoro-3-(trifluoromethyl)phenyl, 3-chloro-5-(trifluoromethyl)phenyl, 3-(trifluoromethyl)phenyl, 3,5-bis(trifluoromethyl)phenyl, 3-fluoro-5-(trifluoromethyl)phenyl, 4-cyano-3-(trifluoromethyl)phenyl, 3-(2,2,2-trifluoroethyl)phenyl, 3-(pentafluoroethyl)phenyl, 3-cyanophenyl, 4-chloro-3-cyanophenyl, 3-cyano-5-fluorophenyl, 3-cyano-5-(trifluoromethyl)phenyl, 5-cyano-2-methoxyphenyl, 3-cyano-4-fluorophenyl, 5-cyanopyridin-3-yl, 5-cyano-6-(dimethylamine)pyridin-3-yl, 5-cyano-6-(morpholin-4-yl)pyridin-3-yl, 5-cyano-6-ethoxypyridin-3-yl, 5-cyano-6-methoxypyridin-3-yl, 3-chloro-5-cyanophenyl, 1-benzofuran-2-yl, 3-phenyl-1,2-oxazol-5-yl, 3-(ethoxycarbonyl)-1,2-oxazol-5-yl, 1-isopropyl-1H-1,2,3-triazol-4-yl, 1-methyl-1H-1,2,3-triazol-4-yl, 5-cyano-6-methoxypyridin-3-yl, 6-methoxypyridin-2-yl, 2,3-dihydro-1-benzofuran-7-yl, 1-benzofuran-7-yl, 2,6-dimethoxypyridin-3-yl, 2-methoxyphenyl, 1,3-benzodioxol-4-yl, 2,4-dimethoxyphenyl, 2,5-dimethoxyphenyl, 6-(trifluoromethyl)pyridin-2-yl, 5-chloro-2-methoxypyridin-3-yl, 2-methoxypyridin-3-yl, 6-ethoxypyridin-3-yl, 5-chloro-6-methoxypyridin-3-yl, 2-(methylsulfanyl)pyridin-3-yl, 2-ethoxypyridin-3-yl, 5,6-dimethoxypyridin-3-yl, 2-methoxypyridin-4-yl, 6-methoxy-5-(trifluoromethyl)pyridin-3-yl, 6-methoxy-5-nitropyridin-3-yl, 2,6-dimethoxypyridin-4-yl, 2-(methylsulfanyl)phenyl, 2-methoxy-6-(trifluoromethyl)-pyridin-4-yl, 3-cyano-5-methoxyphenyl, 5-fluoro-2-methoxypyridin-3-yl, 6-isopropoxypyridin-3-yl, 6-methoxypyridin-3-yl, 2-(2-amino-2-oxoethoxy)phenyl, 3-cyano-4-isopropoxyphenyl, or 3-chloropyridin-2-yl.

Further more preferred embodiments relate to compounds of formula I*.1.B(viii) as active ingredient, wherein $R^1$ is methyl, ethyl, or cyclopropyl;
$R^2$ is $CH_3$;
$R^3$ is H;
$R^{4t}$ is H, methyl, trifluoromethyl, trichloromethyl, isopropyl, isobutyl, isopentyl, phenyl, 2-chlorophenyl, 3-chlorophenyl, 4-chlorophenyl, 3,4-dichlorophenyl, 2-pyridinyl, 3-pyridinyl, 4-pyridinyl, 4-chloropyridin-3-yl, 2-pyrimidyl, or benzyl;
$R^{4u}$ is H, or methyl; or
$R^{4t}$ and $R^{4u}$ together are vinyl, prop-1-en-2-yl, (1E)-prop-1-en-1-yl, (1Z)-prop-1-en-1-yl, or cyclopropyl;
$R^{4v}$ is H, $S(O)_mR^{1E}$, $OR^{2E}$, or $N(R^{3E})(R^{4E})$, wherein if $R^{4t}$ and/or $R^{4u}$ is H, or $C_1$-$C_8$-alkyl, $R^{4v}$ is $S(O)_mR^{1E}$, $OR^{2E}$, or $N(R^{3E})(R^{4E})$;
$R^{1E}$ is methyl, ethyl, isopropyl, isobutyl, tert-butyl, cyclopropylmethyl, 2,2-dimethylpropyl, 2-methoxy-2-oxoethyl, phenyl, 2-chlorophenyl, 3-chlorophenyl, 4-chlorophenyl, or 2-pyrimidyl;
$R^{2E}$ is H, methyl, ethyl, 2,2,2-trifluoroethyl, isopropyl, cyclopropylmethyl, benzyl, 3-chlorophenyl, or 4-chloro-phenyl;
$R^{3E}$ and $R^{4E}$ together with the nitrogen atom to which they are bonded form a 5-membered heterocycle, which heterocyclyl group contains one or two N-atoms, which cyclic groups may contain one group CO, and wherein the C-atoms are substituted with trifluoromethyl, methyl, or cyclopropyl.

Further even more preferred embodiments relate to the compounds of formula I*.1.A(vic) as active ingredient, I*.1.A(vii), or I*.1.A(viii), wherein $R^1$ is H, methyl, or ethyl;
$R^2$ is $CH_3$;
$R^3$ is H;
$R^{4n}$, $R^{4o}$ is methyl;
$R^{4s}$ is phenyl;
$R^{4t}$ and $R^{4u}$ together are cyclopropyl;
$R^{4v}$ is H; and
Y is O.

In particular, preference is given to the compounds of the formula I as disclosed in PCT/EP2019/050537, pages 60 to 83, in Tables 1 to 46, which are collectively and as single embodiments of the active ingredient in the agrochemical composition hereby incorporated by reference.

The agrochemical composition may be prepared in a known manner, such as described by Mollet and Grubemann, Formulation technology, Wiley VCH, Weinheim, 2001; or Knowles, New developments in crop protection product formulation, Agrow Reports DS243, T&F Informa, Lon don, 2005. The agrochemical composition is typically prepared by contacting the ethoxylated ricinolein with the active ingredient, preferably in the presence of water. In one embodiment, the resulting mixture is then subjected to milling or grinding to produce the suspension of the active ingredient. In another embodiment, the active ingredient is contacted with water and milled or grinded to produce an aqueous suspension of the active ingredient, whereupon said aqueous suspension is contacted with the ethoxylated ricinolein.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, lime stone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

The agrochemical composition may optionally comprise further auxiliaries, such as 0, 1-1 wt % bactericides, 5-15 wt % anti-freezing agents, 0, 1-1 wt % anti-foaming agents, and 0, 1-1 wt % colorants.

Solutions for seed treatment (LS), Suspoemulsions (SE), flowable concentrates (FS), are usually employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing. Methods for applying the agrochemical composition on to plant propagation material, especially seeds include dressing, coating, pelleting, dusting, soaking and in-furrow application methods of the propagation material. Preferably, the agrochemical composition are applied on to the plant propagation material by a method such that germination is not induced, e. g. by seed dressing, pelleting, coating and dusting.

When employed in plant protection, the amounts of active ingredient applied are, depending on the kind of effect desired, from 0.001 to 2 kg per ha, preferably from 0.005 to 2 kg per ha, more preferably from 0.05 to 0.9 kg per ha, and in particular from 0.1 to 0.75 kg per ha.

In treatment of plant propagation materials such as seeds, e. g. by dusting, coating or drenching seed, amounts of active ingredient of from 0.1 to 1000 g, preferably from 1 to 1000 g, more preferably from 1 to 100 g and most preferably from 5 to 100 g, per 100 kilogram of plant propagation material (preferably seeds) are generally required.

When used in the protection of materials or stored products, the amount of active ingredient applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and further pesticides (e.g. herbicides, insecticides, fungicides, growth regulators, safeners) may be added to the agrochemical composition as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

Application Methods

The agrochemical composition is suitable for use in protecting crops, plants, plant propagation materials, such as seeds, or soil or water, in which the plants are growing, from attack or infestation by animal pests. Therefore, the present invention also relates to a plant protection method, which comprises contacting crops, plants, plant propagation materials, such as seeds, or soil or water, in which the plants are growing, to be protected from attack or infestation by animal pests, with a pesticidally effective amount of the agrochemical composition.

The agrochemical composition suitable for use in combating or controlling animal pests. Therefore, the present invention also relates to a method of combating or controlling animal pests, which comprises contacting the animal pests, their habitat, breeding ground, or food sup ply, or the crops, plants, plant propagation materials, such as seeds, or soil, or the area, material or environment in which the animal pests are growing or may grow, with a pesticidally effective amount of the agrochemical composition of the present invention.

The agrochemical composition is effective through both contact and ingestion. Furthermore, the agrochemical composition can be applied to any and all developmental stages, such as egg, larva, pupa, and adult.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the agrochemical composition to the furrow, and closing the furrow. Foliar application refers to the application of the agrochemical composition to plant foliage, e.g. through spray equipment. For foliar applications, it can be advantageous to modify the behavior of the pests by use of pheromones in combination with agrochemical composition. Suitable pheromones for specific crops and pests are known to a skilled person and publicly available from databases of pheromones and semiochemicals, such as http://www.pherobase.com.

As used herein, the term "contacting" includes both direct contact (applying the agrochemical composition directly on the animal pest or plant—typically to the foliage, stem or roots of the plant) and indirect contact (applying the agrochemical composition to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rape seed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "cultivated plants" is to be understood as including plants which have been modified by mutagenesis or genetic engineering in order to provide a new trait to a plant or to modify an already present trait.

In the case of soil treatment, in furrow application or of application to the pests dwelling place or nest, the quantity of active ingredient ranges from 0.0001 to 500 g per 100 m², preferably from 0.001 to 20 g per 100 m².

For use in treating crop plants, e.g. by foliar application, the rate of application of the active ingredient s of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The following clauses represent embodiments of the present invention:

Clause 1: Aqueous agrochemical composition comprising
a) suspended particles of an active ingredient; and
b) ethoxylated ricinolein;
wherein the active ingredient has a water-solubility of at least 1 g/l at 25° C.; and
wherein the ethoxylated ricinolein contains 35 to 50 molecules of ethylene oxide per molecule of ricinolein in polymerized form.

Clause 2: Agrochemical composition of clause 1, wherein the ethoxylated ricinolein contains at from 38 to 42 molecules of ethylene oxide per molecule of ricinolein in polymerized form.

Clause 3: The agrochemical composition of clause 1 or 2, wherein the water-solubility of the active ingredient is at least 10 g/l at 25° C.

Clause 4: The agrochemical composition according to any of clauses 1 to 3, wherein the water-solubility of the active ingredient is up to 100 g/l at 25° C.

Clause 5: The agrochemical composition according to any of clauses 1 to 4, wherein the suspended particles have a median diameter of from 0.5 μm to 20 μm.

Clause 6: The agrochemical composition according to any of clauses 1 to 5, wherein the active ingredient is a compound of formula I

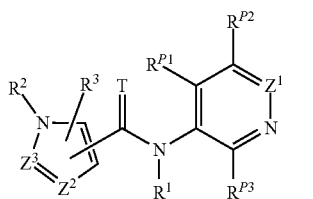

(I)

wherein
$R^{P1}$, $R^{P2}$, and $R^{P3}$ are independently of each other H, CN, halogen, $C_1$-$C_4$-alkyl, haloalkyl, $C_1$-$C_4$-alkoxy, $C_1$-$C_3$-haloalkoxy, $C_1$-$C_4$-alkylthio, $C_1$-$C_3$-haloalkylthio, $C_1$-$C_4$-alkylsulfinyl, $C_1$-$C_3$-haloalkylsulfinyl, $C_1$-$C_4$-alkylsulfonyl, $C_1$-$C_3$-haloalkylsulfonyl, $C_3$-$C_6$-cycloalkyl, $C_3$-$C_6$-halocycloalkyl, $C_2$-$C_4$-alkenyl, $C_2$-$C_4$-haloalkenyl, $C_2$-$C_4$-alkynyl, or $C_1$-$C_4$-alkoxy-$C_1$-$C_4$-alkyl;
$Z^1$ is N, or CH;
$Z^2$ is N, or CH;
$Z^3$ is N, or $CR^4$;
T is S, O, or $NR^{1b}$, wherein
$R^{1b}$ is H, $C_1$-$C_{10}$-alkyl, $C_1$-$C_4$-haloalkyl, $C_3$-$C_{10}$-cycloalkyl, $C_3$-$C_{10}$-cycloalkylmethyl, $C_3$-$C_{10}$-halocycloalkyl, $C_2$-$C_{10}$-alkenyl, $C_2$-$C_{10}$-haloalkenyl, $C_2$-$C_{10}$-alkynyl, $C_1$-$C_{10}$-alkoxy-$C_1$-$C_4$-alkyl, $OR^a$, 3- to 10-membered heterocyclyl, 3- to 10-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$;
$R^1$ is H, CN, $C_1$-$C_{10}$-alkyl, $C_1$-$C_{10}$-haloalkyl, $C_3$-$C_{10}$-cycloalkyl, $C_3$-$C_{10}$-halocycloalkyl, $C_1$-$C_4$-alkoxy-$C_1$-$C_4$-alkyl, $C_2$-$C_{10}$-alkenyl, $C_2$-$C_{10}$-haloalkenyl, $C_2$-$C_{10}$-alkynyl, $C_3$-$C_{10}$-haloalkynyl, $C_1$-$C_5$-alkylene-CN, $OR^a$, $C_1$-$C_5$-alkylene-$OR^a$, $C(Y)R^b$, $C_1$-$C_5$-alkylene-$C(Y)R^b$, $C(Y)OR^c$, $C_1$-$C_5$-alkylene-$C(Y)OR^c$, $S(O)_2R^d$, $NR^eR^f$, $C_1$-$C_5$-alkylene-$NR^eR^f$, $C(Y)NR^gR^h$, $C_1$-$C_5$-alkylene-$C(Y)NR^gR^h$, $S(O)_mNR^eR^f$, $C(Y)NR^iNR^eR^f$, $C_1$-$C_5$-alkylene-$S(O)_2R^d$, $C_1$-$C_5$-alkylene-$S(O)_mNR^eR^f$, $C_1$-$C_5$-alkylene-$C(Y)NR^iNR^eR^f$, aryl, 3- to 10-membered heterocyclyl, hetaryl, aryl-$C_1$-$C_5$-alkyl, $C_3$-$C_{10}$-cycloalkyl-$C_1$-$C_5$-alkyl, 3- to 10-membered heterocyclyl-$C_1$-$C_5$-alkyl, or hetaryl-$C_1$-$C_5$-alkyl, wherein the cyclic moieties are unsubstituted or substituted with one or more, same or differ ent substituents $R^y$ and/or $R^x$;
$R^2$ is H, CN, $C_1$-$C_{10}$-alkyl, $C_2$-$C_{10}$-alkenyl, $C_2$-$C_{10}$-alkynyl, $L^1$-$C_3$-$C_{10}$-cycloalkyl, $L^1$-(3- to 6-membered heterocyclyl), $L^1$-aryl, or $L^1$-heteroaryl, which heterocyclyl groups contain one or more, same or different heteroatoms O, N, $S(O)_m$ or $NR^{3A}$, which cyclic groups may contain one or more groups CO, and wherein the groups are unsubstituted or substituted with one or more, same or different substituents $R^x$; wherein
$L^1$ is a direct bond, $C_1$-$C_8$-alkylene, $C_2$-$C_8$-alkenylene, $C_2$-$C_8$-alkynylene, or $C_3$-$C_6$-cycloalkylene, wherein the C-atoms are unsubstituted or substituted with one or more, same or different substituents $R^x$;
$R^3$ is H, halogen, CN, $C_1$-$C_{10}$-alkyl, $C_1$-$C_{10}$-haloalkyl, $C_1$-$C_{10}$-alkoxy, or $C_1$-$C_{10}$-haloalkoxy;
$R^4$ is
(i) H, CN, $NO_2$, halogen, $C_1$-$C_{10}$-alkyl, $C_2$-$C_{10}$-alkenyl, or $C_2$-$C_{10}$-alkynyl, wherein the C-atoms are unsubstituted or substituted with one or more, same or different substituents $R^x$; or
$OR^a$, $SR^d$, $C(Y)R^b$, $C(Y)OR^c$, $S(O)R^d$, $S(O)_2R^d$, $NR^eR^f$, $C(Y)NR^gR^h$, $S(O)_mNR^eR^f$, $C(Y)NR^iNR^eR^f$, $C_1$-$C_6$-alkylene-$OR^a$, $C_1$-$C_6$-alkylene-CN, $C_1$-$C_6$-alkylene-$C(Y)R^b$, $C_1$-$C_5$-alkylene-$C(Y)OR^c$, $C_1$-$C_6$-alkylene-$NR^eR^f$, $C_1$-$C_6$-alkylene-$C(Y)NR^gR^h$, $C_1$-$C_6$-alkylene-$S(O)_mR^d$, $C_1$-$C_6$-alkylene-$S(O)_mNR^eR^f$, $C_1$-$C_6$-alkylene-$NR^iNR^eR^f$; or
3- to 10-membered heterocyclyl, hetaryl, $C_3$-$C_{10}$-cycloalkyl, $C_3$-$C_{10}$-cycloalkenyl, aryl, 3- to 10-membered heterocyclyl-$C_1$-$C_5$-alkyl, hetaryl-$C_1$-$C_5$-alkyl, $C_3$-$C_{10}$-cycloalkyl-$C_1$-$C_6$-alkyl, $C_3$-$C_{10}$-cycloalkenyl-$C_1$-$C_6$-alkyl, or aryl-$C_1$-$C_5$-alkyl, wherein the cyclic moieties are unsubstituted or substituted with one or more, same or different substituents $R^y$;
or $R^4$ is
(ii) $L^2$-$C_3$-$C_{10}$-cycloalkenyl, $L^2$-$C_3$-$C_{10}$-cycloalkenyloxy, or $L^2$-$C_3$-$C_{10}$-cycloalkenylthio, wherein the cycloalkenyl rings are unsubstituted or substituted with one or more, same or different substituents $R^y$; wherein $L^2$ is $C_1$-$C_8$-alkylene, $C_2$-$C_8$-alkenylene, $C_2$-$C_8$-alkynylene, or $C_3$-$C_6$-cycloalkylene, wherein the C-atoms are unsubstituted or substituted with one or more, same or different substituents $R^x$;

or $R^4$ is (iii) any one of the following groups

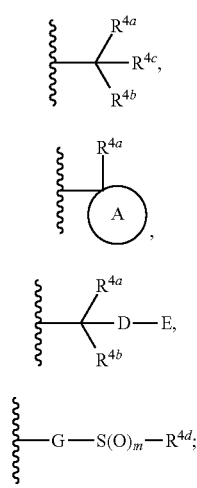

wherein $R^{4a}$, $R^{4b}$ and $R^{4c}$ are independently of each other H, halogen, CN, $NO_2$, $C_1$-$C_{10}$-alkyl, $C_2$-$C_{10}$-alkenyl, or $C_2$-$C_{10}$-alkynyl, wherein the C-atoms are unsubstituted or substituted with one or more, same or different substituents $R^x$;

$C_1$-$C_{10}$-haloalkyl, $C_1$-$C_{10}$-alkoxy, or $C_1$-$C_4$-alkoxy-$C_1$-$C_{10}$-alkyl, wherein the C-atoms are unsubstituted or substituted with one or more, same or different substituents $R^y$; $OR^a$, $SR^a$, $C(Y)R^b$, $C(Y)OR^c$, $C(Y)NR^gR^h$, $C(Y)NR^iNR^eR^f$, $S(O)_mR^d$, $S(O)_mNR^eR^f$, $C_1$-$C_5$-alkylene-$OR^a$, $C_1$-$C_6$-alkylene-CN, $C_1$-$C_6$-alkylene-$C(Y)R^b$, $C_1$-$C_6$-alkylene-$C(Y)OR^c$, $C_1$-$C_6$-alkylene-$NR^eR^f$, $C_1$-$C_6$-alkylene-$C(Y)NR^gR^h$, $C_1$-$C_6$-alkylene-$S(O)_mR^d$, $C_1$-$C_6$-alkylene-$S(O)_mNR^eR^f$, or $C_1$-$C_6$-alkylene-$NR^iNR^eR^f$;

3- to 10-membered heterocyclyl, $C_3$-$C_{10}$-cycloalkyl, $C_3$-$C_{10}$-cycloalkenyl, hetaryl, aryl, 3- to 10-membered heterocyclyl-$C_1$-$C_5$-alkyl, $C_3$-$C_{10}$-cycloalkyl-$C_1$-$C_6$-alkyl, $C_3$-$C_{10}$-cycloalkenyl-$C_1$-$C_6$-alkyl, hetaryl-$C_1$-$C_5$-alkyl, or aryl-$C_1$-$C_5$-alkyl, wherein the cyclic moieties are unsubstituted or substituted with one or more, same or different substituents $R^y$;

A is a 3- to 12-membered non-aromatic carbo- or heterocycle, which heterocycle contains one or more, same or different heteroatoms N, O, or S, wherein S may be oxidised, and which carbo- or heterocycles are unsubstituted or substituted with one or more, same or different substituents $R^j$ and/or $R^l$;

D is a direct bond, $C_1$-$C_6$-alkylene, $C_2$-$C_6$-alkenylene, or $C_2$-$C_6$-alkynylene, which carbon chains are unsubstituted or substituted with one or more, same or different substituents $R^n$;

E is a non-aromatic 3- to 12-membered carbo- or heterocycle, which heterocycle contains one or more, same or different heteroatoms N, O, or S, wherein S may be oxidised, and which carbo- or heterocycles are unsubstituted or substituted with one or more, same or different substituents $R^n$ and/or $R^l$;

$R^{4d}$ is $C_1$-$C_4$-haloalkyl or $C_3$-$C_6$-cycloalkyl, which may each be halogenated;

G is $C_1$-$C_6$-alkylene, $C_2$-$C_6$-alkenylene, $C_2$-$C_6$-alkynylene, $C_3$-$C_6$-cycloalkylene, or $C_3$-$C_6$-cycloalkenylene, wherein the C-atoms are unsubstituted or substituted with one or more, same or different substituents $R^p$;

or $R^4$ is (iv) any one of the following groups

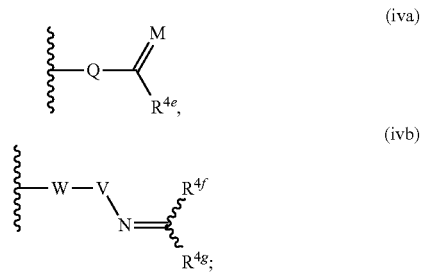

wherein $R^{4e}$ is H, $C_1$-$C_8$-alkyl, $C_2$-$C_8$-alkenyl, $C_2$-$C_8$-alkynyl, $C_3$-$C_6$-cycloalkyl, $C_3$-$C_6$-cycloalkenyl, or a 3- to 6-membered heterocycle, which heterocycle contains one or more, same or different heteroatoms N, O, or S, wherein S may be oxidised, which groups are unsubstituted or substituted with one or more, same or different substituents $R^r$ and/or $R^l$;

Q is a direct bond, $C_1$-$C_8$-alkylene, $C_2$-$C_8$-alkenylene, or $C_2$-$C_8$-alkynylene, which carbon chains are unsubstituted or substituted with one or more, same or different substituents $R^1$; or Q and $R^{4e}$ together form a 3- to 6-membered carbocyclic ring, or a 4- to 6-membered heterocycle with a direct bond to the imidazole, which heterocycle contains one or more, same or different heteroatoms N, O, or S, wherein S may be oxidized, and which rings are unsubstituted or substituted with one or more, same or different substituents $R^r$ and/or $R^l$;

M is O, S, $NR^M$, $NOR^M$, or $NSR^M$; wherein $R^M$ is a group mentioned for $R^{4e}$, or wherein $R^M$ and Q together form a 4- to 6-membered unsaturated, non-aromatic N-containing heterocycle, which heterocycle may contain an additional heteroatom O, or S, wherein S may be oxidized, and which ring is unsubstituted or substituted with one or more, same or different substituents $R^r$;

$R^{4g}$ is H, $C_1$-$C_6$-alkyl, $C_1$-$C_6$-alkyl-X, $C_3$-$C_6$-cycloalkyl, or $C_3$-$C_6$-cycloalkyl-X; and $R^{4f}$ is $C_1$-$C_6$-alkyl, $C_1$-$C_6$-alkyl-X, $C_3$-$C_6$-cycloalkyl, or $C_3$-$C_6$-cycloalkyl-X; wherein the $C_1$-$C_6$-alkyl or $C_3$-$C_6$-cycloalkyl groups are unsubstituted or substituted with one or more, same or different substituents $R^t$; wherein X is O, S, NH or $NR^l$; or $R^{4g}$ and $R^{4f}$ together with the carbon atom to which they are bonded form a 3- to 8-membered, saturated or unsaturated carbo- or heterocycle, which heterocycle contains one or more, same or different heteroatoms N, O, or S, wherein S may be oxidized, and wherein the carbo- or heterocycles are unsubstituted or substituted with one or more, same or different substituents $R^t$ and/or $R^l$;

W is $C_1$-$C_8$-alkylene, $C_3$-$C_8$-cycloalkylene, $C_3$-$C_8$-heterocycloalkylene, $C_2$-$C_8$-alkenylene, $C_3$-$C_8$-cycloalkenylene, $C_3$-$C_8$-heterocycloalkenylene, or $C_2$-$C_8$-alkynylene, wherein W is unsubstituted or substituted with one or more, same or different substituents $R^t$ and/or $R^l$;

V is O, S or $NR^{1a}$, wherein $R^{1a}$ is H, $C_1$-$C_{10}$-alkyl, $C_1$-$C_4$-haloalkyl, $C_3$-$C_{10}$-cycloalkyl, $C_3$-$C_{10}$-cycloalkylmethyl, $C_3$-$C_{10}$-halocycloalkyl, $C_2$-$C_{10}$-alkenyl, $C_2$-$C_{10}$-haloalkenyl, $C_2$-$C_{10}$-alkynyl, $C_1$-$C_{10}$-alkoxy-$C_1$-$C_4$-alkyl, $OR^a$, 3- to 10-membered heterocyclyl, 3- to 10-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$; or wherein $R^{1a}$ and $R^{4g}$ together with the carbon atom to which $R^{4g}$ is bonded and the nitrogen atom to which $R^{1a}$ is bonded as well as the nitrogen atom between said carbon atom and said nitrogen atom form a 4- to 8-membered heterocycle, which contains the two nitrogen atoms as heteroatoms, and may further contain one or more, same or different heteroatoms N, O, or S, wherein S may be oxidized, and wherein the heterocycle is unsubstituted or substituted with one or more, same or different substituents $R^t$ and/or $R^l$;

or $R^4$ is (v) any one of the groups (va) $S(O)_m$—$R^{4h}$, (vb) O—$R^{4i}$, or (vc) $NR^{4j}R^{4k}$;

wherein $R^{4h}$, $R^{4i}$ are independently of each other CN;

$C_1$-$C_8$-alkyl, $C_2$-$C_8$-alkenyl, or $C_2$-$C_8$-alkynyl, which aliphatic groups are unsubstituted or substituted by one or more, same or different substituents $R^{44}$;

$C_3$-$C_8$-cycloalkyl, $C_5$-$C_8$-cycloalkenyl, or 3- to 8-membered heterocyclyl, which heterocyclyl group contains one or more, same or different heteroatoms O, N, $S(O)_m$ or $NR^{3A}$, which cyclic groups may contain one or more, same or different groups $C(G^A)R^{2A}$, and which cyclic groups are unsubstituted or substituted by one or more, same or different substituents $R^{44}$;

$C_3$-$C_8$-cycloalkyl-$C_1$-$C_4$-alkyl, $C_5$-$C_8$-cycloalkenyl-$C_1$-$C_4$-alkyl, or 3- to 8-membered heterocyclyl-$C_1$-$C_4$-alkyl, which heterocyclyl group contains one or more, same or different heteroatoms O, N, $S(O)_m$ or $NR^{3A}$, which cyclic groups may contain one or more, same or different groups $C(G^A)R^{2A}$, and wherein the C-atoms of these groups are unsubstituted or substituted by one or more, same or different substituents $R^{44}$;

aryl or hetaryl, which cyclic groups are unsubstituted or substituted by one or more, same or different substituents $R^{45}$; or aryl-$C_1$-$C_4$-alkyl or hetaryl-$C_1$-$C_4$-alkyl, wherein the C-atoms of these groups are unsubstituted or substituted by one or more, same or different substituents $R^{46}$;

wherein $G^A$ is O, N—CN, or N—$OR^{2A}$;

$R^{2A}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_5$-$C_8$-cycloalkenyl, or 3- to 8-membered heterocyclyl, which heterocyclyl group contains one or more, same or different heteroatoms O or $S(O)_m$, and which cyclic groups are unsubstituted or substituted by one or more, same or differ ent substituents $R^{44}$;

$C_3$-$C_8$-cycloalkyl-$C_1$-$C_4$-alkyl, $C_5$-$C_8$-cycloalkenyl-$C_1$-$C_4$-alkyl, or 3- to 8-membered heterocyclyl-$C_1$-$C_4$-alkyl, which heterocyclyl group contains one or more, same or different heteroatoms O or $S(O)_m$, and wherein the C-atoms of these groups are unsubstituted or substituted by one or more, same or different substituents $R^{44}$;

aryl or hetaryl, which cyclic groups are unsubstituted or substituted by one or more, same or different substituents $R^{46}$; or aryl-$C_1$-$C_4$-alkyl or hetaryl-$C_1$-$C_4$-alkyl, wherein the C-atoms of these groups are unsubstituted or substituted by one or more, same or different substituents $R^{46}$;

$R^{3A}$ is H; $C_1$-$C_6$-alkyl, $C_3$-$C_6$-alkenyl, or $C_3$-$C_6$-alkynyl, which aliphatic groups are unsubstituted or substituted by one or more, same or different substituents $R^{43}$; or $CONR^{2A}R^{4A}$ or $COR^{2A}$;

$R^{4A}$ is H; $C_1$-$C_6$-alkyl, $C_3$-$C_6$-alkenyl, or $C_3$-$C_6$-alkynyl, which aliphatic groups are unsubstituted or substituted by one or more, same or different substituents $R^{43}$;

and wherein $R^{4j}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, which cyclic groups are unsubstituted or substituted by one or more, same or different substituents $R^{44}$; or $C(O)R^{2B}$, $C(O)NR^{3B}R^{4B}$, $C(O)OR^{5B}$, $SO_2R^{6B}$;

$R^{4k}$ is H; $NR^{3aB}R^{4aB}$;

$C_1$-$C_8$-alkyl, $C_2$-$C_8$-alkenyl, $C_2$-$C_8$-alkynyl, or $C_1$-$C_4$-alkoxy, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$ or $NR^{4aB}$, which cyclic groups may contain one or more groups CO, and wherein the C-atoms of these groups are unsubstituted or substituted by one or more, same or different substituents $R^{44}$; or aryl, aryl-$C_1$-$C_4$-alkyl, hetaryl, or hetaryl-$C_1$-$C_4$-alkyl, wherein the C-atoms of these groups are unsubstituted or substituted by one or more, same or different substituents $R^{46}$; or $R^{4j}$ and $R^{4k}$ together with the nitrogen atom to which they are bonded form a 3 to 7-membered heterocycle, which heterocycle contains the nitrogen atom as heteroatom, and may further contain one or more, same or different heteroatoms O, N, $S(O)_m$ or N, and which rings are unsubstituted or substituted with one or more, same or different substituents $R^{48}$;

wherein
R$^{2B}$, R$^{3B}$, R$^{4B}$ are independently of each other H; C$_1$-C$_8$-alkyl, C$_2$-C$_8$-alkenyl, or C$_2$-C$_8$-alkynyl, which aliphatic groups are unsubstituted or substituted by one or more, same or different substituents R$^{A3}$;
C$_3$-C$_8$-cycloalkyl, which cyclic groups are unsubstituted or substituted by one or more, same or different substituents R$^{A4}$;
aryl or hetaryl, which cyclic groups are unsubstituted or substituted by one or more, same or different substituents R$^{A6}$; or
aryl-C$_1$-C$_4$-alkyl or hetaryl-C$_1$-C$_4$-alkyl, which groups are unsubstituted or substituted by one or more, same or different substituents R$^{A6}$;
R$^{3aB}$ is H; C$_1$-C$_8$-alkyl, which aliphatic groups are unsubstituted or substituted by one or more, same or different substituents R$^{A3}$;
C$_3$-C$_8$-cycloalkyl, which cyclic groups are unsubstituted or substituted by one or more, same or different substituents R$^{A4}$;
aryl or hetaryl, which cyclic groups are unsubstituted or substituted by one or more, same or different substituents R$^{A6}$; or
aryl-C$_1$-C$_4$-alkyl or hetaryl-C$_1$-C$_4$-alkyl, which groups are unsubstituted or substituted by one or more, same or different substituents R$^{A6}$;
R$^{4aB}$ is H; C$_1$-C$_4$-alkyl, which aliphatic groups are unsubstituted or substituted by one or more, same or different substituents selected from halogen or C$_1$-C$_4$-alkoxy;
C$_3$-C$_6$-cycloalkyl, which cyclic groups are unsubstituted or substituted by one or more, same or different substituents R$^{A4}$; or
C(O)R$^{2B}$, C(O)OR$^{5B}$, or SO$_2$R$^{6B}$
R$^{5B}$ is C$_1$-C$_8$-alkyl, C$_2$-C$_8$-alkenyl, or C$_2$-C$_8$-alkynyl, which aliphatic groups are unsubstituted or substituted by one or more, same or different substituents selected from halogen or C$_1$-C$_4$-alkoxy; or
C$_3$-C$_6$-cycloalkyl, which cyclic groups are unsubstituted or substituted by one or more, same or different substituents R$^{A4}$;
R$^{6B}$ is C$_1$-C$_8$-alkyl, C$_2$-C$_8$-alkenyl, or C$_2$-C$_8$-alkynyl, which aliphatic groups are unsubstituted or substituted by one or more, same or different substituents R$^{A3}$; C$_3$-C$_6$-cycloalkyl, which cyclic groups are unsubstituted or substituted by one or more, same or different substituents R$^{A4}$; or
aryl or hetaryl, which cyclic groups are unsubstituted or substituted by one or more, same or different substituents R$^{A6}$;
or R$^4$ is
(vi) any one of the groups (via) C(T$^1$)R$^{4l}$, (vib) C(O)OR$^{4m}$, (vic) C(Y)NR$^{4n}$R$^{4o}$ or (vid) C(Y)NR$^{4p}$NR$^{4q}$R$^{4r}$;
wherein
R$^{4l}$ is H; C$_1$-C$_8$-alkyl, C$_2$-C$_8$-alkenyl, or C$_2$-C$_8$-alkynyl, which aliphatic groups are unsubstituted or substituted by one or more, same or different substituents R$^{A3}$;
C$_3$-C$_8$-cycloalkyl, or 3- to 8-membered heterocyclyl, which heterocyclyl group contains one or more, same or different heteroatoms O, or S(O)$_m$, and which cyclic groups are unsubstituted or substituted by one or more, same or different substituents R$^{A4}$;

C$_3$-C$_8$-cycloalkyl-C$_1$-C$_4$-alkyl, or 3- to 8-membered heterocyclyl-C$_1$-C$_4$-alkyl, which heterocyclyl group contains one or more, same or different heteroatoms O, or S(O)$_m$ and wherein the C-atoms of these groups are unsubstituted or substituted by one or more, same or different substituents R$^{A4}$;
aryl or hetaryl, which cyclic groups are unsubstituted or substituted by one or more, same or different substituents R$^{A6}$; or
aryl-C$_1$-C$_4$-alkyl or hetaryl-C$_1$-C$_4$-alkyl, wherein the C-atoms of these groups are unsubstituted or substituted by one or more, same or different substituents R$^{A6}$;
and wherein
T$^1$ is O, N—OR$^{1C}$, N—NR$^{2C}$R$^{3C}$, or

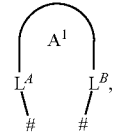

wherein
# are the bonds to the carbon atom of the C(T$^1$) moiety of the C(T$^1$)R$^{4l}$ group; and wherein
L$^A$ and L$^B$ are independently from each other O, or S(O)$_m$; and
A$^1$ is C$_2$-C$_4$-alkylene, wherein the C-atoms are unsubstituted or substituted with one or more, same or different substituents R$^{4c}$;
and wherein
R$^{1C}$ is H; C$_1$-C$_8$-alkyl, C$_2$-C$_8$-alkenyl, or C$_2$-C$_8$-alkynyl, which aliphatic groups are unsubstituted or substituted by one or more, same or different substituents R$^{A3}$;
C$_3$-C$_8$-cycloalkyl, which cyclic groups are unsubstituted or substituted by one or more, same or different substituents R$^{A4}$;
C$_3$-C$_8$-cycloalkyl-C$_1$-C$_4$-alkyl, wherein the C-atoms of these groups are unsubstituted or substituted by one or more, same or different substituents R$^{A4}$;
aryl-C$_1$-C$_4$-alkyl or hetaryl-C$_1$-C$_4$-alkyl, wherein the C-atoms of these groups are unsubstituted or substituted by one or more, same or different substituents R$^{A6}$;
R$^{2C}$ is H; C$_1$-C$_8$-alkyl, C$_2$-C$_8$-alkenyl, or C$_2$-C$_8$-alkynyl, which aliphatic groups are unsubstituted or substituted by one or more, same or different substituents R$^{A3}$;
C$_3$-C$_8$-cycloalkyl, C$_1$-C$_6$-alkylcarbonyl, C$_1$-C$_6$-alkoxycarbonyl, aryl-C$_1$-C$_4$-alkyl, or aryl-C$_1$-C$_4$-alkoxy, which groups are unsubstituted or substituted by one or more, same or different substituents R$^{A4}$;
R$^{3C}$ is H; C$_1$-C$_8$-alkyl, C$_2$-C$_8$-alkenyl, or C$_2$-C$_8$-alkynyl, which aliphatic groups are unsubstituted or substituted by one or more, same or different substituents R$^{A3}$;
C$_3$-C$_8$-cycloalkyl, C$_3$-C$_8$-cycloalkyl-C$_1$-C$_4$-alkyl, 3- to 8-membered heterocyclyl, or 3- to 8-membered heterocyclyl-C$_1$-C$_4$-alkyl, which heterocyclyl groups contain one or more, same or different heteroatoms O, N, S(O)$_m$ or NR$^{3A}$, which cyclic groups may contain one or more groups CO, and wherein the C-atoms of these groups are unsubstituted or substituted by one or more, same or different substituents $R^{44}$;

aryl, hetaryl, aryl-$C_1$-$C_4$-alkyl or hetaryl-$C_1$-$C_4$-alkyl, which groups are unsubstituted or substituted by one or more, same or different substituents $R^{46}$;

$R^{4C}$ is halogen; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

aryl, wherein these groups are unsubstituted or substituted by one or more, same or different substituents $R^{46}$; or two $R^{4C}$ bonded to the same carbon atom form a $C_2$-$C_4$-alkylene chain, which chain is unsubstituted or substituted by one or more, same or different substituents $R^{44}$; or two $R^{4C}$ bonded to the same carbon atom form a $C_1$-$C_4$-alkenylene chain with the double bond of the chain being attached to said carbon atom, which chain is unsubstituted or substituted by one or more, same or different substituents $R^{44}$;

$R^{4m}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, which cyclic groups are unsubstituted or substituted by one or more, same or different substituents $R^{44}$;

$C_3$-$C_8$-cycloalkyl-$C_1$-$C_4$-alkyl, wherein the C-atoms of these groups are unsubstituted or substituted by one or more, same or different substituents $R^{44}$;

aryl or hetaryl, which cyclic groups are unsubstituted or substituted by one or more, same or different substituents $R^{46}$; or aryl-$C_1$-$C_4$-alkyl or hetaryl-$C_1$-$C_4$-alkyl, wherein the C-atoms of these groups are unsubstituted or substituted by one or more, same or different substituents $R^{46}$;

$R^{4n}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_1$-$C_4$-alkylsulfonyl, $C_3$-$C_6$-cycloalkylsulfonyl, $C_1$-$C_4$-alkylcarbonyl, or $C_1$-$C_4$-alkoxycarbonyl, which groups are unsubstituted or substituted by one or more, same or different substituents $R^{44}$; or phenyl-$C_1$-$C_2$-alkoxycarbonyl, wherein the C-atoms of these groups are unsubstituted or substituted by one or more, same or different substituents $R^{46}$;

$R^{4n}$ is H; $C_1$-$C_8$-alkyl, $C_2$-$C_8$-alkenyl, $C_2$-$C_8$-alkynyl, $C_1$-$C_4$-alkoxy, which aliphatic groups are unsubstituted or substituted by one or more, same or different substituents $R^{42}$;

$C_3$-$C_8$-cycloalkyl, or 3- to 8-membered heterocyclyl, which heterocyclyl group contains one or more, same or different heteroatoms O, N, S(O)$_m$ or NR$^{3A}$, which cyclic groups may contain one or more groups CO, and which cyclic groups are unsubstituted or substituted by one or more, same or different substituents $R^{44}$;

$C_3$-$C_8$-cycloalkyl-$C_1$-$C_4$-alkyl, or 3- to 8-membered heterocyclyl-$C_1$-$C_4$-alkyl, which heterocyclyl group contains one or more, same or different heteroatoms O, N, S(O)$_m$ or NR$^{4A}$, which cyclic groups may contain one or more groups CO, and wherein the C-atoms of these groups are unsubstituted or substituted by one or more, same or different substituents $R^{44}$;

aryl or hetaryl, which cyclic groups are unsubstituted or substituted by one or more, same or different substituents $R^{47}$; or aryl-$C_1$-$C_4$-alkyl or hetaryl-$C_1$-$C_4$-alkyl, wherein the C-atoms of these groups are unsubstituted or substituted by one or more, same or different substituents $R^{47}$; or $R^{4n}$ and $R^{4o}$ together with the nitrogen atom to which they are bonded form a 3- to 8-membered heterocycle, which heterocycle contains one or more, same or different heteroatoms N, O, or S, wherein S may be oxidized, and wherein the heterocycle is unsubstituted or substituted with one or more, same or different substituents $R^{44}$;

$R^{4p}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which groups are unsubstituted or substituted by one or more, same or different substituents $R^{44}$;

$R^{4q}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_1$-$C_6$-alkylcarbonyl, $C_1$-$C_6$-alkoxycarbonyl, aryl-$C_1$-$C_4$-alkyl, or aryl-$C_1$-$C_4$-alkoxy, which groups are unsubstituted or substituted by one or more, same or different substituents $R^{44}$;

$R^{4q}$ is H; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, S(O)$_m$ or NR$^{3A}$, which cyclic groups may contain one or more, same or different groups CO, and wherein the C-atoms of these groups are unsubstituted or substituted by one or more, same or different substituents $R^{44}$;

aryl, hetaryl, aryl-$C_1$-$C_4$-alkyl or hetaryl-$C_1$-$C_4$-alkyl, which groups are unsubstituted or substituted by one or more, same or different substituents $R^{46}$;

or $R^4$ is (vii) $R^{4s}$ wherein $R^{4s}$ is aryl or hetaryl, which cyclic groups are unsubstituted or substituted by one or more, same or different substituents $R^{1D}$;

wherein $R^{1D}$ is CN, NO$_2$, halogen, NR$^{2D}$R$^{3D}$; $C_1$-$C_4$-alkyl, $C_1$-$C_4$-alkoxy-$C_1$-$C_4$-alkyl, $C_1$-$C_4$-halogenalkyl, $C_1$-$C_4$-alkoxy, $C_1$-$C_4$-haloalkoxy, $C_1$-$C_4$-alkyl-S(O)$_m$—, $C_1$-$C_4$-haloalkyl-S(O)$_m$—, carboxy; or aryl, or hetaryl, which groups are unsubstituted or substituted with one or more, same or different substituents $R^{46}$; or two adjacent groups $R^{1D}$ form together with the neighbouring atoms to which they are bonded a fused 3- to 8-membered heterocycle, which heterocycle contains one or more, same or different heteroatoms N, O, or S, wherein S may be oxidized, and which heterocycle is unsubstituted or substituted with one or more, same or different substituents $R^{46}$;

$R^{2D}$ is H; $C_1$-$C_4$-alkyl, $C_2$-$C_4$-alkenyl, $C_2$-$C_4$-alkynyl, or $C_3$-$C_6$-cycloalkyl, which groups are unsubstituted or substituted with one or more, same or different substituents $R^{43}$ or $R^{44}$.

$R^{3D}$ is H; $C_1$-$C_4$-alkyl, $C_2$-$C_4$-alkenyl, $C_2$-$C_4$-alkynyl, or $C_3$-$C_6$-cycloalkyl, which groups are unsubstituted or substituted with one or more, same or different substituents $R^{43}$ or $R^{44}$; or $R^{2D}$ and $R^{3D}$ together with the nitrogen atom to which they are bonded form a 3- to 8-membered heterocycle, which heterocycle contains one or more, same or different heteroatoms N, O, or S, wherein S may be oxidized, and which heterocycle is unsubstituted or substituted with one or more, same or different substituents $R^{46}$;

or $R^4$ is (viii) $CR^{4t}R^{4u}R^{4v}$ wherein $R^{4t}$ is H; CN; $C_1$-$C_8$-alkyl, $C_2$-$C_8$-alkenyl, or $C_2$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, or 3- to 8-membered heterocyclyl, which heterocyclyl group contains one or more, same or different heteroatoms O, N, $S(O)_m$ or $NR^{1F}$, which cyclic groups may contain one or more, same or different groups CO, and wherein the C atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

$R^{4u}$ is H; $C_1$-$C_4$-alkyl, which aliphatic groups are unsubstituted or substituted by one or more, same or different substituents $R^{43}$; or $R^{4t}$ and $R^{4u}$ together with the carbon atom to which they are bonded form a 3- to 8-membered carbocyclic or heterocyclic ring, which heterocyclic ring contains one or more, same or different heteroatoms O, N, $S(O)_m$, or $NR^{1F}$, which cyclic groups may contain one or more, same or different groups CO, and wherein the carbocyclic or heterocyclic ring is unsubstituted or substituted with one or more, same or different substituents $R^{43}$; or $R^{4t}$ and $R^{4u}$ together are $C_2$-$C_6$-alkenyl, which aliphatic groups are unsubstituted or substituted by one or more, same or different substituents $R^{43}$;

$R^{4V}$ is H; $S(O)_mR^{1E}$, $OR^{2E}$, or $N(R^{3E})(R^{4E})$, wherein if $R^{4t}$ and/or $R^{4u}$ is H, or $C_1$-$C_8$-alkyl, which aliphatic groups are unsubstituted or substituted by one or more, same or different substituents $R^{43}$, $R^{4v}$ is $S(O)_mR^{1E}$, $OR^{2E}$, or $N(R^{3E})(R^{4E})$;

$R^{1E}$ is $C_1$-$C_8$-alkyl, $C_3$-$C_8$-alkenyl, or $C_3$-$C_8$-alkynyl, which aliphatic groups are unsubstituted or substituted by one or more, same or different substituents $R^{49}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

$R^{2E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{49}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$; or aryl, hetaryl, aryl-$C_1$-$C_4$-alkyl, or hetaryl-$C_1$-$C_4$-alkyl, which groups are unsubstituted or substituted by one or more, same or different substituents $R^{46}$;

$R^{3E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{43}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{44}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

$R^{4E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$; or $C(O)N(R^{5E})(R^{6E})$, $C(O)R^{1E}$, $C(O)OR^{8E}$, or $SO_2R^{9E}$; or $R^{3E}$ and $R^{4E}$ together with the nitrogen atom to which they are bonded form a 3- to 9-membered heterocycle, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A8}$; or $R^{5E}$ and $R^{6E}$ are independently of each other H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, or 3- to 8-membered heterocyclyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$; or $R^{5E}$ and $R^{6E}$ together with the nitrogen atom to which they are bonded form a 3- to 8-membered heterocyclic ring, which heterocyclic ring contains one or more, same or different heteroatoms O, or $S(O)_m$, and which heterocycle is unsubstituted or substituted with one or more, same or different substituents $R^{A19}$;

$R^{7E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

$R^{8E}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

$R^{9E}$ is $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$;

$C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$;

$C_5$-$C_8$-cycloalkenyl, $C_5$-$C_8$-cycloalkenyl-$C_1$-$C_4$-alkyl, 3- to 8-membered heterocyclyl, or 3- to 8-membered heterocyclyl-$C_1$-$C_4$-alkyl, which heterocyclyl group contains one or more, same or different heteroatoms O, N, $S(O)_m$, or $NR^{1F}$, which cyclic groups may contain one or more, same or different groups CO, and wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

$R^{1F}$ is H; $C_1$-$C_8$-alkyl, $C_3$-$C_8$-alkenyl, or $C_3$-$C_8$-alkynyl, which aliphatic groups are unsubstituted or substituted by one or more, same or different substituents $R^{A3}$; $C_3$-$C_8$-cycloalkyl, $C_3$-$C_8$-cycloalkyl-$C_1$-$C_4$-alkyl, 3- to 8-membered heterocyclyl, or 3- to 8-membered heterocyclyl-$C_1$-$C_4$-alkyl, wherein the C-atoms of these groups are unsubstituted or substituted by one or more, same or different substituents $R^{A4}$; or aryl, hetaryl, aryl-$C_1$-$C_4$-alkyl, or hetaryl-$C_1$-$C_4$-alkyl, which groups are unsubstituted or substituted by one or more, same or different substituents $R^{A6}$;

and wherein $R^a$, $R^b$, $R^c$ are independently of each other H, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_3$-$C_6$-cycloalkenyl, $C_3$-$C_6$-cycloalkenylmethyl, $C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, 3- to 6-membered heterocyclyl, 3- to 6-membered heterocyclyl-$C_1$-$C_4$-alkyl, aryl, hetaryl, aryl-$C_1$-$C_4$-alkyl, or hetaryl-$C_1$-$C_4$-alkyl, where in the cyclic moieties are unsubstituted or substituted with one or more, same or different substituents $R^{aa}$;

$R^d$ is H, $C_1$-$C_4$-alkoxy, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_3$-$C_6$-cycloalkenyl, $C_3$-$C_6$-cycloalkenylmethyl, $C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, 3- to 6-membered heterocyclyl, 3- to 6-membered heterocyclyl-$C_1$-$C_4$-alkyl, aryl, hetaryl, aryl-$C_1$-$C_4$-alkyl, or hetaryl-$C_1$-$C_4$-alkyl, where in the cyclic moieties are unsubstituted or substituted with one or more, same or different substituents $R^{aa}$;

$R^e$, $R^f$ are independently of each other H, $C_1$-$C_4$-alkyl, $C_1$-$C_4$-haloalkyl, $C_3$-$C_6$-cycloalkyl, $C_3$-$C_6$-cycloalkylmethyl, $C_3$-$C_6$-halocycloalkyl, $C_3$-$C_6$-cycloalkenyl, $C_3$-$C_6$-cycloalkenylmethyl, $C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, $C_1$-$C_4$-alkylcarbonyl, $C_1$-$C_4$-haloalkylcarbonyl, $C_1$-$C_4$-alkylsulfonyl, $C_1$-$C_4$-haloalkylsulfonyl, 3- to 6-membered heterocyclyl, 3- to 6-membered heterocyclyl-$C_1$-$C_4$-alkyl, 3- to 6-membered heterocyclylcarbonyl, 3- to 6-membered heterocyclyl-$C_1$-$C_4$-alkyl-carbonyl, 3- to 6-membered heterocyclyl-$C_1$-$C_4$-alkyl-sulfonyl, aryl, arylcarbonyl, aryl-$C_1$-$C_4$-alkyl-carbonyl, arylsulfonyl, hetaryl, hetaryl-$C_1$-$C_4$-alkyl-carbonyl, hetarylcarbonyl, hetarylsulfonyl, aryl-$C_1$-$C_4$-alkyl, or hetaryl-$C_1$-$C_4$-alkyl, wherein the cyclic moieties are unsubstituted or substituted with one or more, same or different substituents $R^{aa}$; or $R^e$ and $R^f$ together with the nitrogen atom to which they are bonded form a 5- or 6-membered, saturated or unsaturated heterocycle, which may contain a further heteroatom O, S, or N, wherein S may be oxidized, and wherein the heterocycles are unsubstituted or substituted with one or more, same or different substituents $R^{aa}$;

$R^g$, $R^h$ are independently of each other H, $C_1$-$C_4$-alkyl, $C_1$-$C_4$-haloalkyl, L-$C_3$-$C_6$-cycloalkyl, L-$C_3$-$C_6$-halocycloalkyl, L-$C_3$-$C_6$-cycloalkenyl, L-$C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, 3- to 6-membered heterocyclyl, 3- to 6-membered heterocyclyl-$C_1$-$C_4$-alkyl, aryl, hetaryl, aryl-$C_1$-$C_4$-alkyl, or hetaryl-$C_1$-$C_4$-alkyl, wherein the cyclic moieties are unsubstituted or substituted with one or more, same or different substituents $R^{aa}$;

$R^i$ is H, CN, $C_1$-$C_4$-alkyl, $C_1$-$C_4$-haloalkyl, L-$C_3$-$C_6$-cycloalkyl, L-$C_3$-$C_6$-halocycloalkyl, L $C_3$-$C_6$-cycloalkenyl, L-$C_3$-$C_6$-halocycloalkenyl, $C_2$-$C_4$-alkenyl, $C_2$-$C_4$-haloalkenyl, $C_2$-$C_4$-alkynyl, $C_1$-$C_4$-alkoxy-$C_1$-$C_4$-alkyl, aryl, or aryl-$C_1$-$C_4$-alkyl, wherein the aryl rings are unsubstituted or substituted with one or more, same or different substituents $R^{aa}$;

$R^j$ bonded to C is halogen, OH, CN, $NO_2$, $C_1$-$C_{10}$-alkyl, $C_1$-$C_{10}$-haloalkyl, $C_1$-$C_{10}$-alkoxy, $C_1$-$C_{10}$-haloalkoxy, $S(O)_m R^k$, $C_3$-$C_6$-cycloalkyl, or 3- to 6-membered heterocycle, which heterocycle contains one or more, same or different heteroatoms N, O, or S, wherein S may be oxidized, which $R^j$ groups are unsubstituted or substituted with one or more, same or different substituents $R^m$ and/or $R^l$, and wherein two groups $R^j$ connected to the same or adjacent ring atoms may together form a 3- to 6-membered carbo- or heterocycle, which heterocycle contains one or more, same or different heteroatoms N, O, or S, wherein S may be oxidised, which cycles are unsubstituted or substituted with one or more, same or different substituents $R^m$ and/or $R^l$;

$R^k$ is H, $C_1$-$C_4$-alkyl, $C_1$-$C_4$-haloalkyl, or $C_3$-$C_6$-cycloalkyl, which cycle is unsubstituted or substituted with one or more, same or different substituents $R^l$;

$R^l$ bonded to N is $C_1$-$C_4$-alkyl, $C_1$-$C_4$-haloalkyl, $C_1$-$C_4$-alkylcarbonyl, $C_1$-$C_4$-haloalkylcarbonyl, or $C_1$-$C_4$-alkoxycarbonyl;

$R^m$ bonded to C is halogen, OH, CN, $NO_2$, $C_1$-$C_4$-alkyl, $C_1$-$C_4$-haloalkyl, $C_3$-$C_6$-cycloalkyl, $C_1$-$C_4$-alkoxy, $C_1$-$C_4$-haloalkoxy, or $S(O)_m R^k$;

$R^n$ bonded to C is halogen, CN, $NO_2$, $C_1$-$C_2$-alkyl, $C_1$-$C_4$-haloalkyl, $C_2$-$C_6$-alkenyl, $C_2$-$C_6$-alkynyl, $C_3$-$C_6$-cycloalkyl, $C_3$-$C_6$-cycloalkenyl, $C_1$-$C_4$-alkoxy, $C_1$-$C_4$-haloalkoxy, $C_1$-$C_4$-alkylidene, =O, =S, =$NR^{1o}$, =$NOR^{1o}$, =$NSR^{1o}$, or $S(O)_m R^{1o}$, or two adjacent groups $R^n$ form together with the atoms to which they are bonded a 3- to 8-membered carbo- or heterocycle, which heterocycle contains one or more, same or different heteroatoms N, O, or S, wherein S may be oxidised, which cyclic $R^n$ moieties are unsubstituted or substituted with one or more, same or different substituents halogen, $R^o$, and/or $R^l$;

$R^{1o}$ is H, $C_1$-$C_4$-alkyl, $C_1$-$C_4$-haloalkyl, $C_3$-$C_6$-cycloalkyl, or $C_1$-$C_4$-alkoxy;

$R^o$ bonded to C is $C_1$-$C_4$-alkyl, $C_1$-$C_4$-haloalkyl, $C_3$-$C_6$-cycloalkyl, $C_1$-$C_4$-alkoxy, $C_1$-$C_4$-alkylcarbonyl, $C_1$-$C_4$-haloalkylcarbonyl, or $C_1$-$C_4$-alkoxycarbonyl;

$R^p$ is halogen, CN, $NO_2$, $C_1$-$C_2$-alkyl, $C_1$-$C_2$-haloalkyl, $C_3$-$C_6$-cycloalkyl, $C_1$-$C_4$-alkoxy, or $C_1$-$C_2$-haloalkoxy, or two groups $R^p$ can together form a 3- to 6-membered carbo- or heterocycle, which heterocycle contains one or more, same or different heteroatoms N, O, or S, wherein S may be oxidised, which carbo- or heterocycle is unsubstituted or substituted with one or more, same or different substituents $R^q$;

$R^q$ is halogen, CN, $NO_2$, $C_1$-$C_4$-alkyl, $C_1$-$C_4$-haloalkyl, $C_3$-$C_6$-cycloalkyl, $C_1$-$C_4$-alkoxy, or $C_1$-$C_4$-haloalkoxy;

$R^r$ bonded to C is halogen, CN, $NO_2$, $C_1$-$C_2$-alkyl, $C_1$-$C_2$-haloalkyl, $C_1$-$C_4$-alkoxy, $C_1$-$C_2$-haloalkoxy, or $S(O)_mR^k$; or two groups $R^1$ together form a 3- to 6-membered carbo- or heterocycle, which heterocycle contains one or more, same or different heteroatoms N, O, or S, wherein S may be oxidized, and which carbo- or heterocycles are unsubstituted or substituted with $R^s$;

$R^s$ is halogen, CN, $NO_2$, $C_1$-$C_2$-alkyl, $C_1$-$C_2$-haloalkyl, $C_3$-$C_6$-cycloalkyl, $C_1$-$C_4$-alkoxy, or $C_1$-$C_2$-haloalkoxy;

$R^t$ bonded to C is halogen, $NO_2$, CN, $C_1$-$C_6$-alkyl, $C_1$-$C_6$-alkoxy, $C_1$-$C_6$-haloalkyl, $C_1$-$C_6$-haloalkoxy, $C_3$-$C_6$-cycloalkyl, $C_3$-$C_6$-cycloalkoxy, $C_3$-$C_6$-halocycloalkyl, $C_3$-$C_6$-halocycloalkoxy, $C_2$-$C_4$-alkenyl, $C_2$-$C_4$-alkynyl, $S(O)_mR^w$, =O, =S, =$NR^v$, =$NOR^v$, or =$NSR^v$; or two $R^t$ bonded to the same carbon atom or to adjacent carbon atoms together with the carbon atom(s) to which they are bonded form a 3- to 6-membered, saturated or unsaturated carbo- or heterocycle, which heterocycle contains one or more, same or different heteroatoms N, O, or S, wherein S may be oxidized, where in N is unsubstituted or substituted with one or more, same or different substituents $R^l$;

$R^v$ is $C_1$-$C_4$-alkyl, $C_1$-$C_4$-haloalkyl, $C_3$-$C_6$-cycloalkyl, or $C_3$-$C_6$-halocycloalkyl;

$R^w$ is H, $C_1$-$C_4$-alkyl, $C_1$-$C_4$-haloalkyl, $C_3$-$C_6$-cycloalkyl, $C_3$-$C_6$-halocycloalkyl, $C_1$-$C_4$-alkoxy, or $C_1$-$C_4$-haloalkoxy;

$R^x$ is halogen, CN, $NO_2$, $C_1$-$C_4$-alkyl, $C_1$-$C_4$-haloalkyl, $C_1$-$C_4$-alkoxy, $C_1$-$C_4$-haloalkoxy, $S(O)_mR^d$, $S(O)_mNR^eR^f$, $NR^eR^f$, $C(O)NR^gR^h$, $C_1$-$C_{10}$-alkylcarbonyl, $C_1$-$C_4$-haloalkylcarbonyl, $C_1$-$C_4$-alkoxycarbonyl, $C_1$-$C_4$-haloalkoxycarbonyl, $C_3$-$C_6$-cycloalkyl, 5- to 7-membered heterocyclyl, 5- or 6-membered hetaryl, aryl, $C_3$-$C_6$-cycloalkoxy, 3- to 6-membered heterocyclyloxy, or phenoxy, wherein the cyclic moieties are unsubstituted or substituted with one or more, same or different substituents $R^y$;

$R^y$ is halogen, CN, $NO_2$, $C_1$-$C_4$-alkyl, $C_1$-$C_4$-haloalkyl, $C_1$-$C_4$-alkoxy, $C_1$-$C_4$-haloalkoxy, $S(O)_mR^d$, $S(O)_mNR^eR^f$, $C_1$-$C_4$-alkylcarbonyl, $C_1$-$C_4$-haloalkylcarbonyl, $C_1$-$C_4$-alkoxycarbonyl, $C_1$-$C_4$-haloalkoxycarbonyl, $C_3$-$C_6$-cycloalkyl, $C_3$-$C_6$-halocycloalkyl, $C_2$-$C_4$-alkenyl, $C_2$-$C_4$-haloalkenyl, $C_2$-$C_4$-alkynyl, or $C_1$-$C_4$-alkoxy-$C_1$-$C_4$-alkyl;

$R^{aa}$ is halogen, CN, $NO_2$, $C_1$-$C_4$-alkyl, $C_1$-$C_4$-haloalkyl, $C_1$-$C_4$-alkoxy, or $C_1$-$C_4$-haloalkoxy;

$R^{41}$ is CN, halogen, $C_1$-$C_4$-alkoxy, $C_1$-$C_4$-alkyl-$S(O)_m$—, $C(O)R^{24}$, $C(O)NR^{24}R^{34}$, or $C(G^4)R^{24}$;

$R^{42}$ is CN, halogen, OH, $C_1$-$C_4$-alkoxy, $C_1$-$C_4$-alkoxycarbonyl, or $C_1$-$C_4$-alkyl-$S(O)_m$—;

$R^{43}$ is CN, halogen, $C_1$-$C_4$-alkoxy, or $C_1$-$C_4$-alkyl-$S(O)_m$—;

$R^{44}$ is CN, halogen, $C_1$-$C_4$-alkyl, $C_1$-$C_4$-haloalkyl, or $C_1$-$C_4$-alkoxy;

$R^{45}$ is CN, $NO_2$, halogen, oxime ether, acylamido, $C_1$-$C_4$-alkyl, $C_1$-$C_4$-haloalkyl, $C_1$-$C_4$-alkoxy, $C_1$-$C_4$-haloalkoxy, $C_1$-$C_4$-alkyl-$S(O)_m$—, $C_1$-$C_4$-haloalkyl-$S(O)_m$—; or aryl, aryloxy, hetaryl, or hetaryloxy, which aromatic groups are unsubstituted or substituted by one or more, same or different substituents $R^{Z1}$; wherein $R^{Z1}$ is CN, $NO_2$, halogen, $C_1$-$C_4$-alkyl, $C_1$-$C_4$-haloalkyl, $C_1$-$C_4$-alkoxy, $C_1$-$C_4$-haloalkoxy, $C_1$-$C_4$-alkyl-$S(O)_m$—, $C_1$-$C_4$-haloalkyl-$S(O)_m$—, hetaryloxy, or aryloxy;

$R^{46}$ is CN, $NO_2$, halogen, $C_1$-$C_4$-alkyl, $C_1$-$C_4$-haloalkyl, $C_1$-$C_4$-alkoxy, $C_1$-$C_4$-haloalkoxy, $C_1$-$C_4$-alkyl-$S(O)_m$—, or $C_1$-$C_4$-haloalkyl-$S(O)_m$—;

$R^{47}$ is CN, $NO_2$, halogen, $C_1$-$C_4$-alkyl, $C_1$-$C_4$-haloalkyl, OH, $C_1$-$C_4$-alkoxy, $C_1$-$C_4$-haloalkoxy, $C_1$-$C_4$-alkyl-$S(O)_m$—, or $C_1$-$C_4$-haloalkyl-$S(O)_m$—;

$R^{48}$ is H, CN, $NO_2$, $C_1$-$C_4$-alkyl, $C_3$-$C_6$-cycloalkyl, $C_1$-$C_5$-haloalkyl, $C_1$-$C_4$-alkoxy, $C_1$-$C_4$-haloalkoxy, $C_3$-$C_6$-halogencycloalkyl, $C_1$-$C_4$-alkoxy-$C_1$-$C_4$-alkyl, cyano-$C_1$-$C_4$-alkyl, $C_3$-$C_6$-cycloalkyl-$C_1$-$C_4$-alkyl, $C_2$-$C_6$-alkenyl, $C_3$-$C_6$-alkynyl, $C_1$-$C_4$-alkyl-$S(O)_m$—, $C_1$-$C_4$-alkylcarbonyl, $C_1$-$C_6$-haloalkylcarbonyl, $C_1$-$C_6$-alkoxycarbonyl, $C_1$-$C_6$-alkylaminocarbonyl, di-($C_1$-$C_6$)-alkylaminocarbonyl, $C_1$-$C_6$-alkylcarbonylamino, aryl or hetaryl, wherein the aryl or hetaryl groups are unsubstituted or substituted with one or more, same or different substituents $R^{Z2}$; wherein $R^{Z2}$ is CN, $NO_2$, halogen, $C_1$-$C_6$-alkyl, $C_2$-$C_6$-alkenyl, $C_2$-$C_6$-alkynyl, $C_1$-$C_4$-alkoxy, $C_1$-$C_4$-haloalkyl, $C_1$-$C_6$-haloalkoxy, or $C_1$-$C_4$-alkylthio;

$R^{49}$ is CN, halogen, $C_1$-$C_4$-alkoxy, $C_1$-$C_4$-alkyl-$S(O)_m$—, $C(O)OR^{24}$, $C(O)NR^{24}R^{34}$, or $C(G^4)R^{24}$;

$R^{410}$ is $C_1$-$C_2$-alkyl, $C_1$-$C_2$-haloalkyl, $C_1$-$C_2$-alkoxy;

Y is O or S;

m is 0, 1 or 2;

and the salts, stereoisomers, tautomers, and N-oxides thereof.

Clause 7: The agrochemical composition according to clause 6, wherein $R^{P1}$, $R^{P2}$, $R^{P3}$ are H, and T is O.

Clause 8: The agrochemical composition according to any of clauses 6 or 7, wherein $R^1$ is H, $C_1$-$C_2$-alkyl, $C_3$-$C_5$-cycloalkyl, or $C_1$-$C_2$-alkoxy-$C_1$-$C_2$-alkyl;

$R^2$ is $C_1$-$C_6$-alkyl, or $C_1$-$C_6$-haloalkyl; and $R^3$ is H, $C_1$-$C_2$-alkyl, or $C_1$-$C_2$-haloalkyl.

Clause 9: The agrochemical composition according to any of clauses 6 to 8, wherein the active ingredient is a compound of formula I.A

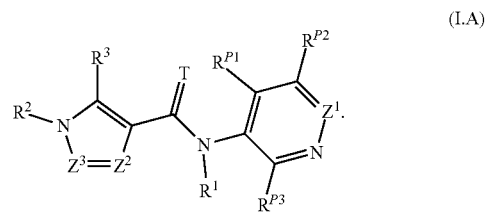

(I.A)

Clause 10: The agrochemical composition according to any of claims 6 to 8, wherein the active ingredient is a compound of formula (I.B)

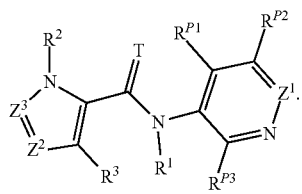

(I.B)

Clause 11: The agrochemical composition according to any of clauses 6 to 10, wherein $Z^1$ and $Z^2$ are N, and $Z^3$ is CH.

Clause 12: The agrochemical composition according to any of clauses 6 to 10, wherein $Z^1$ is CH, $Z^3$ is N, and $Z^2$ is $CR^4$.

Clause 13: The agrochemical composition according to any of clauses 1 to 12, containing the active ingredient in a concentration of from 1 to 65 wt %, and the ethoxylated ricinolein in a concentration of from 1 to 30 wt %, each based on the total weight of the composition.

Clause 14: The agrochemical composition according to any of clauses 1 to 13, containing a second active ingredient.

Advantages: the agrochemical composition is characterized by a very high storage stability, little particle growth, reduced sedimentation, reduced gelling, an advantageous rheological pro file, and high biological efficacy. The term "stability" as used herein typically refers to physical stability of the agrochemical formulation. Accordingly, the term "stabilizing" usually refers to a physical stabilization (e.g. increase of storage stability).

The following examples illustrate the invention.

EXAMPLES

The following ingredients were used for preparing the agrochemical compositions of the examples.

Insecticide A: 1-[(1RS)-1,2-dimethylpropyl]-N-ethyl-5-methyl-N-pyridazin-4-yl-1H-pyrazole-4-carboxamide (CAS registry number 1403615-77-9).

Dispersant: lignine sulfonate, organic sulfur content approximately 9 wt %

Antifoam: emulsion of dimethylsiloxane on silica particles, defoamer content 20 wt %

Biocide A: glycol based solution of benzisothiazolinone

Biocide B: aqueous composition of benzisothiazolinones and 5-chloro-2-methylisothiazolin-3-one Stabilizer: hydrophobic fumed silica particles, surface modified with dimethylsilyl groups, water-solubility below 0.1 g/l, BET surface 90-130 m2/g, carbon content 0.6 to 1.2 wt %

Wet A: $C_8$-$C_{10}$-alkyl polyglycoside surfactant, HLB 13.6

Wet B: sodium salt of naphthalene sulfonate condensate

Wet C: ethoxylated castor oil, 40 polymerized ethylene oxide units per molecule on average, saponification value 58-66 (according to ISO 3657)

Wet D: ethoxylated castor oil, 20 polymerized ethylene oxide units per molecule on average Wet E: ethoxylated castor oil, 25 polymerized ethylene oxide units per molecule on average, Wet G: ethoxylated castor oil, 35 polymerized ethylene oxide units per molecule on average, Wet H: ethoxylated castor oil, 54 polymerized ethylene oxide units per molecule on average Wet J: naphthalene sulfonate condensate, polymer with formaldehyde, ammonium salt Wet K: 33 wt % reaction product of methyl methacrylate, methacrylic acid and methoxy polethyleneglycol methacrylate, 33 wt % propylene glycol, 33 wt % water.

Wet L: tristyrylphenol ethoxylate, 10 polymerized ethylene oxide units per molecule on average Wet M: ethoxylated isotridecylalcohol, 5 polymerized ethylene oxide units per molecule on average, HLB 10.5

Wet N: reaction product of lignin, alkali, with formaldehyde and sodium bisulfite Wet O: aqueous mixture of 20 wt % ethoxylated tristyrylphenol, 20 wt % polyoxyethylene tristyrylphenol phosphate, potassium salt Wet P: alkoxylated castor oil.

pH-Adjustor: tetrahydroxypropylethylendiamine

Example-1

Suspension concentrates SC-1 to SC-10 were prepared containing the ingredients according to Table A. The suspension concentrates differed by the type of Wetting Agent used, as provided in Table B.

The suspension concentrates were prepared by adding Insecticide A, Wetting Agent, Dispersant, Antifoam, Biocide A, Biocide B, acetic acid, and the Stabilizer to water. The mixture was homogenized until uniform and then milled in a bead mill until a mean particle size of 2-3 μm was achieved.

The suspension concentrates were then placed in a 20° C./40° C. cycling chamber for two weeks (24 hours at 20° C. and then 24 hours at 40° C.), upon which the suspension concentrates were analyzed by visual inspection and by testing the rheological properties. SC-3 was the only suspension concentrate that remained flowable, whereas all other suspension concentrates SC-1, SC-2 and SC-4 to SC-10 displayed gelling.

TABLE A

Ingredients of suspension concentrates SC-1 to SC-10

| Component | Concentration [wt %] |
| --- | --- |
| Insecticide A | 35.03% |
| Wetting Agent | 4.36% |
| Dispersant | 4.90% |
| Antifoam | 0.22% |
| Biocide A | 0.21% |
| Biocide B | 0.11% |
| Acetic acid | 0.22% |
| Stabilizer | 1.09% |
| Water | to 100% |

TABLE B

Wetting Agents contained in suspension concentrates SC-1 to SC-10

| Suspension Concentrate | Wetting Agent |
| --- | --- |
| SC-1 | Wet A |
| SC-2 | WetB |
| SC-3 | Wet C |
| SC-4 | Wet J |
| SC-5 | Wet K |
| SC-6 | Wet L |
| SC-7 | Wet M |
| SC-8 | Wet N |

TABLE B-continued

Wetting Agents contained in suspension concentrates SC-1 to SC-10

| Suspension Concentrate | Wetting Agent |
|---|---|
| SC-9 | Wet O |
| SC-10 | Wet P |

Example-2

Suspension concentrates SC-11 to SC-15 were prepared containing the ingredients according to Table C. The suspension concentrates differed by the type of Wetting Agent used, as provided in Table D.

The suspension concentrates were prepared by adding in a first step Insecticide A, 20% of the allotted Wetting Agent, Dispersing Agent, Antifoam, Biocide A, Biocide B, glycerol, pH Adjustor, and Stabilizer to water to create a mill base. The mill base was homogenized in a second step until uniform, and then milled in a bead mill until a mean particle size of 2-3 microns was achieved. The resulting composition was mixed in a third step with the remaining Wetting Agent until homogenous.

The suspension concentrates SC-11 and SC-12 displayed gelling already during milling. SC-11 to SC-15 were then incubated for 24 hours at 22° C. upon which the suspension concentrates were analyzed by visual inspection and by testing the rheological properties. SC-11, SC-12, and SC-15 displayed gelling. SC-13 remained slightly flowable, and SC-14 remained fully flowable.

TABLE C

Ingredients of suspension concentrates SC-11 to SC-15

| Component | Concentration [wt %] |
|---|---|
| Insecticide A | 36.36 |
| Wetting Agent | 15.00 |
| Dispersant | 1.72 |
| Antifoam | 0.19 |
| Biocide A | 0.09 |
| Biocide B | 0.04 |
| Glycerol | 4.12 |
| Stabilizer | 1.00 |
| pH Adjustor | 0.26 |
| Water | to 100% |

TABLE D

Wetting Agents contained in suspension concentrates SC-11 to SC-15

| Suspension Concentrate | Wetting Agent |
|---|---|
| SC-11 | Wet D |
| SC-12 | Wet E |
| SC-13 | Wet G |
| SC-14 | Wet C |
| SC-15 | Wet H |

The invention claimed is:

1. An aqueous agrochemical composition comprising
   a) suspended particles of dimpropyridaz; and
   b) ethoxylated ricinolein;
   wherein the ethoxylated ricinolein contains 35 to 50 molecules of ethylene oxide per molecule of ricinolein in polymerized form.

2. The agrochemical composition of claim 1, wherein the ethoxylated ricinolein contains from 38 to 42 molecules of ethylene oxide per molecule of ricinolein in polymerized form.

3. The agrochemical composition according to claim 1, wherein the suspended particles have a median diameter of from 0.5 μm to 20 μm.

4. The agrochemical composition according to claim 1, containing dimpropyridaz in a concentration of from 1 to 65 wt % based on the total weight of the agrochemical composition.

5. The agrochemical composition according to claim 1 containing the ethoxylated ricinolein in a concentration of from 1 to 30 wt % based on the total weight of the agrochemical composition.

6. The agrochemical composition according to claim 1, containing a second active ingredient.

7. The agrochemical composition according to claim 1 having a weight ratio of dimpropyridaz to the ethoxylated ricinolein of from 1:1 to 100:1.

8. A plant propagation material comprising the agrochemical composition as defined in claim 1.

9. A method of stabilizing an aqueous agrochemical composition comprising suspended particles of dimpropyridaz, comprising contacting ethoxylated ricinolein containing 35 to 50 molecules of ethylene oxide per molecule of ricinolein in polymerized form with particles of dimpropyridaz and water.

10. A method for treating, controlling, preventing or protecting animals against infestation or infection by parasites by administering or applying orally, topically or parenterally to the animals the agrochemical composition as defined in claim 1.

11. A method of controlling invertebrate pests, infestation, or infection by invertebrate pests, comprising contacting the pests, their food supply, habitat, breeding grounds or their locus with an agrochemical composition as defined in claim 1 in pesticidally effective amounts.

12. A method for preparing the agrochemical composition as defined in claim 1 comprising contacting the ethoxylated ricinolein containing 35 to 50 molecules of ethylene oxide per molecule of ricinolein in polymerized form with dimpropyridaz in the presence of water.

* * * * *